(12) United States Patent
Feldman et al.

(10) Patent No.: US 12,655,813 B2
(45) Date of Patent: Jun. 16, 2026

(54) TURBOMOLECULAR AIR-SCOOP FOR SATELLITE AIR-BREATHING ELECTRIC PROPULSION

(71) Applicant: Viridian Space Corporation, El Segundo, CA (US)

(72) Inventors: Matthew S. Feldman, Los Angeles, CA (US); Rostislav Spektor, El Segundo, CA (US)

(73) Assignee: Viridian Space Corporation, El Segundo, CA (US)

( * ) Notice: Subject to any disclaimer, the term of this patent is extended or adjusted under 35 U.S.C. 154(b) by 0 days.

(21) Appl. No.: 19/093,027

(22) Filed: Mar. 27, 2025

(65) Prior Publication Data

US 2025/0230783 A1 Jul. 17, 2025

Related U.S. Application Data

(63) Continuation of application No. 17/970,376, filed on Oct. 20, 2022, now Pat. No. 12,286,943.

(60) Provisional application No. 63/270,273, filed on Oct. 21, 2021.

(51) Int. Cl.
| | |
|---|---|
| *F02K 9/44* | (2006.01) |
| *B64G 1/40* | (2006.01) |
| *B64G 1/44* | (2006.01) |
| *F03H 1/00* | (2006.01) |

(52) U.S. Cl.
CPC ............... *F02K 9/44* (2013.01); *B64G 1/402* (2013.01); *B64G 1/411* (2023.08); *B64G 1/413* (2023.08); *B64G 1/44* (2013.01); *F03H 1/0037* (2013.01)

(58) Field of Classification Search
CPC .......... F02K 9/44; B64G 1/402; F03H 1/0012
See application file for complete search history.

(56) References Cited

U.S. PATENT DOCUMENTS

| | | | |
|---|---|---|---|
| 5,577,881 | A | 11/1996 | Hablanian |
| 6,834,492 | B2 | 12/2004 | Hruby |
| 7,581,380 | B2 | 9/2009 | Wahl |
| 10,351,267 | B2 | 7/2019 | Reedy |
| 10,583,632 | B2 | 3/2020 | Minton |
| 10,590,068 | B2 | 3/2020 | Reedy |

(Continued)

FOREIGN PATENT DOCUMENTS

| | | |
|---|---|---|
| CN | 103453805 A | 12/2013 |
| CN | 112224451 A | 1/2021 |

(Continued)

OTHER PUBLICATIONS

Empirical and Numerical Calculations in Two Dimensions for Predicting the Performance of a Single Stage Turbomolecular Pump, by T. N. Schneider, S. Katsimichas, C. R. E. de Oliveira, and A. J. H. Goddard, J. Vac. Sci. Technol. A, vol. 16, issue 1, pp. 175-180, 1998.

(Continued)

*Primary Examiner* — David P. Olynick

(57) ABSTRACT

In one embodiment, a method includes collecting and compressing air with an air-scoop that includes an air inlet that air molecules enter the air-scoop through at approximately an orbital speed when the air-scoop is moving through an atmosphere at approximately the orbital speed and a rotor configured to be rotated by a motor at approximately a rotational speed. The method also includes providing the collected and compressed air for supply to a thruster as propellant.

28 Claims, 29 Drawing Sheets

(56) References Cited

U.S. PATENT DOCUMENTS

| | | | |
|---|---|---|---|
| 10,662,930 | B2 | 5/2020 | Marchandise |
| 10,715,245 | B2 | 7/2020 | Nobbe |
| 10,858,309 | B2 | 12/2020 | Reedy |
| 11,053,028 | B2 | 7/2021 | Reedy |
| 2015/0240794 | A1 | 8/2015 | Berl |
| 2018/0159617 | A1 | 6/2018 | Nobbe |
| 2020/0343966 | A1 | 10/2020 | Nobbe |
| 2021/0078942 | A1 | 3/2021 | Reedy |
| 2021/0284361 | A1 | 9/2021 | Reedy |
| 2021/0339890 | A1 | 11/2021 | Reedy |

FOREIGN PATENT DOCUMENTS

| | | | |
|---|---|---|---|
| CN | 112572833 | A | 3/2021 |
| CN | 113104237 | A | 7/2021 |
| WO | WO 2003/098041 | A2 | 11/2003 |
| WO | WO 2018/147925 | A1 | 8/2018 |
| WO | WO 2019/140156 | A1 | 7/2019 |
| WO | WO 2019/140159 | A1 | 7/2019 |
| WO | WO 2019/140219 | A9 | 7/2019 |
| WO | WO 2021/011587 | A1 | 1/2021 |

OTHER PUBLICATIONS

Extended European Search Report, Supplementary European Search Report, and European Search Opinion for European Patent Application No. 22884531.9, Aug. 11, 2025.

International Search Report and Written Opinion for International Patent Application PCT/US2022/047440, Feb. 20, 2023.

*Design and analysis of vacuum air-intake device used in air-breathing electric propulsion*, by Yanwu Li, X. Chen, Danming Li, Yuhua Xiao, Peng Dao, Chengshi Gong, Vacuum, vol. 120, part A, pp. 89-95, Jun. 16, 2015.

*The Low Earth Orbit Satellite Population and Impacts of the SpaceX Starlink Constellation*, by Jonathan C. McDowell, The Astrophysical Journal Letters, 892:L36 Draft Version, Apr. 7, 2020.

*The Low Earth Orbit Satellite Population and Impacts of the SpaceX Starlink Constellation*, by Jonathan C. McDowell, The Astrophysical Journal Letters, 892:L36, Apr. 1, 2020.

*An improved algorithm for satellite orbit decay and re-entry prediction. Aeronautics and astronautics*, by J. D. Strizzi, Massachusetts Institute of Technology, Jun. 8, 1993.

Mitigation of orbital debris in the new space age, by Space Exploration Technologies Corp., Aug. 6, 2021.

*SpaceX's Starlink satellites near-misses with other spacecraft are getting 'out of control'*, experts say, retrieved from https://www.msn.com/en-gb/news/world/spacex-e2-80-99s-starlink-satellites-near-misses-with-other-spacecraft-are-getting-e2-80-98out-of-control-e2-80-99-experts-say/ar-AANybG4 on Nov. 18, 2022.

*Starlink's 'megaconstellation' of 12,000 satellites could account for 90% of near misses in orbit, scientist predicts*, retrieved from https://www.businessinsider.com/starlink-will-ultimately-account-for-90-of-orbital-near-misses-2021-8, Aug. 19, 2021.

*European Space Agency satellite narrowly avoids crash withSpaceX 'constellation,'* retrieved from https://metro.co.uk/2019/09/02/elon-musks-spacex-starlink- satellites-almost-hit-esa-spacecraft-10672608/, Sep. 2, 2019.

*Best Research-Cell Efficiency Chart*, retrieved from https://www.nrel.gov/pv/cell-efficiency.html on Nov. 18, 2022.

*Solar Power Technologies for Future Planetary Science Missions*, by R. Surampudi, J. Blosiu, P. Stella, J. Elliott, J. Castillo, T. Yi, J. Lyons, M. Piszczor, J. McNatt, C. Taylor, E. Gaddy, S. Liu, E. Plichta, C. Iannello, P. Beauchamp, and J. Cutts, Report JPL D-101316, JPL, Dec. 2017.

Next Generation Flexible Solar Array Technology for DOD Spacecraft, by J. Banik and P. Hausgen, presented at 107 AIAA Space Forum, Sep. 12-14, 2017, Orlando, Florida, AIAA-2017-5307.

*On-Orbit Structural Dynamics Performance of the Roll-Out Solar Array*, by M. K. Chamberlain, S. H. Kiefer, and J. Banik, presented at 2018 AIAA Spacecraft Structures Conference, Jan. 8-12, 2018, Kissimmee, Florida, AIAA-2018-1942.

Dan M. Goebel and Ira Katz, Fundamentals of Electric Propulsion: Ion and Hall Thrusters, John Wiley & Sons Inc, Hoboken, Nj, USA, Mar. 2008.

*13kW Advanced Electric Propulsion Flight System Development and Qualification*, by J. Jackson, S. Miller, J. Cassady, E. Soendker, B. Welander, M. Barber, and P. Peterson, presented at the 36th International Electric Propulsion Conference, Vienna, Austria, Sep. 15-20, 2019, IEPC-2019-692.

*Experimental Investigation of the Alternative Propellants for Stationary Plasma Thruster*, by Sergey A. Khartov, Dmitry M. Napolov, Alexander A. Perfiliev, and Julia V. Zikeeva, Proc. 3rd International Conference on Spacecraft Propulsion, Cannes, Oct. 10-13, 2000, ESA SP-465, Dec. 2000, pp. 833-836.

*Auger electron spectroscopy study of cathode surfaces during activation and poisoning. I. The barium-on-oxygen-on-tungsten dispenser cathode*, by R. W. Springer and T. W. Haas, Journal of Applied Physics, vol. 45, No. 12, 5260-63, Dec. 1974, pp. 5260-5263.

*The Operation of Coated Tungsten-Based Dispenser Cathodes in Nonideal Vacuum*, by Christie R.K. Marrian and Arnold Shih, IEEE Transactions on Electron Devices, vol. 36, No. 1, Jan. 1989, pp. 173-179.

*Initial Performance of a ECR Waveguide Plasma Cathode with Permanent Magnets*, by Brandon R. Weatherford and John E. Foster, presented at the 31st International Electric Propulsion Conference (IEPC), Ann Arbor, Michigan, USA, Sep. 20-24, 2009, IEPC-2009-211.

*Dissertation: A Calcium Aluminate Electride Hollow Cathode*, by Lauren P. Rand, Colorado State University, 2014.

*Integrated Testing of Iodine BIT-3 RF Ion Propulsion System for 6U CubeSat Applications*, by Michael Tsay, Joshua Model, Carl Barcroft, John Frongillo, Jurg Zwahlen, and Charlie Feng, presented at the 35th International Electric Propulsion Conference, Georgia Institute of Technology, Atlanta, Georgia, USA, Oct. 8-12, 2017, IEPC-2017-264.

*Development and Experimental Validation of a Hall Effect Thruster RAM-EP Concept*, by T. Andreussi, E. Ferrato, A. Piragino, G. Cifali, A. Rossodivita, and M. Andrenucci, presented at the Space Propulsion Conference 2018, Seville, Spain, May 14-18, 2018, SP2018-00431.

*MDM: A flight mission to observe materials degradation in-situ on satellite in super low Earth orbit*, by Yugo Kimoto, Kazuki Yukumatsu, Aki Goto, Eiji Miyazaki, and Yuta Tsuchiya, Acta Astronautica 179 (2021), Dec. 1, 2020, pp. 695-701.

*Property changes in materials due to atomic oxygen in the low Earth orbit*, by Aki Goto, Kaori Umeda, Kazuki Yukumatsu, and Yugo Kimoto, CEAS Space Journal (2021) 13:415-432, Jun. 28, 2021, pp. 415-432.

*Goce Mission: Design phases and in-flight experiences*, by A. Allasio, A. Anselmi, G. Catastini, S. Cesare, M. Dumontel, M. Saponara, G. Sechi, A. Tramutola, B. Vinai, G. André, M. Fehringer, and D. Muzi, presented at the 33rd Annual AAS Guidance and Control Conference, Breckenridge, Colorado, USA, Feb. 2010, AAS 10-081.

*The Goce Ion Propulsion Assembly—Lessons Learnt from the First 22 Months of Flight Operations*, by Neil Wallace, Peter Jameson, Christopher Saunders, Michael Fehringer, Clive Edwards, and Rune Floberghagen, presented at the 32nd International Electric Propulsion Conference (IEPC), Wiesbaden, Germany, Sep. 11-15, 2011, IEPC-2011-327.

*Preliminary characterization test of HET and RIT with Nitrogen and Oxygen*, by G. Cifali, T. Misuri, P. Rossetti, M. Andrenucci, D. Valentian, and D. Feili, 47th AIAA/ASME/SAE/ASEE Joint Propulsion Conference & Exhibit, Jul. 31-Aug. 3, 2011, San Diego, California, USA.

*Investigation of the laboratory model of a thruster with anode layer operating with air and nitrogen-oxygen mixture*, by D. V. Dukhopelnikov, V. A. Riazanov, S. O. Shilov, D. S. Manegin, and R. A. Sokolov, AIP Conference Proceedings 2318, 040006-1-040006-6 (2021), Feb. 22, 2021.

(56) References Cited

OTHER PUBLICATIONS

*GOCE Flight Dynamics Support to the Low Orbit and Deorbiting Operations*, by Miguel A. Martín Serrano, Dirk Kuijper, Javier Sánchez, Pere Ramos-Bosch, and Detlef Sieg, presented at the 24th International Symposium on Space Flight Dynamics (ISSFD), Laurel, Maryland, USA, May 5-9, 2014, ISSFD-24-S1-6.

*Conceptual Design of an Air-Breathing Electric Propulsion System*, by Serge Barral, Gianluca Cifali, Riccardo Albertoni, Mariano Andrenucci, and Louis Walpot, presented at the Joint Conference of the 30th International Symposium on Space Technology and Science, 34th International Electric Propulsion Conference, and 6th Nano-satellite Symposium, Hyogo-Kobe, Japan, Jul. 4-10, 2015, IEPC-2015-271/ISTS-2015-b-271.

Design and analysis of vacuum air-intake device used in air-breathing electric propulsion, by Yanwu Li, X. Chen, Danming Li, Yuhua Xiao, Peng Dai, and Chengshi Gong, Vacuum 120 (2015), Jun. 16, 2015, pp. 89-95.

*Design of an Air-Breathing Electric Thruster For CubeSat Applications*, by Stephen Wade Jackson, University of Colorado at Boulder, Jan. 1, 2017.

*New concepts in molecular gas flow*, by Donald J. Santeler, Journal of Vacuum Science & Technology A 4(3), May/Jun. 1986, pp. 338-343.

*The turbomolecular pump in molecular state*, by A. G. Antoniou, S. E. Valamontes, C. N. Panos, E. S. Valamontes, Vacuum, vol. 46, No. 7, 1995, pp. 709-715.

*The turbomolecular pump, its design, operation and theory; calculation of the pumping speed for various gases and their dependence on the forepump*, by W. Becker, Vacuum, vol. 16, No. 11, 1966, pp. 625-632.

*Calculation of the pumping speed of turbomolecular vacuum pumps by means of simple mechanical data*, by K.-H. Bernhardt, Journal of Vacuum Science & Technology A 1 (2), Apr.-Jun. 1983, 136-139.

*Rotor speed control strategy to avoid resonance frequencies of turbomolecular pump*, by Hsin-Lin Chiu and Nan-Chyuan Tsai, Transactions of the Institute of Measurement and Control, Jan. 2018.

*The statistical theory of turbomolecular pumps*, by J. G. Chu, and Z. Y. Hua, Journal of Vacuum Science & Technology 20(4), Apr. 1982, 1101-1104.

*Rotor Resonances of High-Speed Permanent-Magnet Brushless Machines*, by Jason D. Ede, Z. Q. Zhu, and David Howe, IEEE Transactions on Industry Applications, vol. 38, No. 6, Nov./Dec. 2002.

*Solved and Unsolved Gas Dynamics Problems for Turbo-Molecular-Drag Pumps*, by Silvio Giors, 64th IUVSTA Workshop on Practical Applications and Methods of Gas Dynamics for Vacuum Science and Technology, May 16-19, 2011, Leinsweiler, Germany.

*New concepts in turbomolecular pump design*, by M. H. Hablanian, Journal of Vacuum Science & Technology A 11(4), Jul./Aug. 1993, pp. 1614-1619.

*Engineering aspects of turbomolecular pump design*, by M.H. Hablanian, Vacuum 82, 2008, pp. 61-65.

*Design aspects of a large scale turbomolecular pump with active magnetic bearings*, by Bangcheng Han, Ziyuan Huang, and Yun Le, Vacuum (2017), doi: 10.1016/j.vacuum.2016.12.010, Dec. 10, 2016.

*Multidisciplinary Design Strategies for Turbomolecular Pumps With Ultrahigh Vacuum Performance*, by Ziyuan Huang, Bangcheng Han, and Yun Le, IEEE Transactions on Industrial Electronics, vol. 66, No. 12, Dec. 2019.

*Theoretical studies of the modern turbomolecular pump*, by Tu Ji-yuan and Yang Nai-heng, Vacuum, vol. 37, Nos. 11/12, 1987, pp. 831-837.

*Vacuum Pumping with a Bladed Axial-Flow Turbomachine*, by Charles H. Kruger and Ascher H. Shapiro, Seventh National Symposium on Vacuum Technology Transactions, Oct. 12-14, 1960, Cleveland, Ohio, USA.

*A Practical Review of Rotating Machinery Critical Speeds and Modes*, by Erik Swanson, Chris D. Powell, and Sorin Weissman, Sound and Vibration, May 2005.

*Turbo-V Pump Technical Notes*, Varian, Inc., Vacuum Technologies, Dec. 2003, pp. 190-195.

*Optimal design of magnetically suspended high-speed rotor in turbo-molecular pump*, by Yiming Zhang, Jiqiang Tang, Xueping Xu, and Ziyuan Huang, Vacuum 193, Aug. 11, 2021.

*A Modified Transfer Matrix Method for Modal Analysis of Stepped Rotor Assembly Applied in the Turbomolecular Pump*, by Yiming Zhang, Jiqiang Tang, and Tong Wen, Hindawi, Shock and Vibration, vol. 2022, Article ID 3692081, https://doi.org/10.1155/2022/3692081, Feb. 27, 2022.

*D2.2 VLEO EO Satellite Aerodynamic Control Techniques and Mechanisms*, by Nicholas H. Crisp, Sabrina Livadiotti, Peter C.E. Roberts, Jonathan Becedas Rodríguez, David González, Valentín José Cañas Muñoz, and Constantin Traub, Project Discoverer, Sep. 30, 2019.

*D4.1—Literature Review of ABEP Systems*, by Francesco Romano, Tilman Binder, Adam Boxberger, Katherine Smith, and Peter Roberts, Project Discoverer, Jun. 30, 2017.

*D2.1 VLEO Aerodynamics Requirements Document*, by Gerardo González, Rosa M. Domínguez, Irene Vázquez, Álvaro Braña, Nicholas H. Crisp, and Jonathan Becedas, Project Discoverer, Mar. 23, 2018.

*D5.2—Literature Review of the Benefits and Applications of Very Low Earth Orbits for Earth Observation*, by Nicholas H. Crisp, Peter C.E. Roberts, and Sabrina Livadiotti, Project Discoverer, Jan. 30, 2018.

*Air-Breathing Electric Propulsion Spacecraft Performance and Aerodynamic Maneuverability*, by Patrick Crandall1 and Richard E. Wirz, presented at the 37th International Electric Propulsion Conference, Massachusetts Institute of Technology, Cambridge, Massachusetts, USA, IEPC-2022-444, Jun. 19-23, 2022.

*Electron-Beam Generated ExB Plasma for Air-Breathing Propulsion—A Concept Study*, by Yevgeny Raitses, Nirbhav Chopra, and Jacob Simmonds, presented at the 37th International Electric Propulsion Conference, Massachusetts Institute of Technology, Cambridge, Massachusetts, USA, IEPC-2022-443, Jun. 19-23, 2022.

*Air Breathing Hall Effect Thruster Design Studies and Experiments*, by Vlad Hruby, Kurt Hohman, James Szabo, presented at the 37th International Electric Propulsion Conference, Massachusetts Institute of Technology, Cambridge, Massachusetts, USA, IEPC-2022-446, Jun. 19-23, 2022.

*Flight envelope and in-orbit control analysis for an air-breathing electric propulsion spacecraft*, by M. Tisaev, N. Baresi, A. Lucca Fabris, E. Ferrato, C. Paissoni, V. Giannetti, and T. Andreussi, presented at the 37th International Electric Propulsion Conference, Massachusetts Institute of Technology, Cambridge, MA, USA, IEPC-2022-45, Jun. 19-23, 2022.

*Development of a Novel Passively Ionizing Air-Breathing Electric Propulsion Concept for Low Earth Orbits*, by Florian Prochnow, Christoph Peter, Jan-Philipp Wulfkühler, Christian Drobny, Martin Tajmar, John Cook, Martin Sparkes, William O'Neill, and Nathanial Lockwood, presented at the 37th International Electric Propulsion Conference, Massachusetts Institute of Technology, Cambridge, Massachusetts, USA, IEPC-2022-420, Jun. 19-23, 2022.

*Air Breathing Dual Mode Plasma Thruster*, by Thomas C. Underwood, presented at the 37th International Electric Propulsion Conference, Massachusetts Institute of Technology, Cambridge, Massachusetts, USA, IEPC-2022-438, Jun. 19-23, 2022.

*A review of research in low earth orbit propellant collection*, by Lake A.Singh and Mitchell L. R.Walker, Progress in Aerospace Sciences 75 (2015) 15-25, Apr. 17, 2015.

*A Breath of Fresh Air: Air-Scooping Electric Propulsion in Very Low Earth Orbit*, by Rostislav Spektor and Karen L. Jones, Center for Space Policy and Strategy, Mar. 2021.

*A review of air-breathing electric propulsion: from mission studies to technology verification*, by Tommaso Andreussi, Eugenio Ferrato, and Vittorio Giannetti, Journal of Electric Propulsion (2022).

*A Comprehensive Review of Atmosphere-Breathing Electric Propulsion Systems*, by Peng Zheng, Jianjun Wu, Yu Zhang and Biqi Wu, International Journal of Aerospace Engineering vol. 2020, Article ID 8811847.

*FIG. 17*

TURBOMOLECULAR AIR-SCOOP FOR SATELLITE AIR-BREATHING ELECTRIC PROPULSION

PRIORITY

This application is a continuation, under 35 U.S.C. § 120, of U.S. patent application Ser. No. 17/970,376, filed 20 Oct. 2022, which claims the benefit, under 35 U.S.C. § 119(e), of U.S. Provisional Patent Application No. 63/270,273, filed 21 Oct. 2021, which is incorporated herein by reference.

TECHNICAL FIELD

This disclosure relates generally to satellite propulsion.

BACKGROUND

The availability of cheaper launch services has marked rapid development of the space economy. Two types of services, satellite broadband communication and earth observation (EO), are receiving significant investments from both commercial and government sectors. While geostationary earth orbit (GEO) and medium earth orbit (MEO) have been the first to be commercialized and more widely used, low earth orbit (LEO) is increasingly becoming a domain of commercial and military competition. Satellites flying closer to the earth have multiple economic and military advantages. They can provide higher-resolution EO platforms for optical and electromagnetic surveillance, lower-latency communication networks, and agile distributed assets for military applications.

BRIEF DESCRIPTION OF THE DRAWINGS

FIG. 17 plots example efficiency as a function of angle and aspect ratio for each stage of an example optimized eight-stage TASC with geometry varied one stage at a time.

DESCRIPTION OF EXAMPLE EMBODIMENTS

Figure 1A:
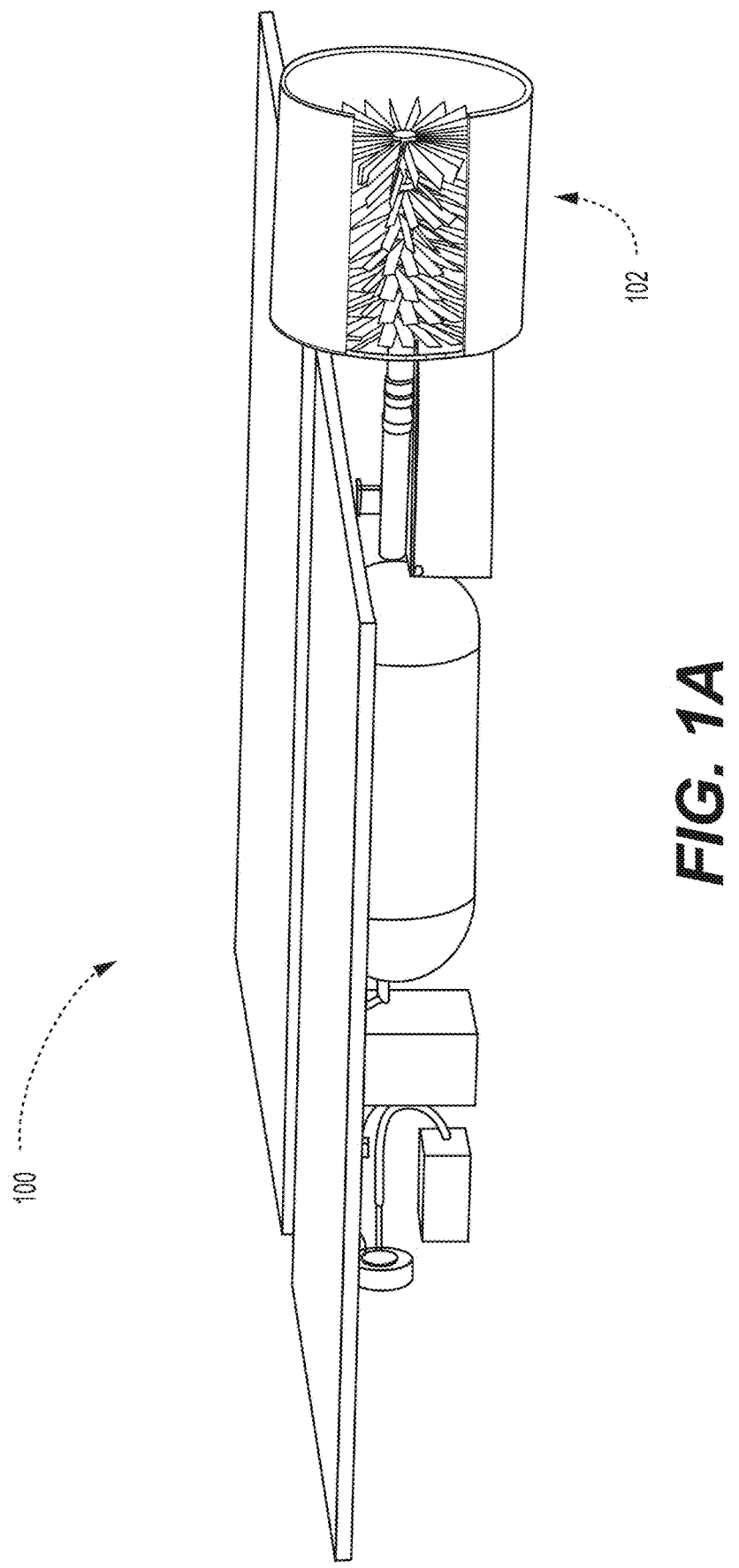
FIGS. 1A and 1B illustrate an example satellite with an example Turbomolecular Active air-SCoop (TASC).

Improvements in EO and broadband communication can be achieved by lowering orbital altitudes to between approximately 150 km and approximately 300 km, which may be called ultra-low earth orbit (ULEO). For example, a factor-of-two resolution improvement may be achieved by lowering the altitude of an EO satellite from approximately 500 km to approximately 250 km. Similarly, a lower orbit may reduce communication latency, increase communication bandwidth, reduce antenna-size requirements, and decrease power requirements. However, as orbital altitude is decreased, atmospheric drag may require increased propulsion capabilities.

Herein, reference to GEO may encompass orbital altitudes at approximately 35,786 km. Reference to MEO may encompass orbital altitudes generally between approximately 35,786 km and approximately 2,000 km. Reference to LEO may encompass orbital altitudes generally between approximately 2,000 km and approximately 450 km. Reference to very low earth orbit (VLEO) may encompass orbital altitudes generally between approximately 450 km and approximately 300 km. Reference to ULEO may encompass orbital altitudes generally between approximately 300 km and approximately 150 km. In particular embodiments, these orbital zones may be distinct from each other. In particular embodiments, these orbital zones may overlap with each other, at least in part, where appropriate. As an example, an orbital altitude of approximately 300 km may be considered ULEO, VLEO, or both, where appropriate. As another example, an orbital altitude of approximately 450 km may be considered VLEO, LEO, or both, where appropriate. As yet another example, an orbital altitude of approximately 2,000 km may be considered LEO, MEO, or both, where appropriate.

Particular embodiments facilitate satellite propulsion for substantially sustainable satellite operation at ULEO. In addition, particular embodiments may facilitate operation of a refuellable space tug. In particular embodiments, rarified air is harvested to provide a substantially continuous source of propellant for an electric propulsion (EP) thruster powered by an on-board solar array. Particular embodiments combine (1) one or more solar-arrays for electric power, (2) one or more electric thrusters that ionize and accelerate collected air, creating thrust, and (3) one or more efficient air-scoops that collect and compress atmospheric gas to feed the electric thruster(s). Particular embodiments may provide for two efficient air-scoops with rotations in opposite directions to ensure gyroscopic balance. Particular embodiments may also add a propellant tank to the system to allow excess propellant storage for later use. Particular embodiments may provide an efficient air-scoop that is capable of collecting a relatively high percentage of incident orbital air and compressing it to relatively high densities to allow more efficient ignition and operation of one or more electric thrusters.

Particular embodiments provide a Turbomolecular Active air-SCoop (TASC) that may be used in air-breathing EP. A TASC may expend energy to collect and compress incoming orbital particles and may include a cylinder opened on one end, with one or more relatively small outlets on the other end, and a number of rotating-blade stages positioned serially, one behind the other. In particular embodiments, a stage is a set of blades, arranged azimuthally, that have the same blade parameters. The blades in a stage may be uniform with respect to each other. A stage may, but need not necessarily, be aligned with and connected to one or more other stages. Particular embodiments may include fixed-blade stages (stators) interlaced with rotating stages (rotors) or sets of counter-rotating stages. Each stage may be individually designed to have blade angles and blade width such that the TASC is capable of producing over approximately 80% collection efficiency at a compression ratio above approximately 10,000 while operating on orbital-speed particles (approximately 7,800 m/s). Although particular collection efficiencies and particular compression ratios are described herein, this disclosure contemplates any suitable collection efficiencies and any suitable compression ratios. In particular embodiments, a TASC may be combined with a Hall Effect Thruster (HET) or a Gridded Ion Thruster (GIT) able to produce enough thrust to overcome atmospheric drag (e.g. at least a few mN) and high specific impulse of at least approximately 1,500 seconds. Although particular thrusters are described and illustrated herein, this disclosure contemplates any suitable thrusters, where appropriate. Herein, reference to an air-scoop may include a TASC, and vice versa, where appropriate.

Particular embodiments provide a TASC that is configured to substantially optimize the collection and compression of atmospheric particles when flying at orbital velocities (e.g. between 7-8 km/s) in LEO. This may allow an air-scooping electric thruster system to successfully reach "break even" performance. In particular embodiments, break-even performance is the performance of the air-scooping electric-thruster system when it is capable of producing more thrust than drag experienced on a space vehicle. In particular embodiments, such a TASC includes a series of stages of blades that form a rotor that is spun at substantially high rotation speeds. In particular embodiments, this rotor may be spun with a brushless electric motor. The TASC may collect atmospheric air more efficiently than non-active collection schemes and mechanisms that do not expend energy to improve collection efficiency. The TASC may compress atmospheric air more efficiently than non-active scoops that do not expend energy to improve performance.

In particular embodiments, the collection efficiency ($\eta_s$) of incoming air particles and the compression ratio ($r_s$) of the captured air particles are performance parameters of the TASC that are substantially optimized. These performance parameters may be optimized by controlling one or more of the following design parameters:

Blade angle—This is the attack angle of the blades of a stage of the TASC. At 90 degrees, the blades are vertical. At zero degrees, the blades are flat.

Blade aspect ratio—This is the ratio between the width of a single blade and the separation between two blades within a stage.

Rotation speed—Faster blade speed ensures greater particle capture. Each stage may spin on a single axis at a single speed.

Number of stages—Each stage may be given different sets of blade angles and aspect ratios.

Stage offset—Each stage may be offset azimuthally with respect to a previous stage to increase total transparency of the incoming orbital stream to all stages. Blade alignment may be set so that an orbital particle that transmits through the first stage is likely to be transmitted through all stages.

System size—A larger radius system will have higher blade-tip speeds. This may improve the performance of the TASC, but may consume more power.

Inlet-size to outlet-size ratio—A smaller outlet ensures higher compression at the expense of capture efficiency, and vice versa.

Although controlling for particular performance parameters is described and illustrated herein, this disclosure contemplates controlling for any suitable performance parameters. Moreover, although particular optimizations are described and illustrated herein, this disclosure contemplates any suitable optimizations.

In particular embodiments, a TASC may be designed via a one-dimensional (1D) analytical formulation for TASC performance with the following set of assumptions in the analytical formulation:

Analysis is 1D along the TASC axis and based on overall flux conservation.

Particles enter the TASC at orbital velocity $v_o$ substantially monoenergetically. The thermal component of the velocity is ignored. It is estimated that particles will have temperature around 1000° C., which corresponds to $S=v_o/v_{to}\sim10$.

The TASC will include N stages of blades, and each stage will move with substantially the same velocity, $v_b$. This velocity will be calculated assuming a cylindrical turbo pump rotating with rotation speed $\omega_{rpm}$ with particles interacting with the blades at the mean radius, $r=(\frac{2}{3})r_{in}$, with $r_{in}$ being the inlet radius of the TASC.

All surface scattering is substantially diffuse with substantially perfect energy accommodation. All scattered particles take on a velocity $v_t=\sqrt{8k_bT/\pi m}$, where $k_b$ is Boltzmann constant, T is the temperature of the turbo compressor walls, and m is atom mass.

Particle recombination, such as $O+O=O_2$, is ignored.

Between each stage, thermalized particles experience a
conductance loss based on Clausing factor estimates for
the assumed geometry.

Although particular assumptions are described and illustrated herein, this disclosure contemplates any suitable
assumptions. Moreover, although particular analytical formulations are described and illustrated herein, this disclosure contemplates any suitable analytical formulations.

When optimizing a TASC via the analytical 1D model, the
performance of each stage may be estimated by calculating
the probability that particles of given speeds and directions
will pass through the stage in either the forward or backwards direction. These performance values may be placed
into a probability matrix for particle transmission for each
stage in the TASC. By chaining the probabilities in matrix
form together, a calculation of the complete TASC collection
efficiency and compression ratio may be obtained. The
probability of particles passing through each stage of blades
may be calculated approximately by first determining the
transmission probabilities of particles through each stage.
Cartesian geometry in which blades of width $\ell$ are spaced
by distance h at an angle $\theta$ and move in y direction, which
is shown as vertical in FIG. 10 (described below), may be
assumed. The probability of a fast particle moving with
velocity $v_o$ striking a stationary ($v_b=0$) blade is $\ell \cos \theta/h$.
When stationary, the particle will strike the backward facing
side of the blade. In particular embodiments, as blade speed
increases, the probability of a strike first decreases. Once the
blade speed is sufficiently fast, particles tend not to strike the
backward facing side of the blade and, instead, begin to
strike the forward facing side of the blades. At this point,
increasing blade speed increases the probability of a strike.

Assume a slowly moving blade, so that particles will
always strike the backward-facing side. In this circumstance,
the moving blade reduces the probability of a strike by $v_b$
$\tau/h$, where the dwell time within the stage $\tau$ can be computed
from the blade angle and particle speed, $v_o t = l \sin \theta$. Thus,
the probability of a particle moving a slow moving blade is $$p_{st}^f = \frac{\ell \cos \theta - \cot \gamma \, \ell \sin \theta}{h} \qquad (1)$$

$$= \frac{\ell}{h} \sin \theta (\cot \theta - \cot \gamma),$$

where angle $\gamma$ is defined such that $\cot \gamma = v_b/v_o$. This $\gamma$ is the
angle at which particles enter the stage in the frame of
reference of the moving blades, and the assumption that the
blades are slowly moving is substantially equivalent to
assuming $\gamma \geq \theta$. When $\gamma = \theta$, the particles enter the stage
aligned with the blades and the probability of a strike goes
substantially to zero. On the other hand, when $\gamma \leq \theta$, the
entering particles will strike the forward facing sides of the
blades, which corresponds to proportionally faster blade
speeds than the previous case. Calculating the probability
that entering particles strike the forward-facing sides in this
case, it may be seen that the result in this calculation is that
the two cotangents simply switch signs:

$$p_{st}^f = \begin{cases} \frac{\ell}{h} \sin \theta (\cot \theta - \cot \gamma), & \gamma > \theta \\ \frac{\ell}{h} \sin \theta (\cot \gamma - \cot \theta), & \gamma < \theta \end{cases} \qquad (2)$$

-continued $$= \frac{\ell}{h} \sin \theta |(\cot \theta - \cot \gamma)|,$$

where $(\theta, \gamma) \epsilon \{0, \pi/2\}$.

By combining the calculated probabilities of striking a
stage of blades with the emission distribution of particles
that collide, a complete description of the particle transmission probability for each stage may be obtained for particles
traveling both into and out of the full TASC configuration.
In turn, this allows for a calculation of particle collection
efficiency and compression ratio in the following formula:

$$\eta_s = \frac{\psi_{out}^{+s}}{\psi_0^f}, \qquad (3)$$

$$r_s = \frac{n_{out}}{n_0} = \frac{A_{in}}{A_{out}} \frac{v_0}{v_t} \frac{\psi_{out}^{+s}}{\psi_0^f}, \qquad (4)$$

where $$\psi_0^f$$

is the flux of particles entering the TASC, $$\psi_{out}^{+s}$$

is the flux of particles that are captured by the TASC
according to the transmission probabilities of the combined
analytical model, $A_{in}$ is the area of the inlet of the TASC, and
$A_{out}$ is the area of the outlet of the TASC.

In particular embodiments, some of the performance
parameters described above may be fixed and some may be
allowed to vary. Those performance parameters that are
variable may be optimized to maximize the performance of
the TASC in terms of $\eta_s$ and $r_s$. In particular, embodiments,
system size and inlet and outlet size may be constrained by
the full space-vehicle requirements. In particular embodiments, the blade angles, aspects ratios, and number of stages
may be varied to substantially optimize TASC performance.

In particular embodiments, a TASC's performance may
be optimized with particular design decisions for blade
angles and aspect ratios for each series of stages in the
TASC. In particular embodiments, a TASC performance
may be improved by varying other design parameters within
other constraints of the system. The following are example
design decisions that may, in particular embodiments, facilitate optimization of a TASC's performance:

To limit air-particle losses and maximize air particle
collection, the first stage of blades should be placed as
close to the inlet plane as possible.

The total collection of stages of blades should be oriented
so that on the whole, the system of blades maximizes
the transparency of particles that enter the scoop and
minimizes the losses of particles back out of the scoop.
In practice, this may require approximately that the first
stages of blades should be designed for maximum
transparency to the incoming particles (to allow them to
enter the turbomolecular air scoop) and the later stages
of blades should be designed to minimize losses of particles that have been captured. In between stages may be oriented in hybrid configurations.

The angle of the first stage of blades should be oriented to maximize transparency of particles at the orbital speed. This is accomplished by comparing the orbital speed at the altitude of flight, typically near 7800 m/s to the velocity of the blades created by the rotation speed of the turbomolecular air-scoop rotor and the radius length of the blade. The angle formed by these two speeds is the optimal angle of the blades to maximize transparency. This optimal angle, $\gamma$, is defined by cot $\gamma = v_b/v_o$, where $v_b$, the blade velocity, is the product of the rotor angular rotation frequency, $\omega$, and the blade radius, $v_b = \omega r_b$, and $v_o$ is the orbital velocity (and thus the average velocity that particles enter the first stage of blades of the turbomolecular scoop.

The aspect ratio of the first stage of blades should be as wide as possible to maximize the chance of recapture of particles lost by the later stages. This width may be limited by practical concerns in particular embodiments.

The middle stages of blade should be oriented to simultaneously allow some transparency to fast moving air particles while minimizing the transparency to back streaming particles that have thermalized within the scoop. This requires a shallower blade angle to ensure some retention against lost particles. Since the shallower blade angle is not perfectly transparent to high velocity particles, this requires a blade aspect ratio that is shorter to ensure good transparency.

In particular embodiments, the middle stages should be oriented with an angle that allows maximum transparency of particles that have thermalized during the first stage. This may be calculated similarly to the calculation for fast moving particles, such that an angle, $\delta$, can be chosen such that by cot $\delta = v_b/v_t$. In particular embodiments, this angle may vary during the optimization process depending on the number of stages used and other parameters.

The final stages should be oriented to maximize particle retention and compression of the captured air, thus requiring a smaller blade angle than the first and middle stages. These stages do not need to be optimized to be maximally transparent to high-speed incoming particles because most collected particles will thermalize before these stages.

The entire series of stages of blades for the rotor may be optimized together to substantially maximize both the collection efficiency and the compression ratio of this system.

In particular embodiments, increasing the rotation speed of the rotor will improve the TASC collection efficiency and compression ratio. When blade angles and aspect ratios have been optimized for a given performance speed, a TASC performance will not increase substantially for rotations speeds above the optimization point. Therefore, it is imperative to optimize the TASC geometry for its designed rotation speed.

Figure 19:
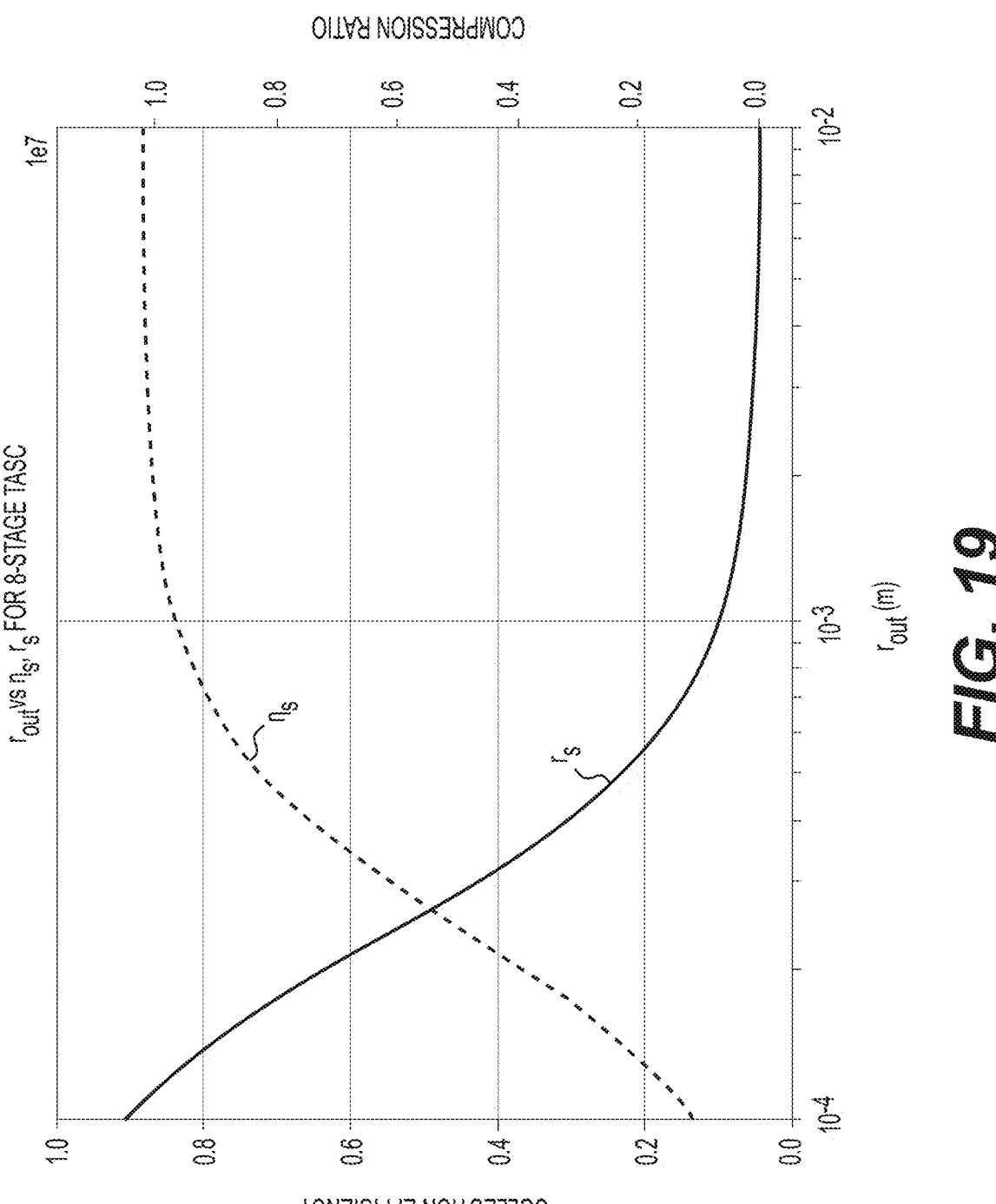
FIG. 19 illustrates example air-scoop efficiency and compression ratio as functions of outlet radius for an example eight-stage TASC.

In particular embodiments, TASC performance depends on the size of the outlet hole that transmit captures air to the propellant line and rest of the propellant flow system. A large outlet hole will allow for better capture of collected air at the expense of compression ratio. A small outlet hole will increase the compression of the system at the expense of collection efficiency. FIG. 19 illustrates an example eight-stage TASC with $\theta_s$ and $\alpha_s$ substantially optimized for $r_{in} = 0.25$ m, $r_{out} = 0.0015$ m, and $\omega_{rpm} = 60,000$ rpm, with fixed $\omega_{rpm}$, $\theta_s$, $\alpha_s$ and plots of $\eta_s$ and $r_s$ versus varying $r_{out}$. The eight-stage system in the example of FIG. 19 is substantially optimized to operate at approximately 60,000 rpm. As output area increases, collection efficiency improves at the expense of compression ratio. For a substantially optimized version of an eight-stage TASC system, a small $r_{out} = 0.0015$ m may be chosen to reflect the small tubing size that is typically used in the thruster plumbing.

Although particular performance parameters, particular optimizations, particular design decisions, particular design parameters, and particular constraints are described and illustrated herein, this disclosure contemplates any suitable performance parameters, any suitable optimizations, any suitable design decisions, any suitable design parameters, and any suitable constraints.

Figure 1B:
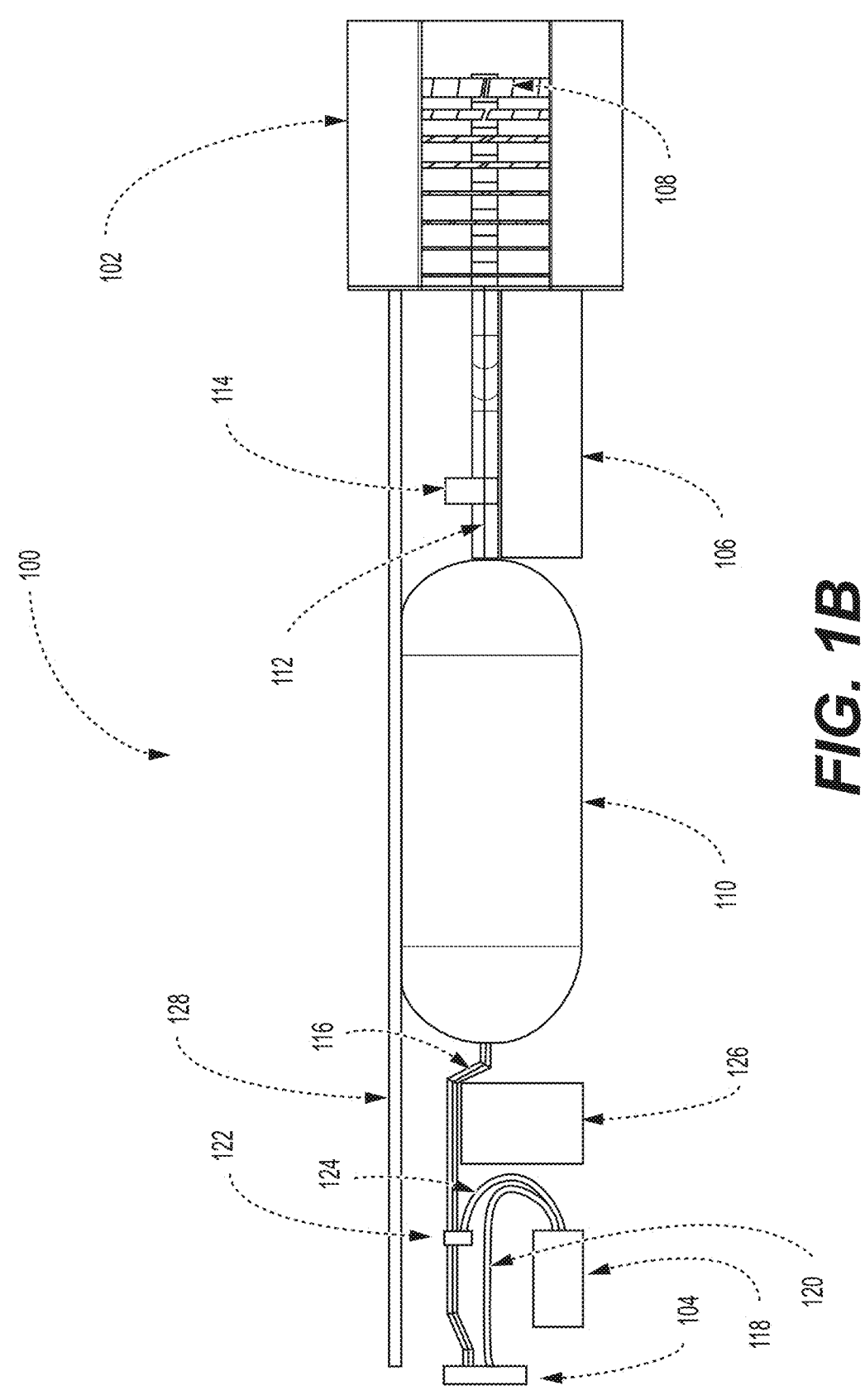

FIGS. 1A and 1B illustrate an example satellite 100 with an example TASC 102. Although a particular satellite with particular components (including a particular air-scoop) in a particular arrangement is described and illustrated, this disclosure contemplates any suitable satellite with any suitable components (including any suitable air-scoop) in any suitable arrangement. In addition, FIGS. 1A and 1B are not necessarily to scale.

FIG. 1A provides a first view of satellite 100, with the cylinder of TASC 102 illustrated with a cutaway to show the blades of TASC 102. FIG. 1B provides a second, side view of satellite 100, also with the cylinder of TASC 102 illustrated with a cutaway) with components of satellite 102 indicated with reference numbers. The example satellite in FIGS. 1A and 1B includes one or more electric thrusters 104. In particular embodiments, one or more TASCs 102 collect and compress air or other chemical compounds present to be stored for later use or immediately used in electric thruster 104. In particular embodiments, electric thruster 104 produces thrust by converting electric energy into kinetic energy in the propellant and is capable of utilizing a variety of chemical elements and compounds. In particular embodiments, electric thruster 104 operates on air or other chemical elements or compounds either collected or stored on board satellite 100. In particular embodiments, electric thruster 104 includes an electric-thruster cathode that may operate on air and other collected chemical elements and compounds. In particular embodiments, microwave cathodes, radio-frequency (RF) cathodes, electride cathodes, or other oxygen-compatible cathodes may be used to reduce or eliminate oxygen poisoning. In particular embodiments, it may be useful to operate the electric-thruster cathode on xenon or other chemical elements to address this issue.

Satellite 100 includes an example TASC 102 coupled to a TASC controller 106. In particular embodiments, TASC controller 106 includes one or more computers that control operation of TASC 102, such as, for example, controlling the rotation speeds of one or more blades 108 of TASC 102. Satellite 100 also includes a propellant tank 110 coupled to TASC 102 by a propellant inlet line 112 with an inlet valve 114. Propellant tank 110 is also coupled to electric thruster 104 by a propellant outlet line 116. Electric thruster 104 is also coupled to a power processing unit (PPU) 118 by a power-line harness 120. PPU 118 is also coupled to a flow controller 122 on propellant outlet line 116 by a flow-controller cable 124. In particular embodiments, PPU 118 provides power conditioning, discharge supply, and control for electric thruster 104 and flow controller 122. PPU 118 may also provide fault protection for satellite 100. Satellite 100 also includes a payload 126, which may include hardware, software, or other equipment for satellite broadband communication, EO, or other functions. The satellite also includes one or more solar array(s) 128 that provide power to satellite 100.

Figure 2A:
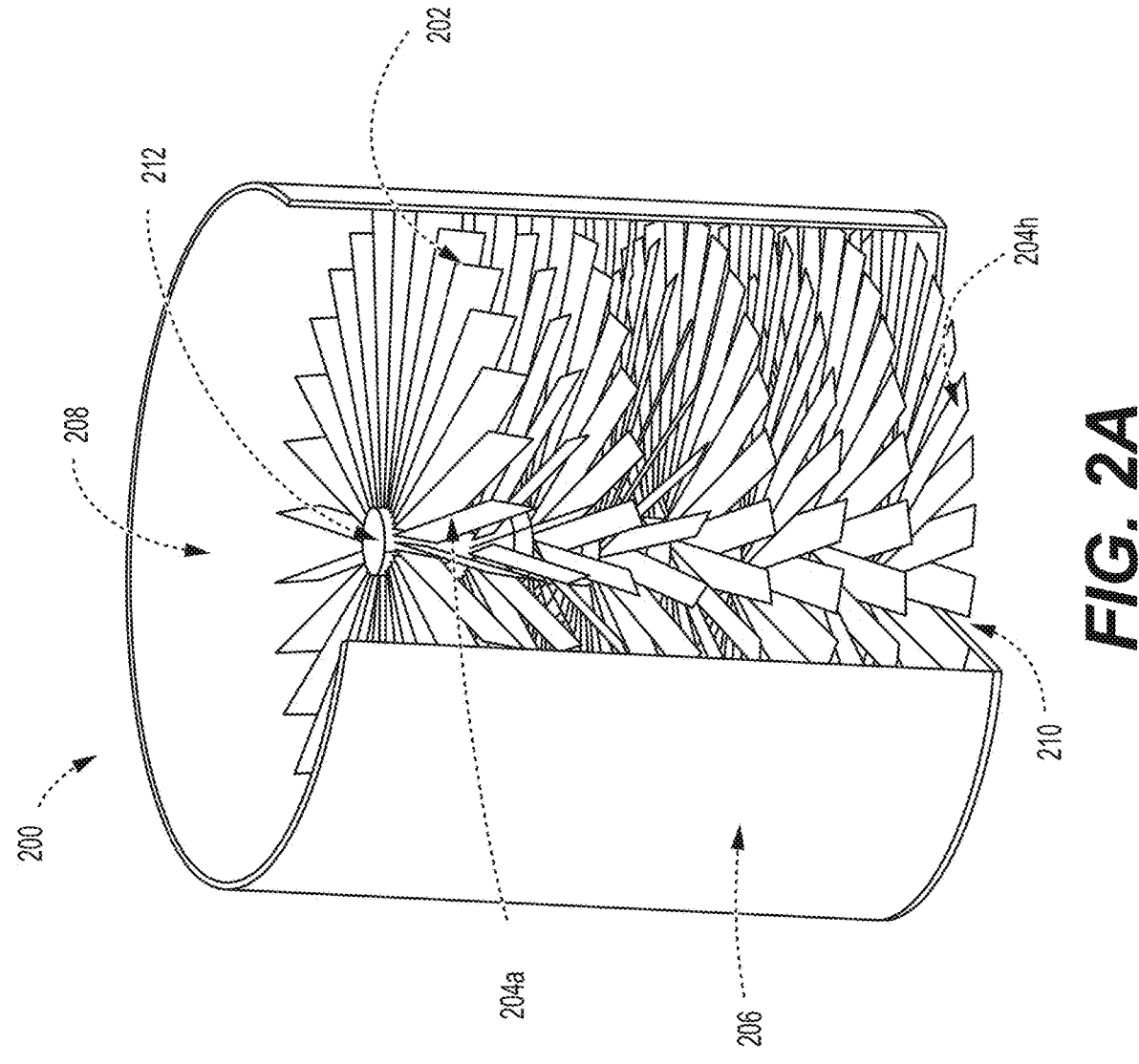
FIGS. 2A, 2B, and 2C illustrate an example TASC.
Figure 2B:
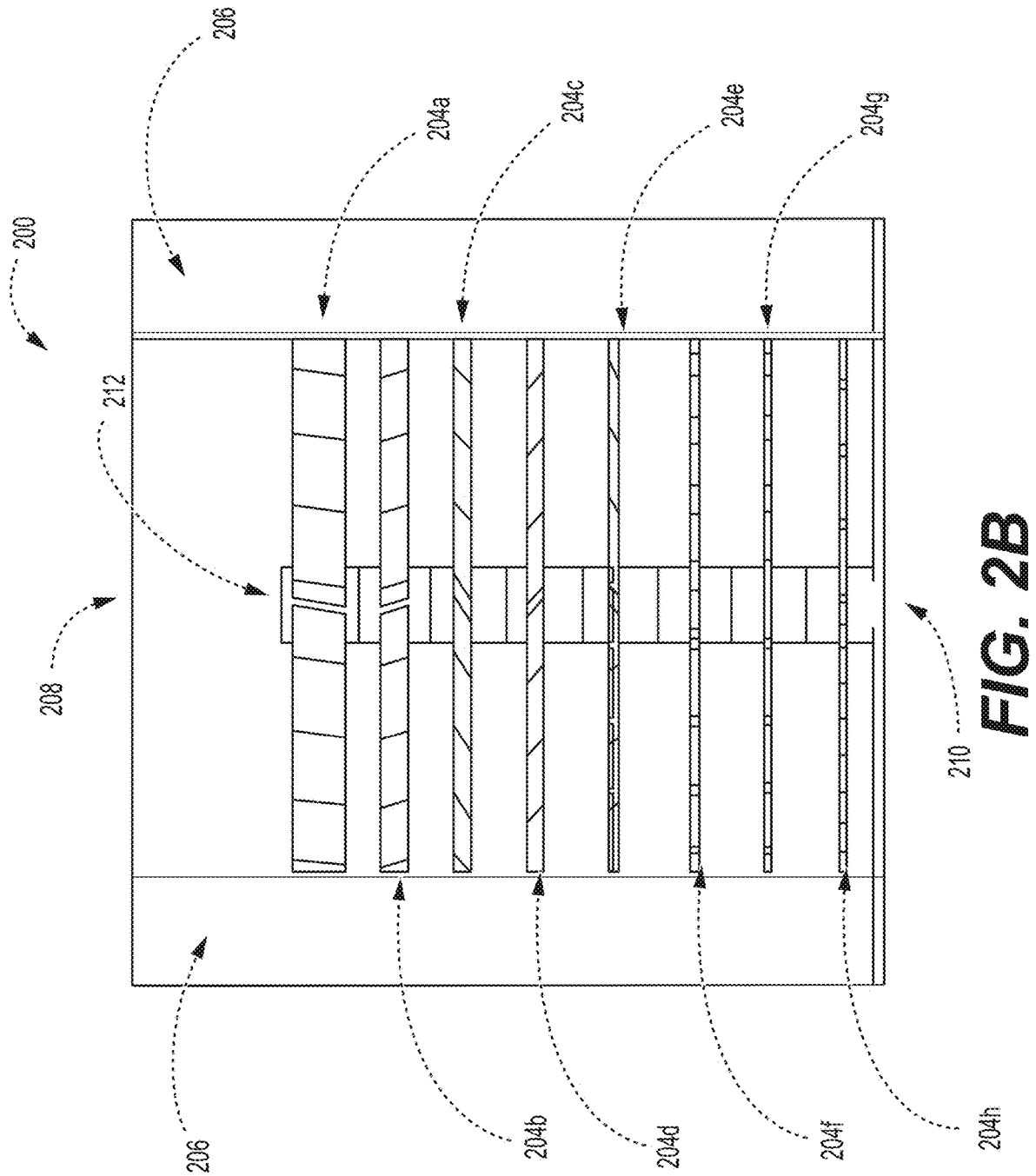
Figure 2C:
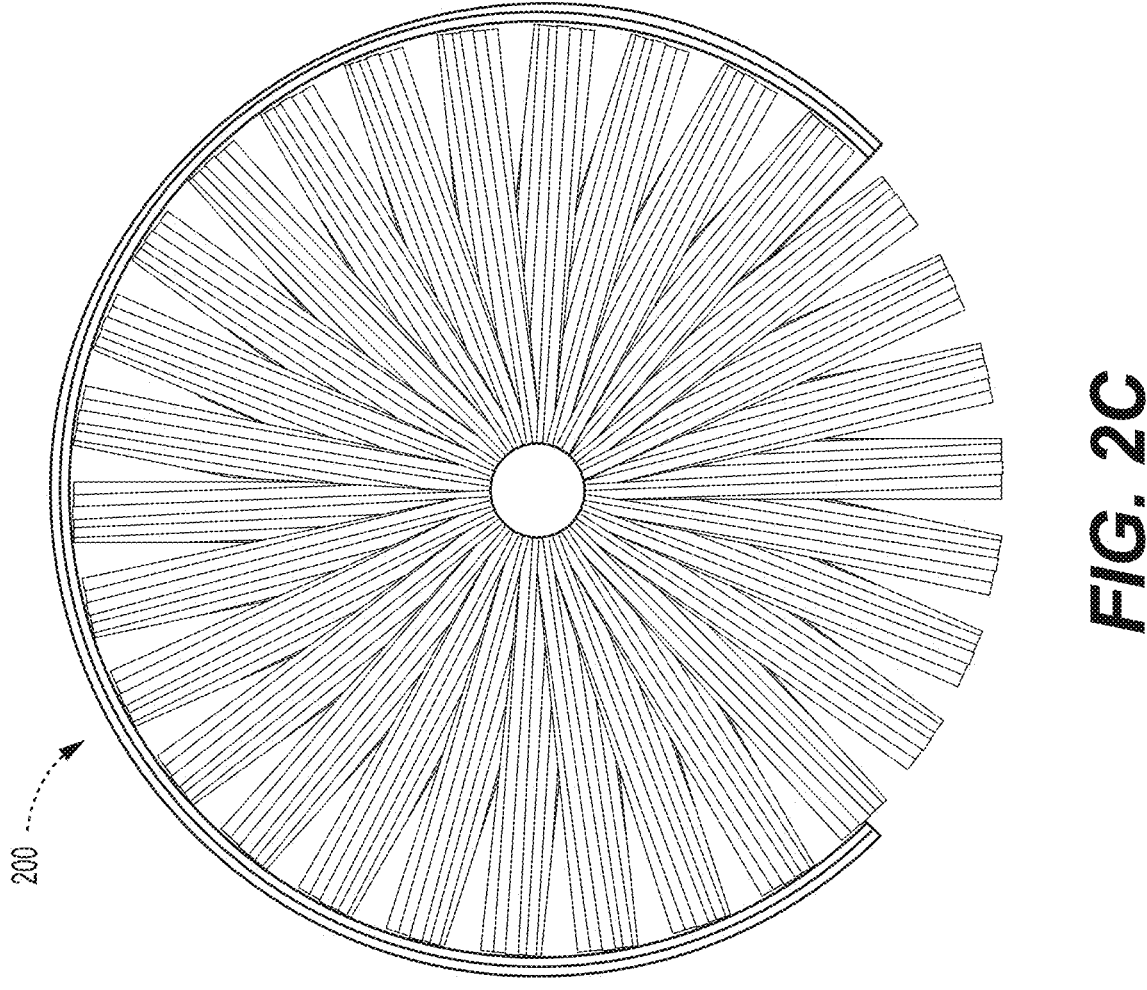

FIGS. 2A, 2B, and 2C illustrate an example TASC 200. FIG. 2A provides a first view of TASC 200 with its cylinder illustrated with a cutaway to show blades 202 of TASC 200. FIG. 2B provides a second, side view of TASC 200, with the same cutaway. FIG. 2C provides a third view looking into the opening of TASC 200, also with the same cutaway. FIGS. 2A, 2B, and 2C are not necessarily to scale. In the example of FIGS. 2A, 2B, and 2C, TASC 200 includes a cylindrical opening with multiple rotating-blade stages 206 that collect and compress atmospheric gas that streams into the opening at orbital velocity. Particular embodiments may include alternating clockwise (CW) and counter-clockwise (CCW) rotating stages 204. For example, stages 204a, 204c, 204e, and 204g may rotate CW and stage 204b, 204d, 204f, 204h may rotate CCW. TASC 200 ingests particles with orbital velocity (for example approximately 7,800 m/s) that may enter in near parallel trajectories, and blades 202 in TASC 200 have particular orientations and shapes at each stage 204 designed to facilitate collection and compression of high-speed atmospheric gas.

TASC 200 is formed by a cylindrical shell 206 constituting its main body. At the top, the shell is open and this forms an inlet 208 of the device. At the bottom, the shell is closed except for an outlet hole 210 through which collected air is fed into a thruster or propellant tank. An axial shaft 212 driven by one or more motors, which are not shown, constitutes a common connection point for rotating stages 204. One or more of these motors may be brushless electric motors. Attached to axial shaft 212 are rotor stages 204, each designed to substantially maximize collection and compression, as described below. Non-moving stator stages may be placed between rotor stages 204. These stators may be substantially optimized, as described below, to reduce azimuthal velocity of the gas while allowing fast moving orbital-speed particles to pass through efficiently.

To help balance gyroscopic forces on the spacecraft, two TASCs, designed to spin in opposite directions but otherwise substantially identical to each other, may be placed side by side. In particular embodiments, the rotation speed of one or more TASCs may be controlled to use gyroscopic moments for space-vehicle attitude control. Alternatively, in particular embodiments, a single TASC with two counter-rotating sets of blades may be used. The TASC may include two counter-facing motors, with one at the front of the inlet and the other behind the cylindrical chamber. These motors may independently spin blades connected to the shaft and blades connected to the cylinder walls in opposite directions. The rotation speeds may be set so that the net angular momentum of the two rotating systems may be controlled. The counter-rotors may be designed according to the same principles as the rotors, which are described below.

The blades for each stage in the TASC may have a particular angle and aspect ratio. In particular embodiments, the angles and aspect ratios of the rotors cause the rotors to collectively appear substantially transparent to the orbital-speed particles entering the TASC, while simultaneously trapping the back-streaming particles and preventing them from escaping. As described below, this may be accomplished by fixing the angles to be very high for the first stage(s). For the first stage(s), this angle is set to substantially match the angle formed by the expected velocity of the incoming orbital particles and the velocity at which the blades move (set by the rotation speed and radial position of the blade). For example, if the rotors rotate at 60,000 rpm and are 25 cm in length, they may be angled at 79 degrees. Because the tips of the blades move faster than the inner portion, this angle may be varied along the length of the blade. While these specific angles may be applicable for the given example, other appropriate angles may be contemplated for particular embodiments.

The blades in the last stage(s) may be designed with lower angles to trap the particles that impact the back of the TASC and are thus slowed down. The intermediate stage(s) of the TASC may be designed to balance transparency to fast incoming particles with opacity to back-streaming particles trying to escape the TASC. To do this, the blades of the intermediate stage(s) may be set to angles between those of the first and last stages. However, to facilitate greater collection of the fast-moving particles, the intermediate stage(s) may have lower aspect ratios (e.g. the blades may be narrower).

Figure 3A:
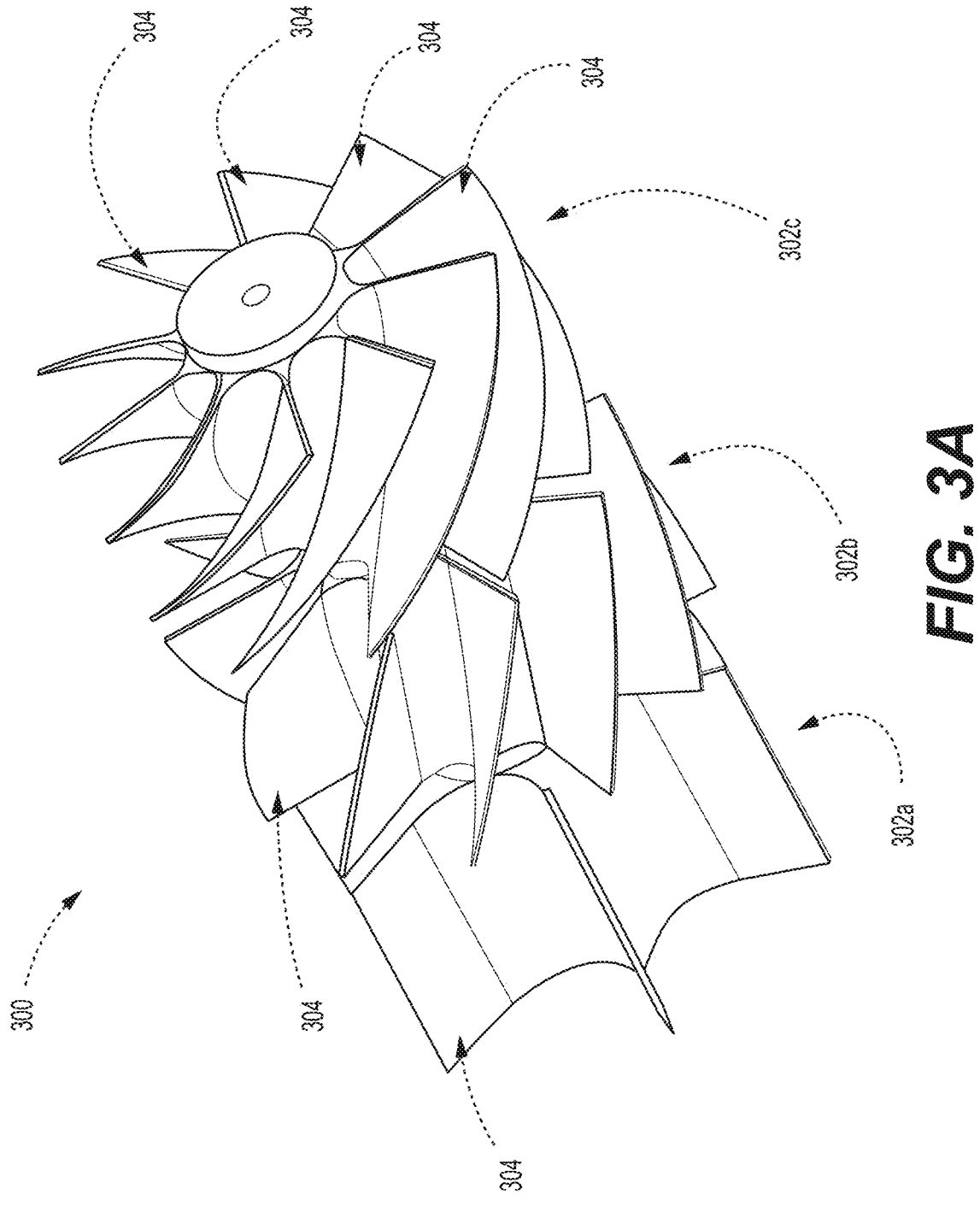
FIGS. 3A and 3B illustrate an example rotor for an example three-stage TASC in which blade angle varies along the radial length of each stage to form a helical geometry.
Figure 3B:
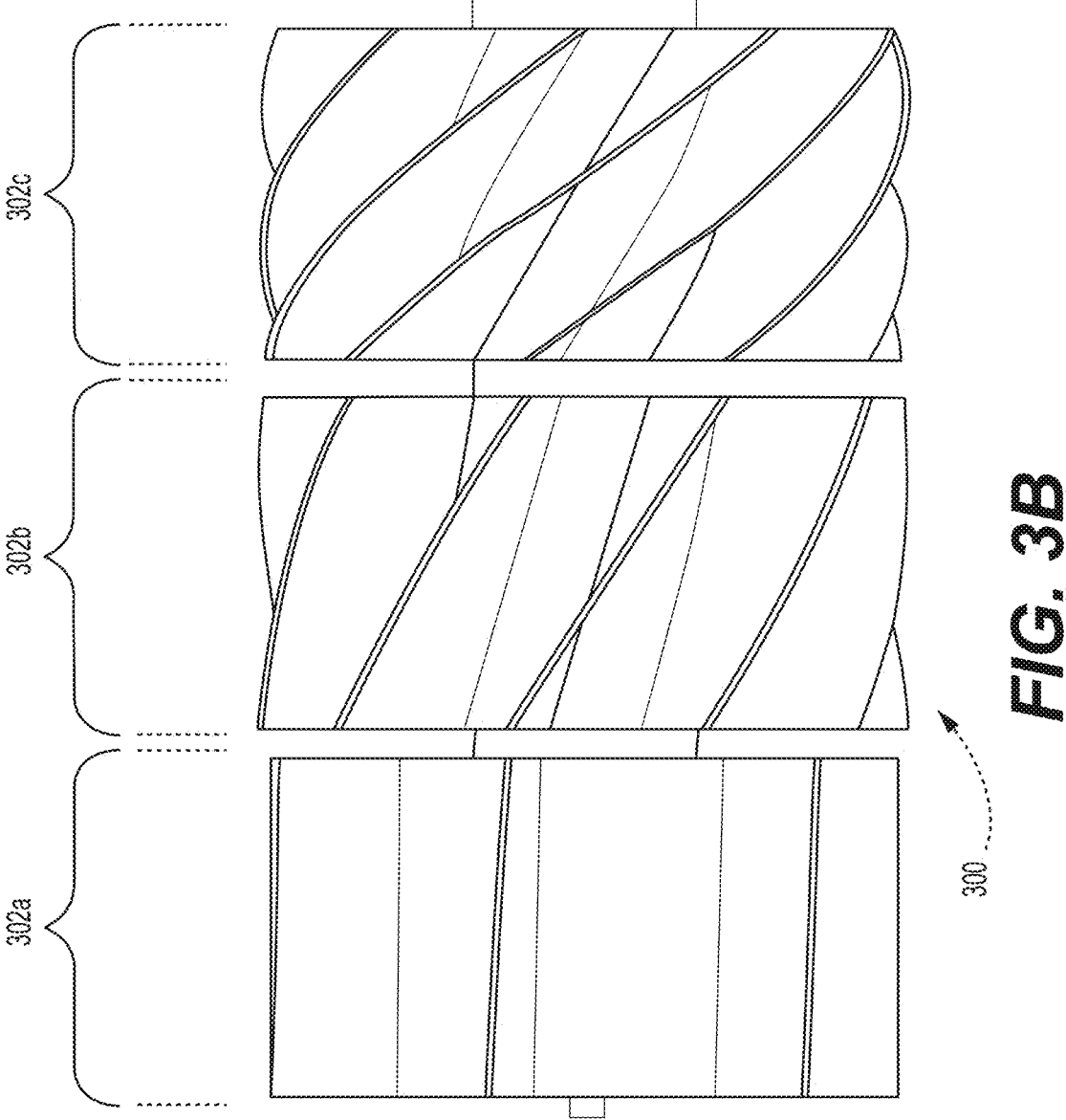

In particular embodiments, the blades of any given stage may have their angle and aspect ratio vary along the radial length of the blades to account for variation in effective linear velocity of the blades as they rotate in the cylindrical geometry. FIGS. 3A and 3B illustrate an example rotor 300 for an example three-stage TASC in which blade angle varies along the radial length of each stage 302 to form a helical geometry. FIGS. 3A and 3B are not necessarily to scale. In the example of FIGS. 3A and 3B, rotor 300 includes three stages 302 that each include multiple blades 304. Stage 302a is positioned toward a front of rotor 300 and, when installed, would be closest among stages 302 to an air inlet of the TASC and farthest among stages 302 from an air outlet of the TASC. Stage 302c is positioned toward a back of rotor 300 and, when installed, would be farthest among stages 302 from the air inlet of the TASC and closest among stages 302 to the air outlet of the TASC. Stage 302b is an intermediate stage 302 positioned between stages 302a and 302c.

Figure 4A:
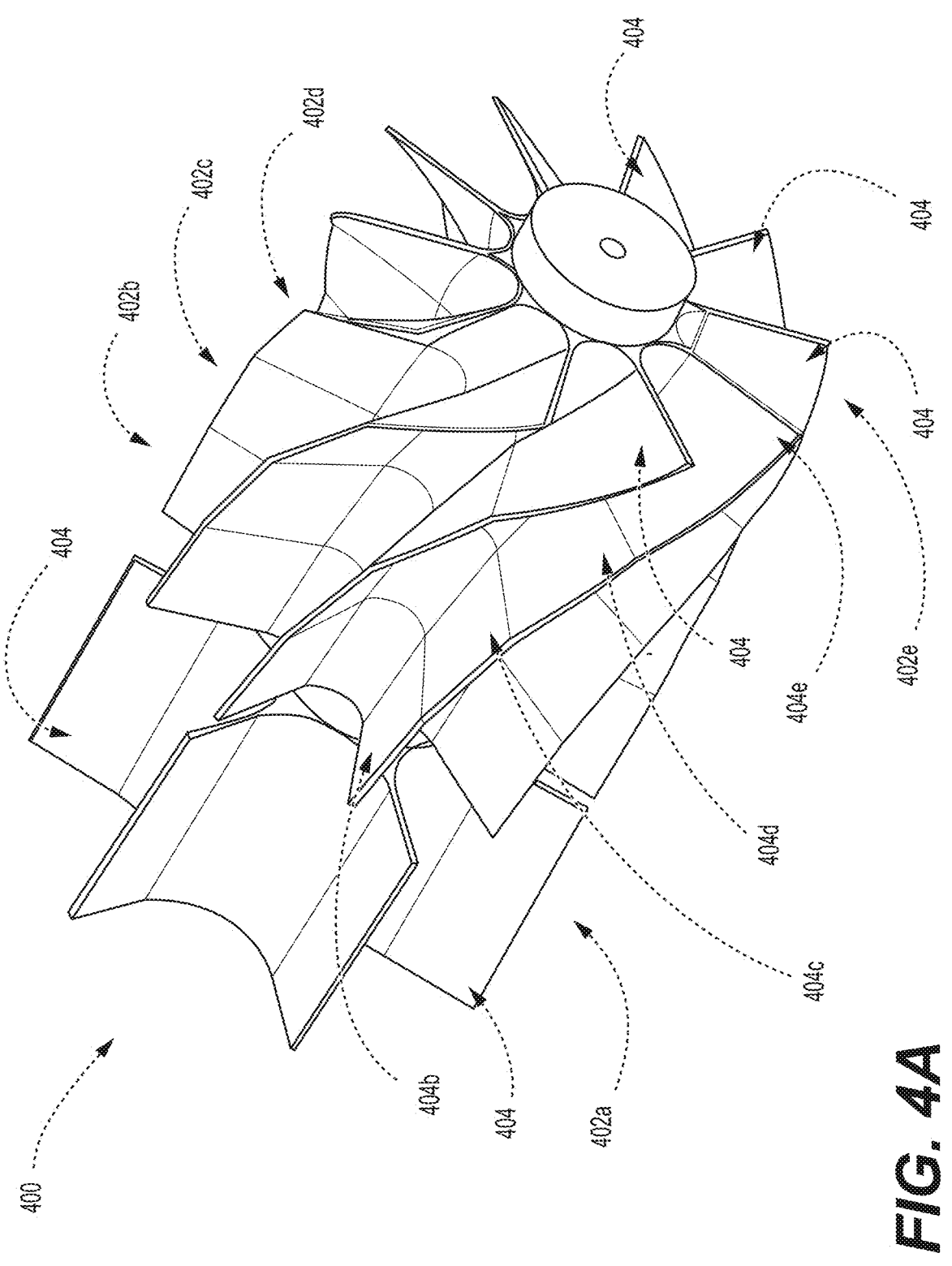
FIGS. 4A and 4B illustrate an example rotor for an example five-stage TASC in which the second, third, fourth, and fifth stages are aligned and connected.
Figure 4B:
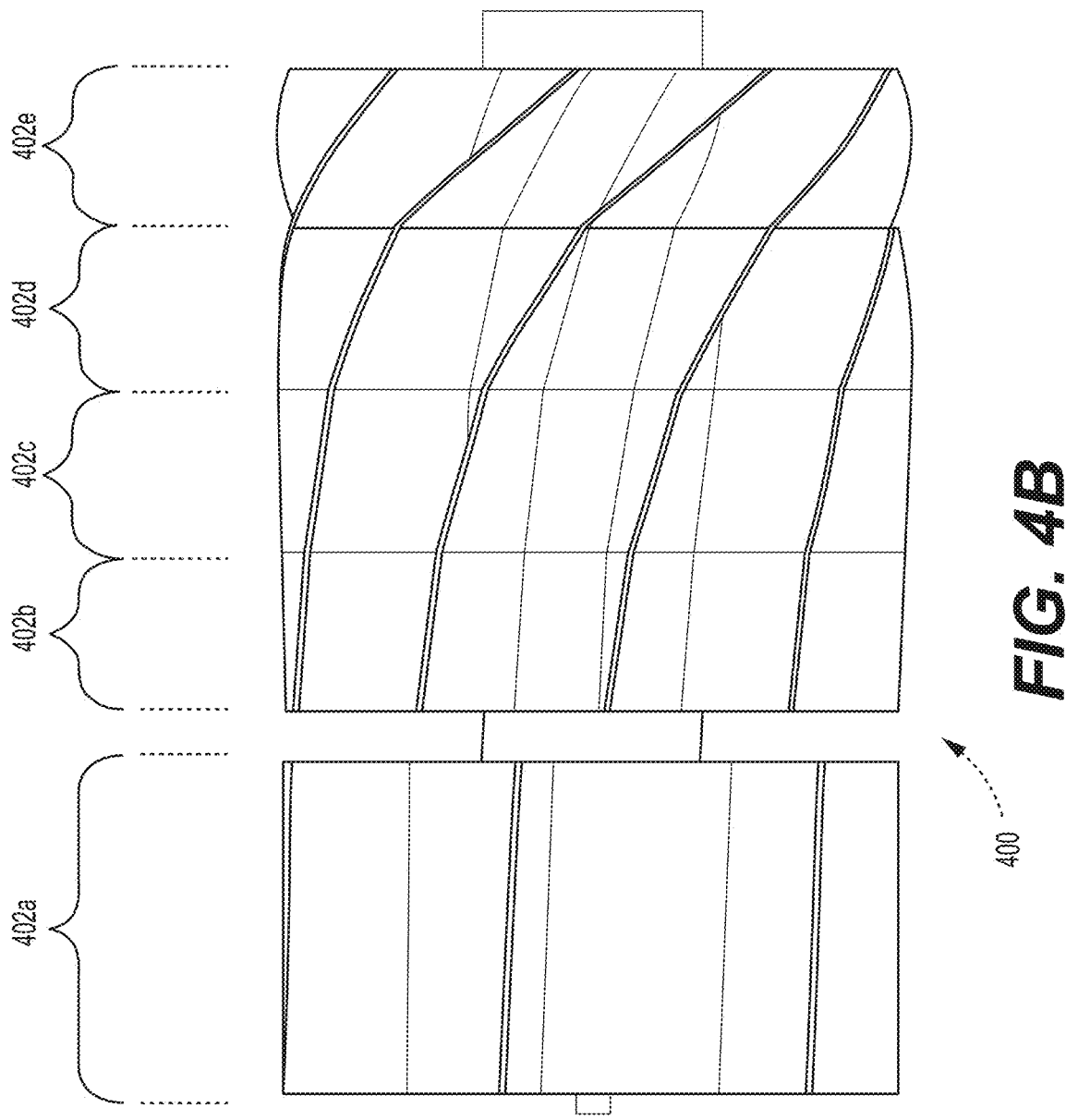

In particular embodiments, multiple stages may be connected so that individual blades of a given stage are contiguous with a corresponding blade on an adjacent stage. Such a configuration may be equivalent to setting the axial spacing between two stages to approximately zero and adjusting the rotational offset between the two stages so that the corresponding blades of the two stages are contiguous. Any suitable number of stages may be set to be contiguous in this manner (as shown in the example of 4A and 4B) to form sections of blades with varying blade parameters. In particular embodiments, a section includes either one stage or multiple stages that are aligned and connected. Adjacent sections may, but need not necessarily, be axially spaced from each other. Herein, reference to a stage may encompass a section, and vice versa, where appropriate. In particular embodiments, connected stages may be spaced a finite distance and rotational offset apart and the corresponding blades of adjacent and connected stages may be connected via a small extension of the stage to ensure contiguity of the blades. FIGS. 4A and 4B illustrate an example rotor 400 in which stages 402b, 402c, 402d, and 402e are aligned and connected. FIGS. 4A and 4B are not necessarily to scale. In the example of FIGS. 4A and 4B, rotor 400 includes five stages 402 that each include multiple blades 404. Stage 402a is positioned toward a front of rotor 400 and, when installed, would be closest among stages 402 to the air inlet of the TASC and farthest among stages 402 from the air outlet of the TASC. Stage 402c is positioned toward a back of rotor 400 and, when installed, would be farthest among stages 402 from the air inlet of the TASC and closest among stages 402 to the air outlet of the TASC. Stages 402b, 402c, and 402d are intermediate stages 402 positioned between stages 402a and 402e. Each blade of stage 402b is contiguous with a corresponding blade of stage 402c (e.g. blade 404b is contiguous with blade 404c); each blade of stage 402c is contiguous with a corresponding blade of stage 402b and with a corresponding blade of stage 402d (e.g. blade 404c is contiguous with blade 404b and with blade 404d); each blade of stage 402d is contiguous with a corresponding blade of stage 402c and with a corresponding blade of stage 402e (e.g. blade 404d is contiguous with blade 404c and with blade 404c); and each blade of stage 402e is contiguous with a corresponding blade of stage 402d (e.g. blade 404e is contiguous with blade 404d). Stage 402a may constitute a blade section of rotor 400, and stages 402b, 402c, 402d, and 402e may constitute another blade section of rotor 400. Herein, reference to a blade may encompass multiple connected blades, and vice versa, where appropriate. For example, blades 404b, 404c, 404d, and 404c may collectively referred to as a blade.

In particular embodiments, multiple stages that have been connected into a single contiguous section may be transformed from a series of discrete stages within a section, such as those show in FIGS. 4A and 4B, into a smoothly varying blade geometry where blade angle and aspect ratio may vary along the axial length of the connected section that approximates the discrete-stage configuration.

In the example of FIGS. 1A and 1B, the rotor of TASC 102 includes eight rotatable blade stages and eight rotatable blade sections. Each of those rotatable blade sections includes one rotatable blade stage. In the example of FIGS. 2A, 2B, and 2C, the rotor of TASC 200 includes four rotatable blade stages, four counter-rotatable blade stages, four rotatable blade sections, and four counter-rotatable blade sections. Each of those rotatable blade sections includes one rotatable blade stage, and each of those counter-rotatable blade sections includes one counter-rotatable blade stage. Reference herein to a rotatable blade stage may encompass a counter-rotatable blade stage, and vice versa, where appropriate. Reference herein to a rotatable blade section may encompass a counter-rotatable blade section, and vice versa, where appropriate. In the example of FIGS. 3A and 3B, rotor 300 includes three rotatable blade stages 302 and three rotatable blade sections. Each of those rotatable blade sections includes one rotatable blade stage 302. In the example of FIGS. 4A and 4B, rotor 400 includes five rotatable blade stages 402 and two rotatable blade sections. One of those rotatable blade sections includes rotatable blade stage 402a, and another one of those rotatable blade sections includes rotatable blade stages 402b, 402c, 402d, and 402e. Although particular rotors with particular blades, stages, and sections are described and illustrated herein (e.g. in FIGS. 1A, 1B, 2A, 2B, 2C, 3A, 3B, 4A, and 4B), this disclosure contemplates any suitable rotors including any suitable blades, stages, and sections.

Propulsion requirements for a satellite using air-breathing EP to maintain orbit may be derived as follows. The orbital velocity of a spacecraft circling the earth at an altitude h can be described as $$v_{orb} = \sqrt{\frac{GM_E}{R_E + h}}, \tag{5}$$

where G is the gravitational constant and $M_E$ and $R_E$ are the earth's mass and mean radius. At LEO, orbital velocity may be approximately 7,800 m/s. The drag force acting on the satellite $F_D$ is a function of the mean atmospheric density $n_{atm}$ and atomic mass m, orbital velocity, drag coefficient $C_D$, and the spacecraft cross-sectional area $A_{sat}$.

$$F_D = \frac{1}{2} m n_{atm} v_{orb}^2 (C_{D_{sat}} A_{sat}), \tag{6}$$

where m and $n_{atm}$ are altitude-dependent parameters. In particular embodiments, the air-breathing EP concept involves ingesting the incoming atmospheric flow through the inlet area $A_{in}$. The flow rate through the inlet $m_{in}$ is proportional to the mean atomic mass, atmospheric density, orbital velocity, and the inlet area according to the following relationship $$\dot{m}_{in} = m n_{atm} v_{orb} A_{in}, \tag{7}$$

and the total collected propellant is dependent on the air-scoop efficiency $\eta_s$ such that $$\dot{m}_c = \eta_s \dot{m}_{in}. \tag{8}$$

These relationships allow the expression for the drag force to be rewritten in terms of the collected mass flow:

$$F_D = \frac{\dot{m}_c v_{orb}}{2\eta_s} C_D, \tag{9}$$

where for simplicity, we have adopted $$C_D = C_{D_{sat}} \frac{A_{sat}}{A_{in}}. $$

In particular embodiments, to maintain orbit, the propulsion system should produce sufficient thrust to overcome the drag force expressed in Equation 9. Particular embodiments may do this by producing thrust continuously throughout the orbit. In that case, the flow rate through the thruster may be as high as the collected flow rate $\dot{m}_c$. Alternatively, in particular embodiments, a satellite may collect gas throughout the orbital period to store in an onboard propellant tank and only thrust during a short portion of the orbit. A duty-cycle parameter, $Q$, may be defined to represent the ratio of thruster on-off times, such that $\dot{m}_T = Q\dot{m}_c$, where for a thruster firing continuously, $Q = 1$. If a thruster is only fired for 10% of the orbit, $Q = 10$.

In particular embodiments, thrust necessary to overcome the drag force experienced during a single orbit may be defined as $$T > \frac{1}{2} Q \dot{m}_n v_{orb} C_D. \tag{10}$$

Using $T = \dot{m}\eta_T I_{sp}$, we get:

$$I_{sp} > \frac{v_{orb} C_D}{2g\eta_s}, \qquad (11)$$

where g is the earth gravitational acceleration and $I_{sp}$ is the specific impulse. Together, Equations 10 and 11 may be seen as imposing minimum performance requirements on a thruster. This requirement may be generic and applicable to any suitable air-breathing satellite system.

The power consumption of an EP device may be expressed in terms of thrust T, specific impulse $I_{sp}$, and thruster efficiency $\eta_t$, i.e., $$P_T = \frac{T g I_{sp}}{2\eta_t}. \qquad (12)$$

Using Equations 10 and 11, the power requirement for an air-breathing EP satellite may be derived as $$P_T > Q \frac{\dot{m}_{in} v_{orb}^2 C_D^2}{8\eta_t \eta_s}. \qquad (13)$$

The orbit-averaged power requirement may be written using equations above:

$$\langle P_T \rangle > \frac{\dot{m}_{in} v_{orb}^2 C_D^2}{8\eta_t \eta_s} = \frac{m n_{atm} v_{orb}^3}{8\eta_s \eta_t} C_D^2 A_{in}. \qquad (14)$$

The power produced by a spacecraft solar array may be computed as a product of the solar energy flux $\phi$, solar array area $A_{sa}$, and solar array efficiency $\eta_{sa}$ as $$P_{sa} = \eta_{sa}\phi A_{sa} = \phi_{sa} A_{sa}, \qquad (15)$$

where $A_{sa}$ may be larger than the front-projected satellite cross-sectional area, $A_{sat}$, and $\phi_{sa}$ is a maximum power produced by the solar arrays per unit area. The orbit-averaged available power may be written as $$\langle P \rangle = \eta_p \phi_{sa} A_{sa}, \qquad (16)$$

where $\eta_p$ is a geometric efficiency factor that takes into account eclipses and non-optimal pointing of the solar arrays. In a perfectly sun-synchronous dusk-dawn orbit $\eta_p=1$ and, in the worst-case eclipses and orientations, $\eta_p=1/\pi$.

Combining Equations 14 and 16 may produce $$\eta_s \eta_t > \frac{m n_{atm} v_{orb}^3}{8\eta_p \phi_{sa}} C_D^2 \frac{A_{in}}{A_{sa}} = \frac{\dot{m}_{in} v_{orb}^2 C_D^2}{8\langle P \rangle}. \qquad (17)$$

Figure 6:
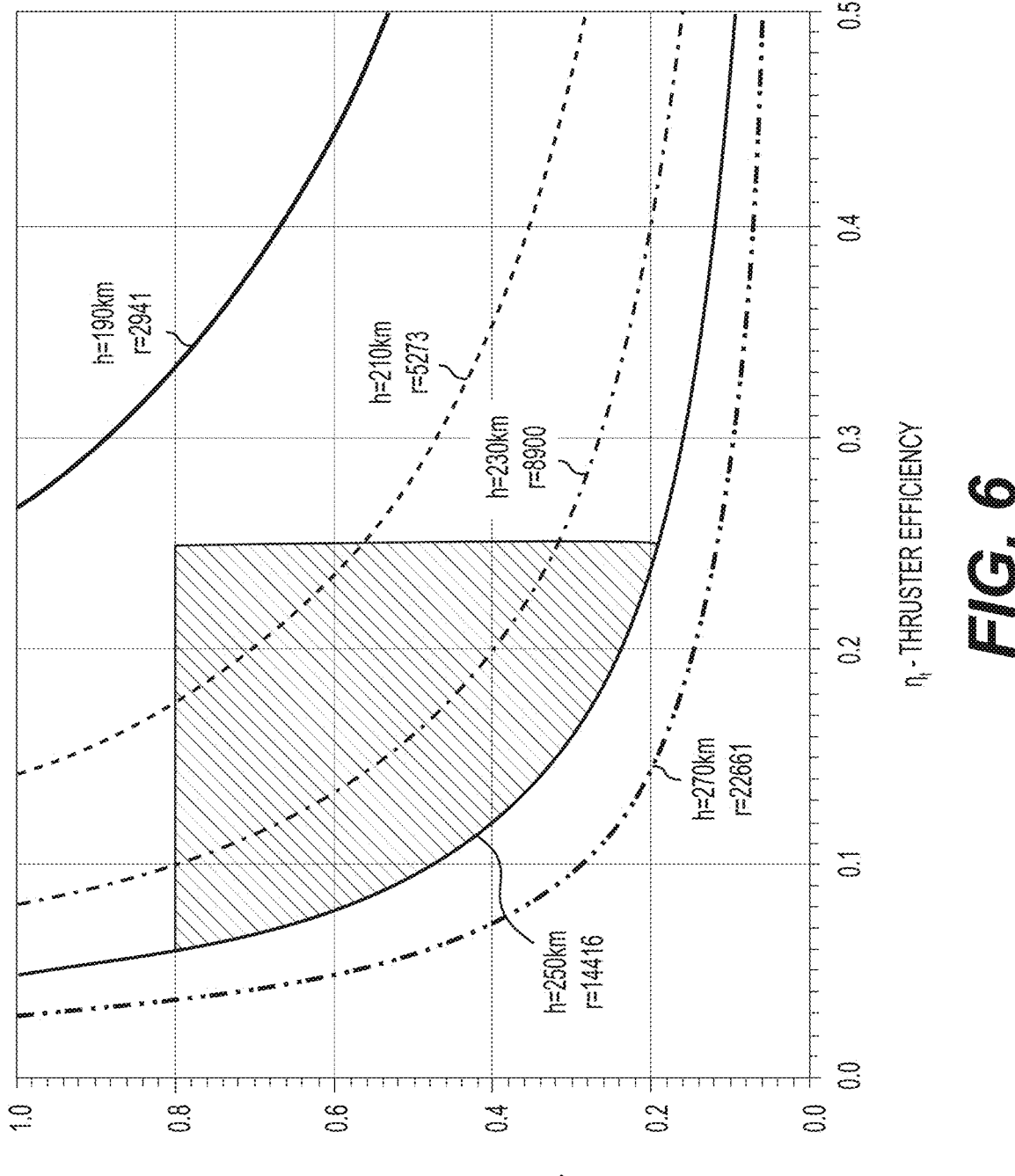
FIG. 6 illustrates example air-scoop-efficiency requirement as a function of thruster efficiency for varying lines of constant altitude at fixed power.

In particular embodiments, $$C_D^2 \frac{A_{in}}{A_{sa}}$$

is constant for a given satellite geometry and orientation, since it only involves areas and the drag coefficient. In particular embodiments, for fixed altitude (and for a given satellite design), the required thruster efficiency may scale inversely with the air-scoop efficiency, as shown in FIG. 6 (which is described below). A less efficient thruster may require a more efficient air-scoop. In particular embodiments, orbital velocity is a weak function of the orbital altitude h, since for LEO orbits $R_E \gg h$. In particular embodiments, atmospheric density $n_{atm}$ and the total collected propellant flow rate, $\dot{m}_c$, are strong functions of altitude.

Equation 17 may be useful in particular embodiments for selecting appropriate thruster and air-scoop performance for a given mission. The left-hand side may be interpreted as the overall system efficiency, $\eta = \eta_s \eta_t$, and the right-hand side may be constant for a fixed satellite geometry and mission orbit.

Figure 5:
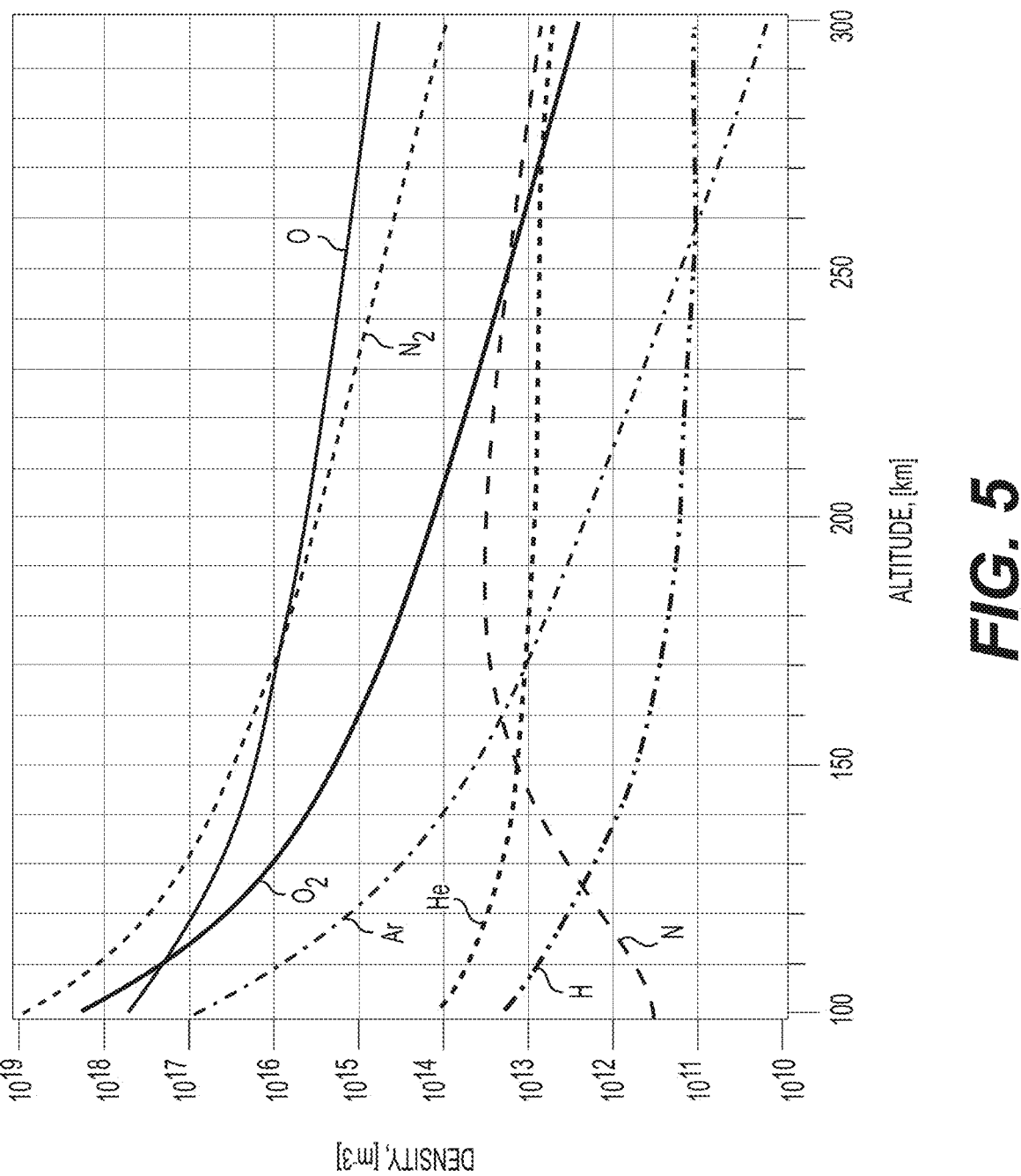
FIG. 5 illustrates example atmospheric density distribution as a function of altitude.

The earth's atmosphere consists of various gas molecules whose concentration changes as a function of altitude, longitude and latitude, solar weather, and other factors. While there are many atmospheric models that predict species concentration, particular embodiments may rely on the NRL MSISE00 model, which relies on the ISO 14222 standard, to derive the overall system requirements. Density distribution as a function of altitude for typical conditions is plotted in FIG. 5, above. FIG. 5 shows model results taken at zero latitude (equator) and zero longitude (prime meridian) at 8:03:20 on 21 Jul. 2009. Above 180 km, atomic oxygen dominates other atmospheric constituents. Nitrogen is the second dominant species and, below 180 km, it dominates atomic oxygen. The total density $n_{atm}$ and the mean atomic mass m at a given altitude may be used to calculate mass flow rate, where the mean atomic mass is computed $$m = \frac{\sum_s m_s n_s}{n_{atm}}, \qquad (18)$$

where the summation is performed over all species shown in FIG. 5. In particular embodiments, atomic oxygen may degrade satellite components.

In particular embodiments for a given spacecraft geometry, air-scoop and propulsion requirements may be determined by the mission altitude. Since the orbital velocity is only a weak function of altitude at LEO, these requirements are primarily dependent on the density of the atmospheric gas. In particular embodiments, one such requirement is the air-scoop compression ratio $r_s$. The air-scoop compression ratio $r_s$ may affect the efficiency of the EP system. An EP system may require sufficient gas density to efficiently ignite and sustain a plasma discharge. In particular embodiments, this density is typically around $n_{ig}=3\times10^{19}$ m$^{-3}$. In particular embodiments, the air-scoop may have a compression ratio determined by the fraction of $n_{ig}$ and the incoming atmospheric gas density, such that $$r_s > \frac{n_{ig}}{n_{atm}(h)}. \qquad (19)$$

In particular embodiments, four parameters may together substantially determine an air-breathing EP system's performance for a given satellite geometry and also substantially determine whether that performance will be sufficient to overcome drag forces on the satellite: air-scoop efficiency $\eta_s$, air-scoop compression ratio $r_s$, thruster efficiency $\eta_t$, and average power available $\langle P \rangle$. In particular embodiments, the required values for these parameters may be functions dependent on the orbital altitude h. This dependence may also be expressed through the total mass flow incident to the inlet $\dot{m}_{in}$, which may reduce the need to explicitly define satellite geometric areas.

FIG. 6 illustrates example air-scoop efficiency $\eta_s$ as a function of thruster efficiency $\eta_t$ for varying lines of constant altitude at fixed power, as expressed by Equation 17. Performance curves of required $\eta_s$ are illustrated as a function of $\eta_t$ for varying altitudes assuming $\langle P \rangle = 1$ KW, $C_D = 3.5$, and $A_{in} = 1$ m$^2$. These values approximate the actual parameters taken from the GOCE mission (a mission that flew at ULEO altitudes and maintained orbit temporarily with finite stored propellant). The shaded region is the region of viability if $\eta_s < 0.8$, $\eta_t < 0.25$, and $r_s < 15,000$. The altitude dependent data is taken from FIG. 5, and the associated compression ratios to reach efficient ionization are listed.

Figure 7:
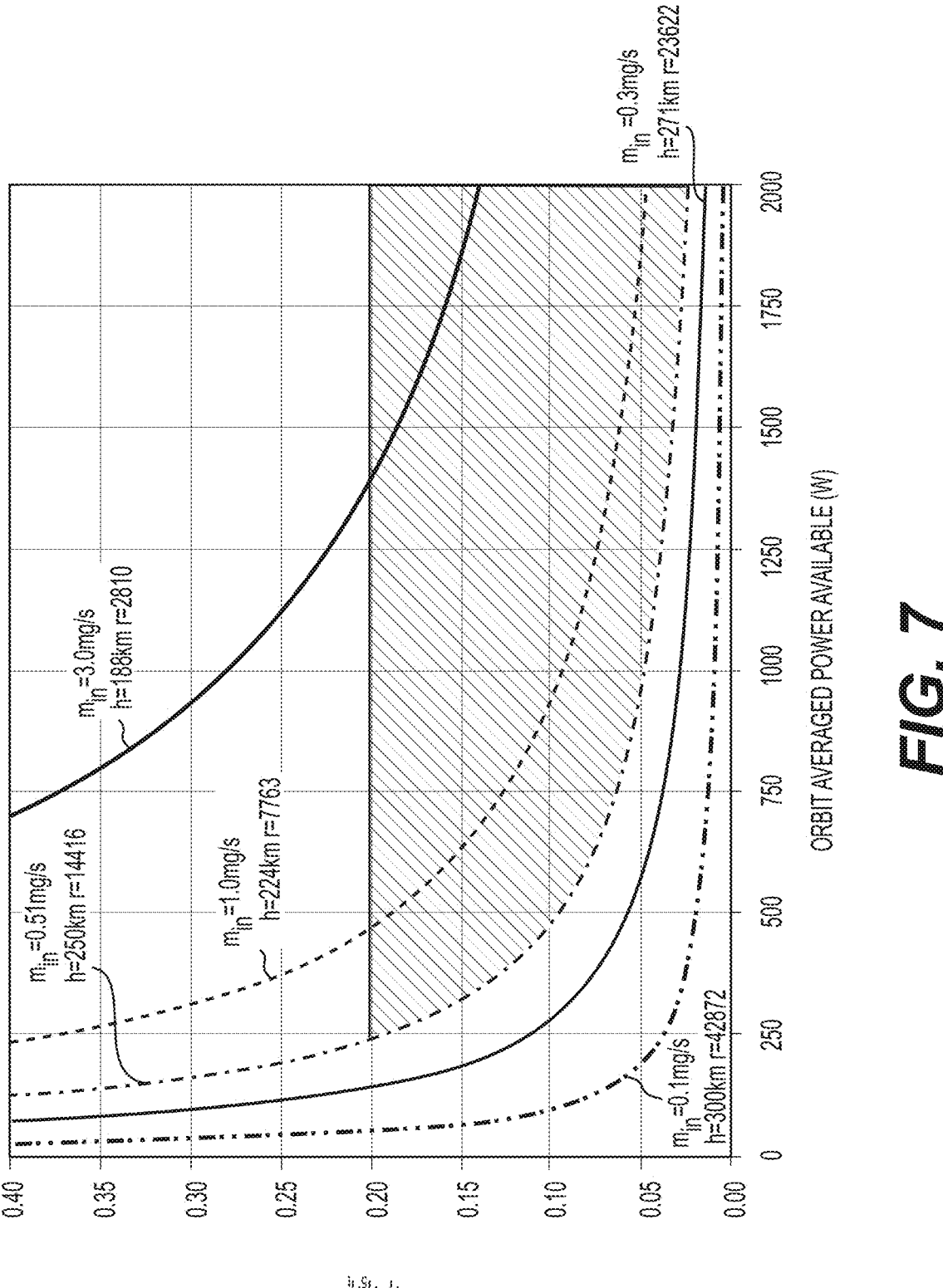
FIG. 7 illustrates example mission-efficiency requirement as a function of orbit-averaged power for different inlet mass flow rates.

The data in FIG. 6 is replotted in FIG. 7 to illustrate a mission-efficiency metric, $\eta$, which may be defined as $\eta = \eta_s \times \eta_t$, as a function of orbit-averaged power for different inlet mass flow rates. For these curves, the orbital velocity is assumed to be 7.8 km/s. Performance curves of required $\eta$ are illustrated as a function of $\langle P \rangle$ for varying altitudes, assuming $C_D = 3.5$ and $A_{in} = 1$ m$^2$. The $r_s$ and $\dot{m}_{in}$ for each line of constant altitude are shown. The shaded region is the region of viability if $\eta_s < 0.8$, $\eta_t < 0.25$, and $r_s < 15,000$.

Figure 8:
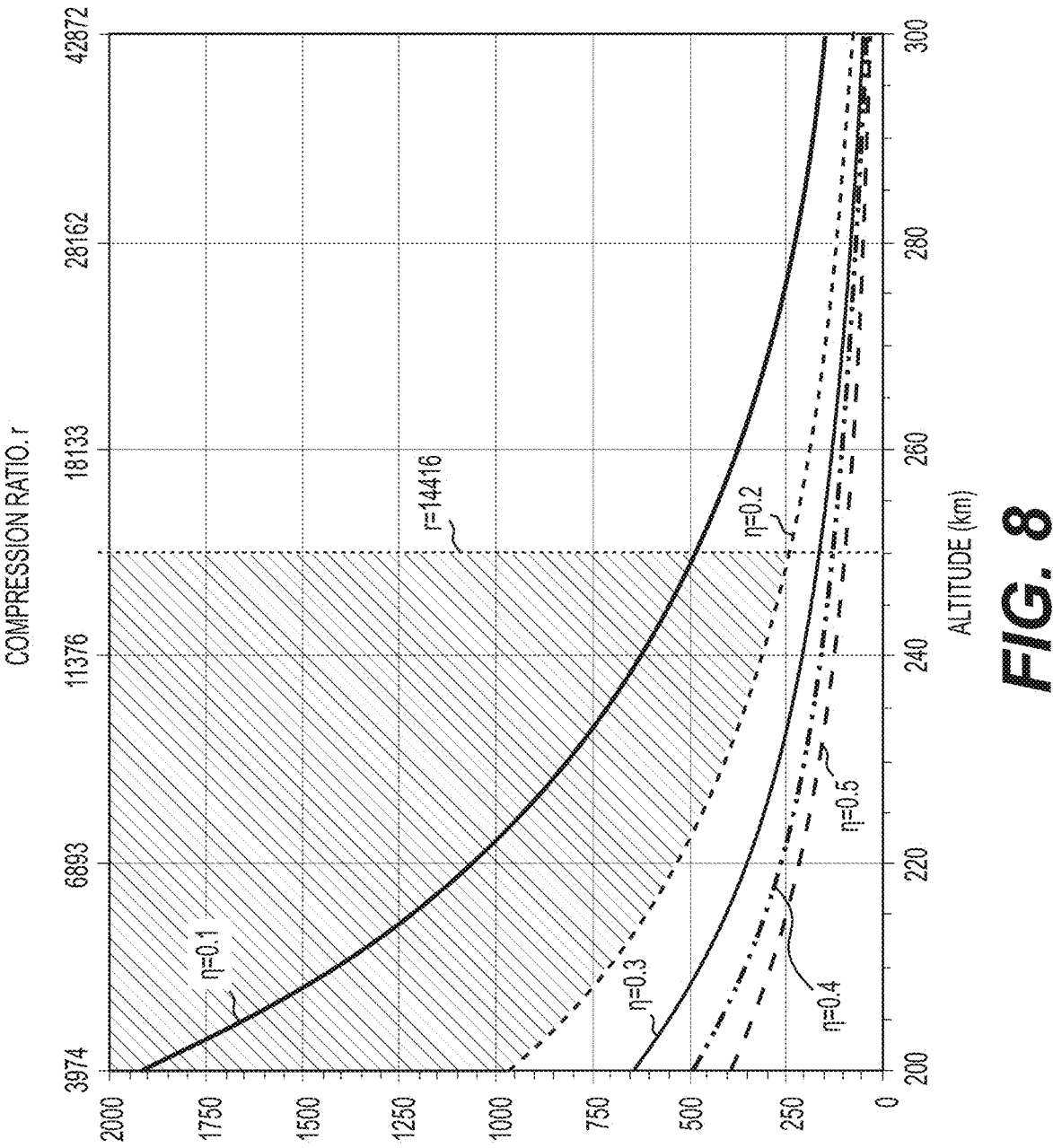
FIG. 8 illustrates example orbit-averaged power requirements as a function of altitude and mission efficiency.

The data in example FIG. 6 is also replotted in FIG. 8 in terms of the orbit-averaged power requirement as a function of altitude and mission efficiency, $\eta$. Performance curves of required $\langle P \rangle$ are illustrated as a function of altitude (and required $r_s$) for varying $\eta$, assuming $C_D = 3.5$ and $A_{in} = 1$ m$^2$. The shaded region is the region of viability if $\eta_s < 0.8$, $\eta_t < 0.25$, and $r_s < 15,000$.

In particular embodiments, three thruster-performance parameters may particularly influence thruster technology selection for an air-breathing EP application: thrust, specific impulse, and efficiency. Thrust presents an obvious requirement. In particular embodiments, the thruster should produce sufficient force to overcome drag. In particular embodiments, a thruster should produce specific impulse that is at least 780 s ($V_{orb}/g$), which means that, on average, particles should leave the system faster than they enter it. In particular embodiments, specific impulse should be significantly higher than that. Equation 11 states that a system should produce specific impulse high enough to offset the momentum loss due to all the incoming particles striking the satellite, i.e., the drag. Thus, in particular embodiments, exhaust velocity on the order of twice the orbital velocity or even more should be achieved by the thruster. For example, assuming $C_D = 3.5$ and air-scoop efficiency $\eta_s = 0.8$, Equation 11 places a minimum specific-impulse requirement at approximately 1,739 s. Such high specific impulse falls within the domain of EP. For example, in particular embodiments, electrostatic and electromagnetic thrusters are capable of producing specific impulse in that range.

In particular embodiments, thruster designs such as HETs and GITs may be operated on oxygen, nitrogen, and other chemical compounds and elements collected by the air scoop or stored in the propellant tank. In particular embodiments, thruster designs such as HETs and GITs may be capable of producing specific impulses around approximately 2,000 s when operated with xenon. That number may degrade significantly when operated with oxygen or nitrogen at voltages below approximately 300 V. On the other hand, standard HETs, such as the SPT-100, may produce an $I_{sp}$ with oxygen within approximately 5% of the $I_{sp}$ produced with xenon at voltages between approximately 300 V and approximately 400 V. Specifically, $I_{sp}$ of approximately 1,800 s may be produced with discharge voltage around approximately 320 V. With oxygen, $I_{sp}$ may significantly degrade at lower voltages and be only about 40% of that with xenon at approximately 200 V.

Efficiency of particular embodiments of a modern HET may be around 50% when operated with xenon. That number applies for thrusters in the 1-4 kW range and drops to around 30% below roughly 500 W. This may place a limitation on the size of particular embodiments of the air-breathing system. A small system may be less efficient and may be substantially unfeasible below a certain thruster power level. On the other hand, HETs operated at higher power with higher operating voltage (around 400+ V) may be well suited for the air-breathing application. GITs may also provide sufficient performance for an air-breathing system and typically achieve higher $I_{sp}$ than HETs. In particular embodiments, they may maintain some performance advantages at lower powers.

In particular embodiments, HETs and GITs require cathodes. Hollow BaO or LaB6 cathodes may be prone to oxygen poisoning and might not work well with air-breathing thrusters. Particular embodiments may use an oxygen-compatible cathode, such as an RF or microwave cathode or electride cathode. However, RF and microwave cathodes require input power and reduce overall thruster efficiency.

In particular embodiments, Equation 17 indicates a relationship between the propulsion and air-scoop requirements. Certain propulsion requirements and limitations of practical systems are described above. These limitations, together with Equation 17, drive the air-scoop system requirements in particular embodiments. Combining Equations 17 and 19, it is found that $$r_s \eta_s > \frac{m(h) n_{ig} v_{orb}^3 C_D^2 A_{in}}{8 \eta_t \eta_p \phi_{sa} A_{sa}} \tag{20}$$

$$> \frac{m(h) n_{ig} v_{orb}^3 C_D^2 A_{in}}{8 \eta_t \langle P \rangle}.$$

This equation combines the air-scoop compression ratio and collection efficiency into one metric, $r_s \eta_s$. The compression ratio is the ratio of the density required to ignite the thruster and the ambient density. In particular embodiments, both of those densities are substantially fixed properties once thruster design and the mission altitude are chosen. Thus, in particular embodiments, an air-scoop should be able to compress the incoming gas to at least the compression ratio dictated by these fixed parameters. However, in particular embodiments, compression beyond this value may not improve system performance but may be beneficial for effective propellant storage. For an air-breathing system in ULEO, compression ratios between approximately 3,000 and approximately 40,000 may be needed to fly between approximately 200 km and approximately 300 km. This may be seen in the example of FIG. 8, where compression ratio and altitude are plotted together on the horizontal axis. For example, assuming an approximately 1 m$^2$ area with an approximately 500 W orbit-averaged power, an $r_s \eta_s$ of greater than approximately 4,500 may be required in particular embodiments to make an air-breathing EP system feasible.

In particular embodiments, the stages of a TASC should collectively appear substantially transparent to the high-velocity orbital particles to facilitate high capture rates. In particular embodiments, each individual stage of a TASC may be optimized to ensure this substantial transparency. In particular embodiments, the collective stages substantially minimize the rate at which thermalized particles escape back through the stages toward the inlet. In particular embodiments, each individual stage of a TASC may be optimized to ensure this escape rate is substantially minimized. In particular embodiments, the total number of stages is substantially minimized to reduce size and weight. In particular embodiments, a TASC includes sets of counter-rotating blades to facilitate gyroscopic balance. This may reduce or even eliminate a need for stators and improve overall system performance. In particular embodiments, if counter-rotating blades are impractical, two side-by-side TASCs, with rotor-stator combination, may be used to facilitate gyroscopic balance. In such a geometry, the stators may be substantially optimized using a similar methodology applied to the rotors, to facilitate transparency to the incoming orbital beam and opacity to the back-flowing particles.

Particular embodiments may substantially optimize one or more of the following design parameters:

1. Blade angle—This is the attack angle of the blades of a stage of the TASC. At 90 degrees, the blades are vertical. At 0 degrees, the blades are flat.
2. Blade aspect ratio—This is the ratio between the width of a single blade and the separation between two blades within a stage.
3. Rotation speed—Faster blade speed ensures greater particle capture.
4. Number of stages—Each stage may be given different sets of blade angles and aspect ratios.
5. Stage offset—Each stage may be offset azimuthally with respect to a previous stage to increase total transparency of the incoming orbital stream to all stages. Blade alignment may be set so that an orbital particle that transmits through the first stage is likely to be transmitted through all stages.
6. Stator angle and aspect ratio—These can be similarly optimized, but may, in particular embodiments, sit near 90 degrees to facilitate greater transparency to $v_o$ particles.
7. System size—A larger radius system will have higher blade-tip speeds. This may improve the performance of the TASC, but may consume more power.
8. Ratio of inlet size to outlet size—A smaller outlet ensures higher compression at the expense of capture efficiency, and vice versa.

In particular embodiments, with substantial optimization of these design parameters, an $\eta_s$ around 80% or greater and an $r_s$ around 10,000 or greater may be achieved.

In particular embodiments, a one-dimensional analytical formulation for TASC performance may be derived with the following set of assumptions in the analytical formulation:

1. Analysis is 1-D along the TASC axis and based on overall flux conservation.
2. Particles enter the TASC at orbital velocity $v_o$ substantially monoenergetically. The thermal component of the velocity is ignored. It is estimated that particles will have temperature around 1000° C., which corresponds to $S=v_o/v_{to}\sim10$.

3. The TASC will include N stages of blades, and each stage will move with substantially the same velocity, $v_b$. This velocity will be calculated assuming a stage rotating with rotation speed $\omega_{rpm}$ with particles interacting with the blades at the mean radius, $r=(\frac{2}{3})r_{in}$, with $r_{in}$ being the inlet radius of the TASC.
4. All surface scattering is substantially diffuse with substantially perfect energy accommodation. All scattered particles take on a velocity $v_t=\sqrt{8k_bT/\pi m}$, where $k_b$ is Boltzmann constant, T is the temperature of the TASC walls, and m is atom mass.
5. Particle recombination, such as $O+O=O_2$, is ignored.
6. Between each stage, thermalized particles experience a conductance loss based on Clausing factor estimates for the assumed geometry.

In the subsequent analysis, the following fluxes are defined:

$$\psi^f_{0\,or\,1} = n_o v_o$$

$$\psi^{+s}_{0\,or\,1} = n_{+s} v_t$$

$$\psi^{-s}_{0\,or\,1} = n_{-s} v_t,$$

where $n_o$ is the density of fast particles entering the TASC at orbital velocity and $n_{+s}$ and $n_{-s}$ are densities of thermal (slow) particles streaming right (downwind) and left (upwind) respectively. Subscripts 0 and 1 refer to boundary conditions, which are described below.

Figure 9:
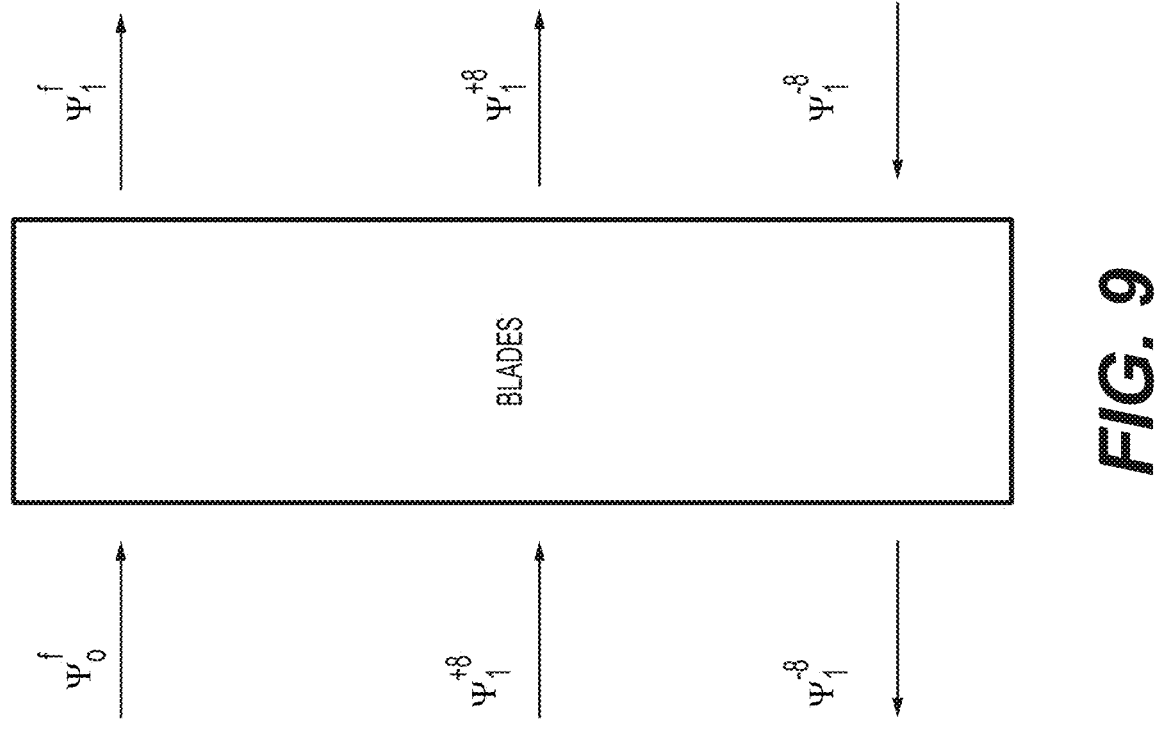
FIG. 9 is a block diagram representing air-particle flux through an example stage of blades.

In particular embodiments, the TASC includes a number of stages that each include a set of blades rotating on a shaft. The flow of particles through the rotating blades may be computed using transmission probabilities. Representing a stage of blades using a block diagram, as shown in FIG. 9, the following set of flux-conservation equations may be written:

$$\psi^f_1 = P^f_f \psi^f_0 \tag{21}$$

$$\psi^{+s}_1 = P^f_{+s}\psi^f_0 + P^{+s}_{+s}\psi^{+s}_0 + P^{-s}_{+s}\psi^{-s}_1 \tag{22}$$

$$\psi^{-s}_0 = P^f_{-s}\psi^f_0 + P^{+s}_{-s}\psi^{+s}_0 + P^{-s}_{-s}\psi^{-s}_1, \tag{23}$$

where the subscripts and superscripts have the following meaning. The subscripts for the fluxes $\psi$ indicate the upstream boundary 0 and the downstream boundary 1. The superscript f represents incoming orbital (fast) particles. The +s represents slower moving thermal particles moving in the positive direction, i.e., rightward further in to the TASC, and −s represents the thermal particles moving backwards in the system. Note, since all particles are assumed to thermalize when colliding with any surface, there are no fast moving particles moving backwards, and so the direction + is implicit.

In the probability terms, P, the superscript represents the incoming flow to the stage and the subscript represents the fraction of that flow that becomes outgoing for the specified flow type. For example, $$P^f_{-s}$$

is the probability that the incoming fast particles will scatter from the blades and flow to the left as thermal particles. Therefore, by definition, there are three sets of probability terms that must add up to 1.

$$P_f^f + P_{+s}^f + P_{-s}^f = 1 \tag{24}$$

$$P_{+s}^{+s} + P_{-s}^{+s} = 1$$

$$P_{+s}^{-s} + P_{-s}^{-s} = 1$$

Converting Equations 21-23 into matrix form, results in $$P_{sL}^1 \Psi_1 = P_{sR}^1 \Psi_0, \tag{25}$$

where the left and right probability matrices can be written as $$P_{sL} = \begin{bmatrix} 1 & 0 & 0 \\ 0 & 1 & -P_{+s}^{-s} \\ 0 & 0 & -P_{-}^{-s} \end{bmatrix}, \quad P_{sR} = \begin{bmatrix} P_f^f & 0 & 0 \\ P_{+s}^f & P_{+s}^{+s} & 0 \\ P_{-s}^f & P_{-s}^{+s} & -1 \end{bmatrix}, \tag{26}$$

and $$\Psi_i = \begin{bmatrix} \psi_i^f \\ \psi_i^{+s} \\ \psi_i^{-s} \end{bmatrix} \tag{27}$$

Therefore, each stage can be expressed in terms of fluxes and a single probability matrix for that stage by $$\Psi_{i+1} = P_s^{i+1} \Psi_i = \left(P_{sL}^{i+1}\right)^{-1} P_{sR}^{i+1} \Psi_i \tag{28}$$

Writing out Equation 28 explicitly for Stage 1 results in the following expression for the downstream fluxes (subscript 1) as a function of the upstream fluxes (subscript 0).

$$\begin{bmatrix} \psi_1^f \\ \psi_1^{+s} \\ \psi_i^{-s} \end{bmatrix} = \begin{bmatrix} P_f^f & 0 & 0 \\ P_{+s}^f - \dfrac{P_{+s}^{-s}}{P_{-s}^{-s}} P_{-s}^f & P_{+s}^{+s} - \dfrac{P_{+s}^{-s}}{P_{-s}^{-s}} P_{-s}^{+s} & \dfrac{P_{+s}^{-s}}{P_{-s}^{-s}} \\ -\dfrac{P_{-s}^f}{P_{-s}^{-s}} & -\dfrac{P_{-s}^{+s}}{P_{-s}^{-s}} & \dfrac{1}{P_{-s}^{-s}} \end{bmatrix} \begin{bmatrix} \psi_0^f \\ \psi_0^{+s} \\ \psi_0^{-s} \end{bmatrix} \tag{29}$$

In Equations 28 and 29, the individual probabilities are calculated below, and the matrix equation is a set of three equations with three inputs and three unknowns. The inputs are the incoming fluxes, $$\psi_0^f, \psi_0^{+s}, \psi_1^{-s},$$

from both sides of the stage, and the outputs are the outgoing fluxes, $$\psi_1^f, \psi_1^{+s}, \psi_0^{-s},$$

was, also exiting on both sides.

In particular embodiments, the substantially collimated fast particles are transported effectively between each stage and perfect transmission probability may be assumed for them. In particular embodiments, thermalized particles may scatter from the TASC walls. This conductance loss may be computed using Clausing factor probabilities. The flux conservation equation between the stages may be expressed as:

$$\Psi_b = C\Psi_a, \text{ where } C = \begin{bmatrix} 1 & 0 & 0 \\ 0 & \dfrac{2s-1}{s} & \dfrac{1-s}{s} \\ 0 & \dfrac{s-1}{s} & \dfrac{1}{s} \end{bmatrix}, \tag{30}$$

The value of s may be calculated via Clausing factors for the given geometry. In particular embodiments, the space between stages is a cylindrical tube of length l and radius $r_{in}$. The Clausing factor is then approximated by the following formulas:

$$s = \dfrac{1}{1 + \dfrac{3}{8r_{in}} l'} \tag{31}$$

$$l' = l + \dfrac{l}{3 + \dfrac{3}{7r_{in}} l}. \tag{32}$$

Regions between blades may not always be a perfectly open cylinder. For example, if stators are required between stages, they may be spaced closely (or far apart) and that spacing may decrease the transmission probability s from its value for an idealized cylinder. In that configuration, the transmission probability for fast moving particles may differ from $$P_f^f = 1$$

and the conductance calculation may become more complicated.

Moreover, in the limit where s=1, the conductance matrix in Equation 30 becomes the identity matrix.

Equation 28 is a linear system of equations. If, between each stage, finite conductance is included according to Equation 30, then a system with an arbitrary number of stages may be created. For example, a three-stage system may be written as $$\Psi_1 = CP_s^1 \Psi_0 - \text{first stage,}$$

$$\Psi_2 = CP_s^2 \Psi_1 - \text{second stage,}$$

$$\Psi_3 = CP_s^3 \Psi_2 - \text{third stage,}$$

where $$\Psi_3 = CP_s^3 CP_s^2 CP_s^1 \Psi_0.$$

More generally, we can write $$\Psi_N = \left( \prod_{i=N}^1 CP_s^N \right) \Psi_0 = M\Psi_0, \tag{33}$$

where M is the matrix product of the various blade stages and the interwoven conductance matrices. Regardless of the number of stages added, the system of equations combines three equations with three input fluxes, $$\psi_0^f, \psi_0^{+s}, \psi_N^{-s},$$

and three output fluxes, $$\psi_N^f, \psi_N^{+s}, \psi_0^{-s}.$$

This system may be closed by defining the three input fluxes, leaving three equations and three unknowns.

Final closure of the system may be understood by considering the back wall of the compressor. Assume that $$P_{+s}^f = 0,$$

so that $$P_f^f + P_{-s}^f = 1,$$

i.e., fast moving particles thermalize and scatter backward. The flux coming back into the $N^{th}$ stage from outside the wall $$(\psi_1^{-s})$$

is zero. As a result, the wall probabilities $$P_{-s}^{-s}$$

and $$P_{+s}^{-s}$$

may be set to an arbitrary value and should not affect the solution. Therefore, without loss of generality, $$P_{-s}^{-s} = 1$$

and $$P_{+s}^{-s} = 0$$

may be set. With these simplifications, Equation 29 yields the following:

$$\Psi_{out} = \begin{bmatrix} P_f^f & 0 & 0 \\ 0 & P_{+s}^{+s} & 0 \\ -P_{-s}^f & -P_{-s}^{+s} & 1 \end{bmatrix} \Psi_N = W\Psi_N, \tag{34}$$

where W is the wall-probability matrix, similar to the stage probability matrices, $$P_s^i.$$

In particular embodiments, the probability for a forward streaming particle to transmit through the outlet into the thruster (or propellant tank) may be defined to be proportional to $A_{out}/A_{in}$. That is, $$P_f^f = P_{+s}^{+s} = \frac{A_{out}}{A_{in}}, \tag{35}$$

where $A_{out}$ in practice is an effective area that is dependent on the size of the outlet along with the associated conductance losses to the thruster.

Putting together the wall and stage probability matrices may produce the following equation:

$$\Psi_{out} = W\Psi_N = WM\Psi_0 = T\Psi_0, \tag{36}$$

where T is the total flux probability transmission matrix. This is a system of three equations, so if $$\psi_0^f, \psi_0^{+s}, \psi_{out}^{-s}$$

are known, then $$\psi_{out}^f, \psi_{out}^{+s}, \psi_0^{-s}$$

may be solved for.

The input flux quantities are not all on the same side of the equation. This may be fixed by explicitly writing out the terms of Equation 36.

$$\begin{bmatrix} \psi_{out}^f \\ \psi_{out}^{+s} \\ \psi_{out}^{-s} \end{bmatrix} = \begin{bmatrix} T_{11} & T_{12} & T_{13} \\ T_{21} & T_{22} & T_{23} \\ T_{31} & T_{32} & T_{33} \end{bmatrix} \begin{bmatrix} \psi_0^f \\ \psi_0^{+s} \\ \psi_0^{-s} \end{bmatrix} \tag{37}$$

The above equation may be rearranged so that $$\psi_0^f, \psi_0^{+s}, \psi_{out}^{-s}$$

are all on the right side.

$$\begin{bmatrix} 1 & 0 & -T_{13} \\ 0 & 1 & -T_{23} \\ 0 & 0 & -T_{33} \end{bmatrix} \begin{bmatrix} \psi_{out}^f \\ \psi_{out}^{+s} \\ \psi_{out}^{-s} \end{bmatrix} = \begin{bmatrix} T_{11} & T_{12} & 0 \\ T_{21} & T_{22} & 0 \\ T_{31} & T_{32} & -1 \end{bmatrix} \begin{bmatrix} \psi_0^f \\ \psi_0^{+s} \\ \psi_0^{-s} \end{bmatrix} \tag{38}$$

This represents a substantially complete solution, but further simplifying assumptions may be made. First, only the fast particles enter the inlet, which means $$\psi_0^{+s} = 0.$$

Second, particles don't return from the outlet back into $N^{th}$ stage, which means $$\psi_{out}^{-s} = 0.$$

This leaves the following solution:

$$\begin{bmatrix} 1 & 0 & -T_{13} \\ 0 & 1 & -T_{23} \\ 0 & 0 & -T_{33} \end{bmatrix} \begin{bmatrix} \psi_{out}^f \\ \psi_{out}^{+s} \\ \psi_0^{-s} \end{bmatrix} = \begin{bmatrix} T_{11} \\ T_{21} \\ T_{31} \end{bmatrix} \psi_0^f, \tag{39}$$

and inverting, it may be seen that $$\begin{bmatrix} \psi_{out}^f \\ \psi_{out}^{+s} \\ \psi_0^{-s} \end{bmatrix} = \begin{bmatrix} T_{11} - \dfrac{T_{13}T_{31}}{T_{33}} \\ T_{21} - \dfrac{T_{23}T_{31}}{T_{33}} \\ -\dfrac{T_{31}}{T_{33}} \end{bmatrix} \psi_0^f. \tag{40}$$

By continuity, it may be expected that $T_{11}+T_{21}-T_{31}/T_{33}$ $(T_{13}+T_{23}+1)=1$.

Finally, the total density at the outlet of the compressor may be calculated by noting the total output flow and velocity associated with the two outflowing terms from Equation 40:

$$n_{out} = \frac{A_{in}}{A_{out}} \left( \psi_{out}^f/v_0 + \psi_{out}^{+s}/v_t \right). \tag{41}$$

Compressor performance may be expressed in terms of its compression ratio and collection efficiency as $$r_s = \frac{n_{out}}{n_0} = \frac{A_{in}}{A_{out}} \frac{\psi_{out}^f + (v_0/v_t)\psi_{out}^{+s}}{\psi_0^f}, \tag{42}$$

$$\eta_s = \frac{\psi_{out}^f + \psi_{out}^{+s}}{\psi_0^f}. \tag{43}$$

These equations may be further simplified by assuming the output flow fully thermalizes before exiting the system, so that $$\psi_{out}^f = 0.$$

This assumption is consistent with assuming the back wall fully thermalizing the incoming particle fluxes, so that $$P_f^f = P_{+s}^f = 0$$

and $$P_{-s}^f = 1.$$

Therefore, $$r_s = \frac{n_{out}}{n_0} = \frac{A_{in}}{A_{out}} \frac{v_0}{v_t} \frac{\psi_{out}^{+s}}{\psi_0^f} \tag{4}$$

$$\eta_s = \frac{\psi_{out}^{+s}}{\psi_0^f}, \tag{3}$$

where $r_s$ and $\eta_s$ are each proportional to $$\psi_{out}^{+s}/\psi_0^f.$$

This assumption simplifies the T matrix, so that $T_{1i}=0$, so that the output ratio is $$\eta_s = \frac{\psi_{out}^{+s}}{\psi_0^f} = T_{21} - \frac{T_{23}T_{31}}{T_{33}} = 1 - \frac{T_{31}}{T_{33}}. \tag{44}$$

Figure 10:
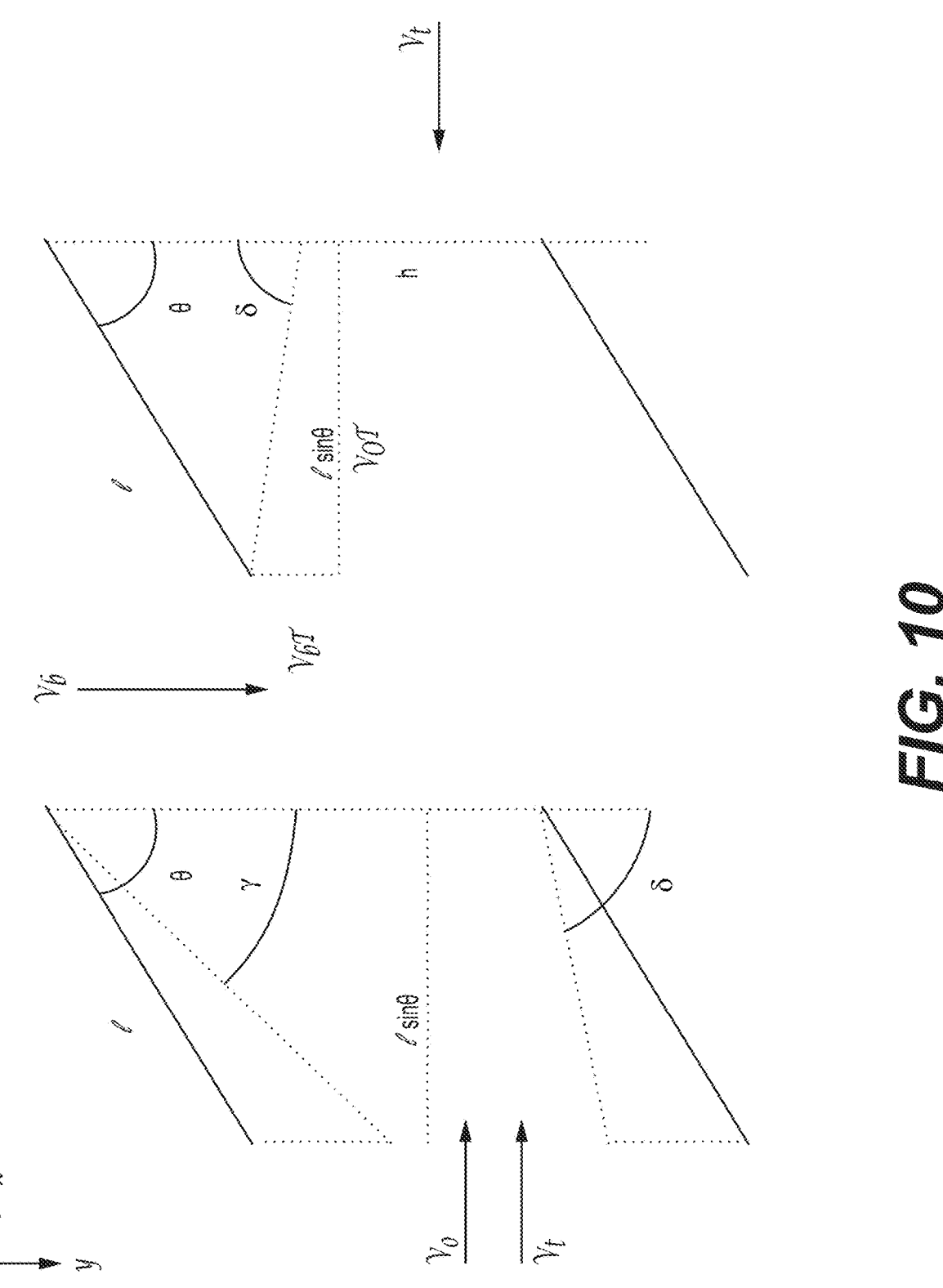
FIG. 10 illustrates an example geometry of example blades.

The transmission probabilities of a particle passing through a stage may be derived using a cartesian geometry in which blades of width $\ell$ are spaced by distance h at an angle $\theta$, and move in y direction, which is shown as vertical in FIG. 10. In particular embodiments, the probability of a fast particle moving with velocity $v_o$ striking a stationary ($v_b=0$) blade is $\ell \cos \theta/h$. When the blade is stationary, the forward moving particle will strike the backward facing side of the blade.

In particular embodiments, as blade speed increases, the probability of a strike on the backward facing side of the blades decreases. Once the blade speed is sufficiently fast, particles tend not to strike the backward facing side of the blade and, instead, begin to strike the forward facing side of the blades. At this point, increasing blade speed increases the probability of a strike.

Assume a slowly moving blade, so that particles will always strike the backward-facing side. In this circumstance, the moving blade reduces the probability of a strike by $v_b\tau/h$, as compared to a stationary blade, where the dwell time within the stage $\tau$ can be computed from the blade angle and particle speed, $v_o\tau=\ell \sin \theta$. Thus, the probability of a particle striking a slow moving blade is $$p_{st}^f = \frac{\ell\cos\theta - \cot\gamma\ell\sin\theta}{h} \tag{1}$$

$$= \frac{\ell}{h}\sin\theta(\cot\theta - \cot\gamma),$$

where angle $\gamma$ is defined such that $\cot \gamma = v_b/v_o$. This $\gamma$ is the angle at which particles enter the stage in the frame of reference of the moving blades, and the assumption that the blades are slowly moving is substantially equivalent to assuming $\gamma > \theta$. When $\gamma = \theta$, the particles enter the stage aligned with the blades and the probability of a strike goes substantially to zero.

On the other hand, when $\gamma < \theta$, the entering particles will strike the forward facing sides of the blades, which corresponds to proportionally faster blade speeds than the previous case. Calculating the probability that entering particles strike the forward-facing sides in this case, it may be seen that the result in this calculation is that the two cotangents simply switch signs:

$$p_{st}^f = \begin{cases} \frac{\ell}{h}\sin\theta(\cot\theta - \cot\gamma), & \gamma > \theta \\ \frac{\ell}{h}\sin\theta(\cot\gamma - \cot\theta), & \gamma < \theta \end{cases} \tag{2}$$
$$= \frac{\ell}{h}\sin\theta|(\cot\theta - \cot\gamma)|,$$

where $(\theta,\gamma)\epsilon\{0,\pi/2\}$.

In both cases, $$p_{st}^f > 1$$

is possible, but unphysical. In the first case, where $\gamma > \theta$, this corresponds to blades wide enough to overlap. In the second case, where $\gamma < \theta$, this corresponds to blades moving sufficiently fast that multiple blades would pass through the particle trajectory. The true probability of the particle striking a blade, $$P_{st}^f,$$

may be confined to physically realizable values and ignore the possibility of multiple blade strikes in a single pass. Therefore, $$P_{st}^f = \begin{cases} p_{st}^f & p_{st}^f < 1 \\ 1 & p_{st}^f > 1 \end{cases}. \tag{45}$$

In practice, a particle striking a blade may scatter diffusely according to both a cosine law distribution and some accommodation coefficient. In this derivation, the approach may be simplified by assuming the accommodation coefficient is one, so that particles thermalize and may flow out of the blade region in either direction. The probability of a particle becoming forward (+) or reverse (−) flowing may be estimated by assuming particles scatter with a uniform distribution off of the angled blades. As a result, if a particle strikes the forward-facing surface, its probability of becoming forward-flowing may be $(\pi-\theta)/\pi$. Similarly, if it strikes a backward-facing surface, its probability of becoming forward flowing may be $\theta/\pi$.

Together, there are four possibilities born from the fact that a particle can strike either the forward or reverse facing surfaces and then flow either forward or backwards. Therefore:

$$P_{+s}^f = \begin{cases} \frac{\theta}{\pi}P_{st}^f, & \gamma > \theta \\ \frac{\pi-\theta}{\pi}P_{st}^f, & \gamma < \theta \end{cases} \tag{46}$$

$$P_{-s}^f = \begin{cases} \frac{\pi-\theta}{\pi}P_{st}^f, & \gamma > \theta \\ \frac{\theta}{\pi}P_{st}^f & \gamma < \theta \end{cases}. \tag{47}$$

When $\gamma = \theta$, the cotangent difference is zero, and particles tend not to strike a blade. When $\theta = 0$ (i.e., flat blades), $\gamma < 0$ is not possible and, so the probabilities are selected from the top rows, ensuring that $$P_{+s}^f = 0$$

and $$P_{-s}^f = P_{st}^f.$$

Finally, when $\gamma \approx 0$ and $\theta \neq 0$ (i.e. fast moving blades compared to the particle velocity), then $\gamma < 0$ and from Equation 45, $$P_{st}^f = 1.$$

In this situation, particles tend to strike the forward-facing blade surface.

The probability of a particle passing the blades without a collision (and therefore remaining a fast particle) is $$P_f^f = 1 - P_{st}^f,$$

and combining this with Equations 46 and 47 results in $$P_f^f + P_{+s}^f + P_{-s}^f = 1.$$

The transmission probability for slow (thermal) particles moving in the same forward direction as the fast particles can be calculated in the same way. However, these particles have a different velocity, $v_t$, so the angle $\delta$ is defined such that $\cot \delta = v_b/v_t$. The non-bounded probability of a strike becomes $$p_{st}^{+s} = \begin{cases} \frac{\ell}{h}\sin\theta(\cot\theta - \cot\delta), & \delta > \theta \\ \frac{\ell}{h}\sin\theta(\cot\delta - \cot\theta), & \delta < \theta \end{cases} \tag{48}$$
$$= \frac{\ell}{h}\sin\theta|(\cot\theta - \cot\delta)|,$$

where $\delta\epsilon\{0,\pi/2\}$. And the physically realizable probability of a strike becomes $$P_{st}^{+s} = \begin{cases} p_{st}^{+s} & p_{st}^{+s} < 1 \\ 1 & p_{st}^{+s} > 1 \end{cases}. \tag{49}$$

A difference with the previous derivation is that the scattering occurs at the same velocity as the incoming flux. Therefore, $$P_{+s}^{+s}$$

is the sum of the probability of striking a blade and propagating forward and the probability of passing without collision. Finally, the probabilities become:

$$P_{-s}^{+s} = \begin{cases} \dfrac{\pi - \theta}{\pi} P_{st}^{+s}, & \delta > \theta \\ \dfrac{\theta}{\pi} P_{st}^{+s}, & \delta < \theta \end{cases}. \tag{50}$$

$$P_{+s}^{+s} = 1 - P_{-s}^{+s} \tag{51}$$

The final set of probabilities for the backward streaming slow (thermal) particles differs from the forward streaming case. It may be assumed that the particles have the same thermal speed, $v_t$, but are now moving in the negative direction. The negative velocity flips the sign in front of the cotangent term in Equation 48. Moreover, it may be unnecessary to keep track of which side of the blade the back-streaming particles strike because particles tend to only strike the forward facing side of the blades. Therefore:

$$p_{st}^{-s} = \frac{\ell}{h} \sin\theta (\cot\theta + \cot\delta). \tag{52}$$

To make the true probability physical:

$$P_{st}^{-s} = \begin{cases} p_{st}^{-s} & p_{st}^{-s} < 1 \\ 1 & p_{st}^{-s} > 1 \end{cases}. \tag{53}$$

By analogy to the forward propagating thermal case, the probability of a back-streaming (−s) particle becoming a forward flowing (+s) particle may be calculated.

$$P_{+s}^{-s} = \frac{\pi - \theta}{\pi} P_{st}^{-s} \tag{54}$$

$$P_{-s}^{-s} = 1 - P_{+s}^{-s} \tag{55}$$

The seven probabilities used in the matrix of Equation 29 may be calculated:

$$P_f^f, P_{+s}^f, P_{-s}^f, P_{+s}^{+s}, P_{+s}^{-s}, P_{+s}^{-s}, \text{ and } P_{-s}^{-s}.$$

The forward streaming probabilities $$P_*^f$$

may be determined from Equations 2 and 45-47. The slow forward probabilities $$P_*^{+s}$$

may be determined from Equations 48-51. The slow backward probabilities $$P_*^{-s}$$

may be determined from Equations 52-55.

Performance of a TASC with a number of stages may be analyzed as a function of blade angles and aspect ratios, rotation speed, and the inlet and outlet areas. In this analysis, assume that the TASC is a cylinder with a radius $r_{in}$ and that the TASC outlet has a circular cross-section with a radius $r_{out}$. With these assumptions, the inlet and outlet areas are $$A_{in} = \pi r_{in}^2 \text{ and } A_{out} = \pi r_{out}^2$$

respectively.

In the example TASCs described below, blade speed may be taken to be $v_b = (\frac{2}{3})r_{in}\omega_s$, for a given rotation speed, $\omega_s = 2\pi\omega_{rpm}$. The factor of $\frac{2}{3}$ comes from the mean-effective blade radius for blades in a cylinder. Conductance matrices may be calculated individually for each stage as described above, and for the example TASCs described below it is assumed that the stages are substantially equidistant from each other with a separation l=0.05 m. Finally, for the example TASCs described below, the orbital velocity and thermal velocity may be assumed to be $v_o$=7,800 m/s and $v_t$=630 m/s, where $v_t$ is calculated assuming oxygen at a temperature of 300 K.

In particular embodiments, there may be three globally controllable parameters ($r_{in}$, $r_{out}$, and $\omega_{rpm}$) and two additional parameters per stage (blade angle $\theta_i$ and aspect ratio $\alpha_i = \ell/h$). The complexity of the problem may increase with the number of stages. For example, a six-stage TASC may have 15 variables to be substantially optimized. This complexity may be reduced by noting that the inlet and outlet radii only appear in the area fractions, and therefore $r_{in}$ may be fixed and variations in $r_{out}$ may be investigated. The linear blade speed may be proportional to $\omega_{rpm}$ and $r_{in}$. Thus, decreasing the diameter of the TASC may be substantially equivalent to decreasing the rotation speed of the stages and may produce self-similar solutions.

In the case of a single-stage TASC, the inlet and outlet fluxes may be connected by the following relationship:

$$\Psi_{out} = W C P_s \Psi_0 = T \Psi_0, \tag{56}$$

where $P_s$ is the single-rotor transmission probability matrix as calculated above. For the back-wall matrix, W, it may be assumed that all fast particles thermalize before going through the outlet. Thus, $$P_f^f$$

at the wall is zero. To explicitly calculate the transmission matrix, T, it may be assumed that $r_{in}$=0.25 m, $r_{out}$=0.025 m, and then vary $\omega_{rpm}$, $\theta_1$, and $\alpha_1$.

Figure 11:
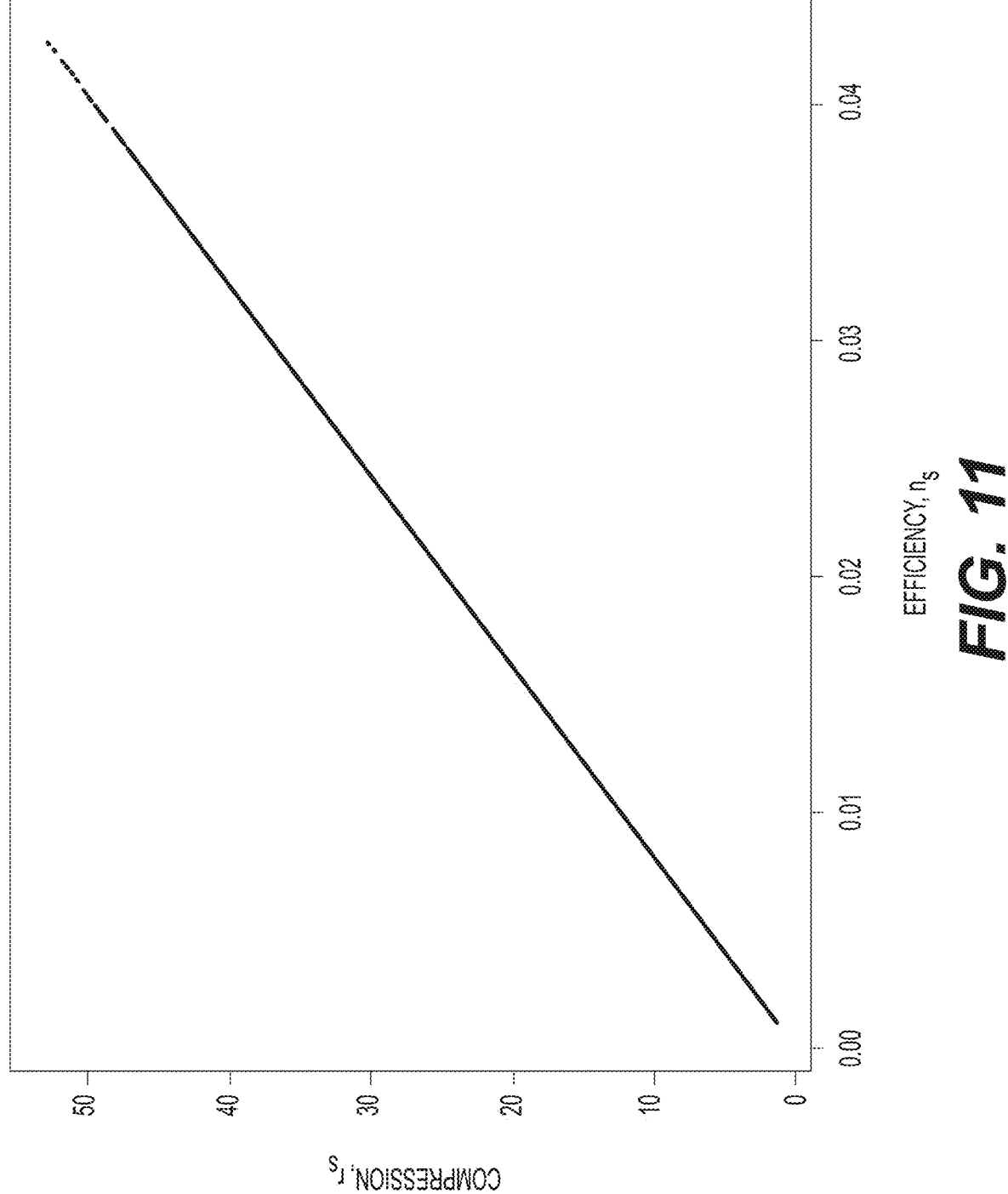
FIG. 11 illustrates example compression ratio versus example collection efficiency for an example single-stage TASC.

FIG. 11 illustrates example compression ratio $r_s$ versus example collection efficiency $\eta_s$ for an example single-stage TASC. According to Equations 42 and 43, compression ratio and collection efficiency are substantially linearly related for a given area ratio if it is assumed that substantially all particles exiting the outlet are thermalized. This assumption is reasonable for an air-breathing EP system in which the outlet of the air-scoop is connected to a thruster through a tube with a relatively small diameter. FIG. 11 demonstrates the $r_s$-versus-$\eta_s$ dependence by plotting results of multiple combinations of angle and aspect ratio for a single-stage system. According to Equations 42 and 43, a multi-stage system may continue the same linear trend to higher $r_s$ and $\eta_s$ values as long as the area ratio is kept substantially constant. Because of this substantially linear relationship when the area ratio is fixed, only collection efficiency is shown in FIGS. 12A, 12B, 12C, 13, 15-18, and 20-21.

Figure 12A:
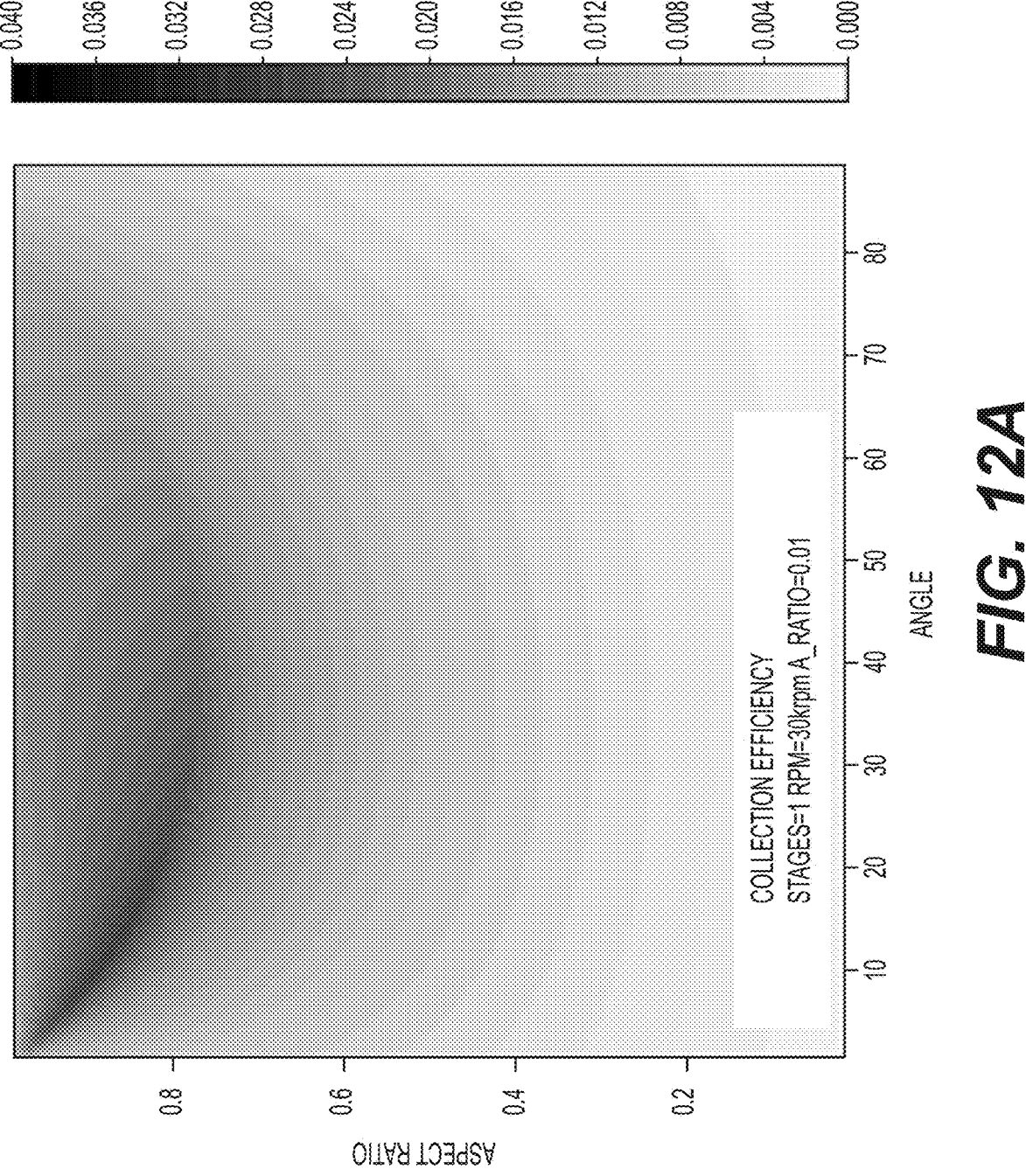
FIG. 12A is an example contour plot of collection efficiency of an example single-stage TASC at a blade-rotation speed of 30,000 rpm.
Figure 12B:
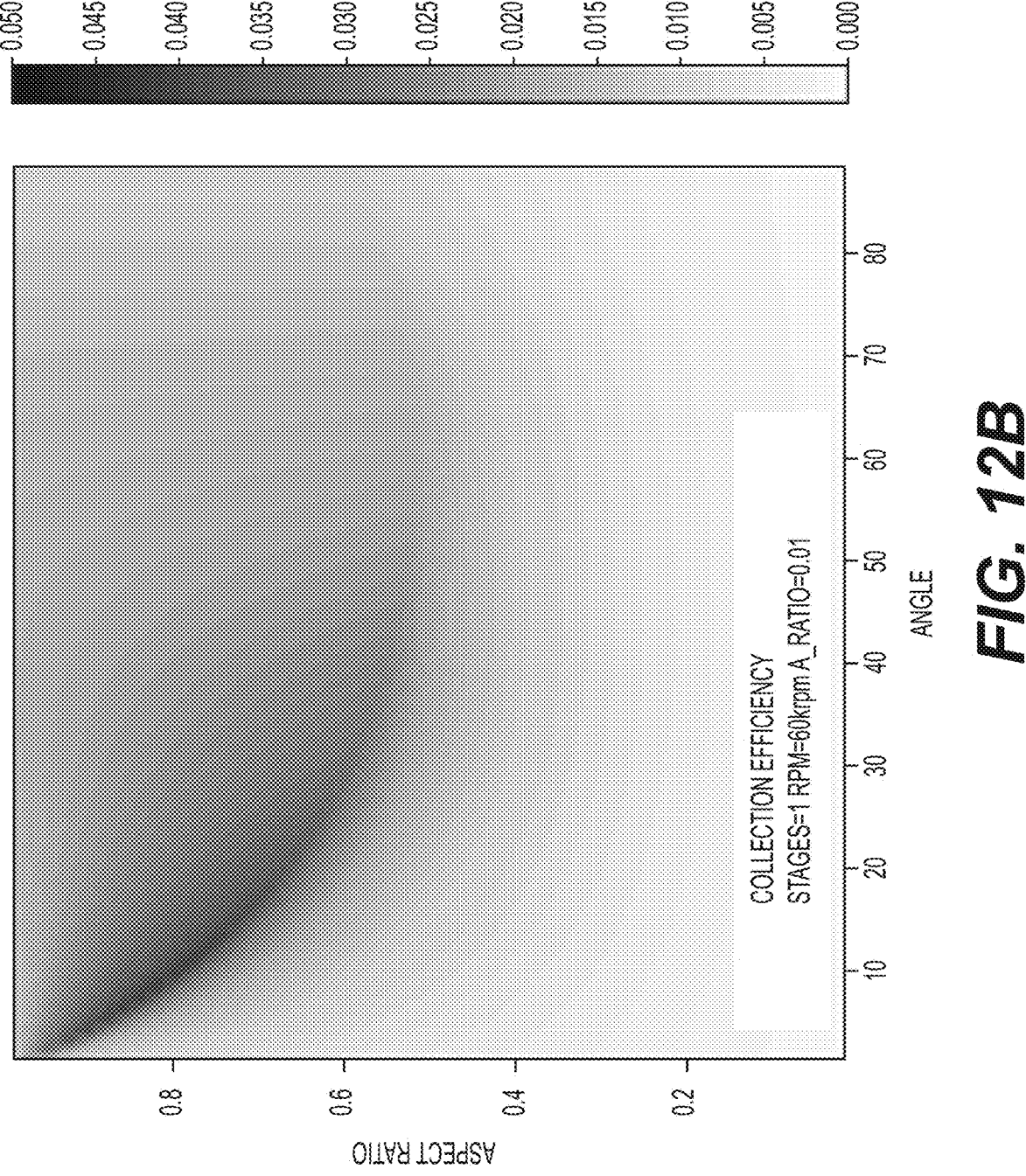
FIG. 12B is an example contour plot of collection efficiency of an example single-stage TASC at a blade-rotation speed of 60,000 rpm.
Figure 12C:
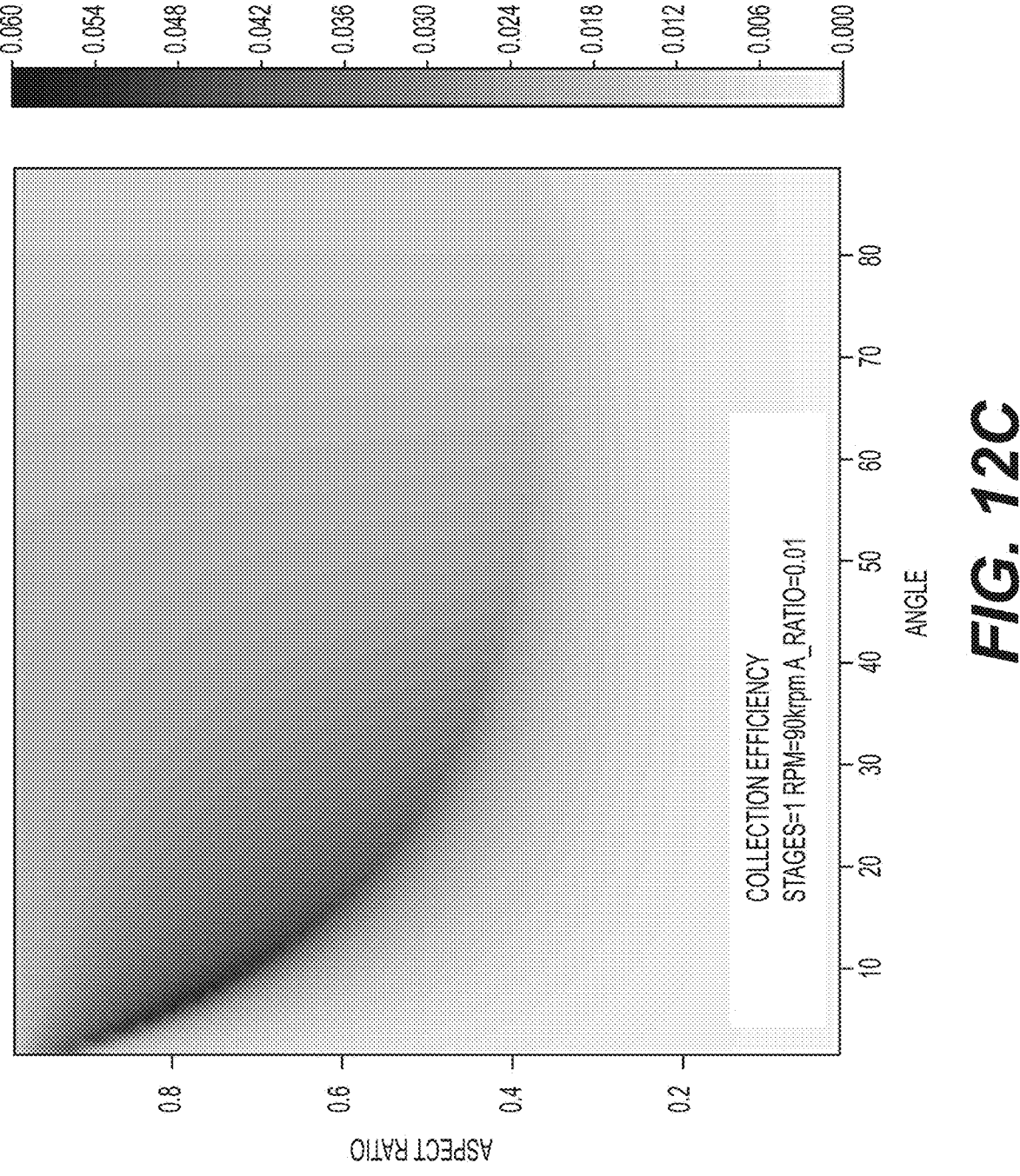
FIG. 12C is an example contour plot of collection efficiency of an example single stage TASC at a blade-rotation speed of 90,000 rpm.

FIGS. 12A, 12B, and 12C summarize example results of the example parametric study above for an example single-stage TASC by plotting collection efficiency contour plots as a function of blade angle and aspect ratio for three different rotation speeds. FIG. 12A is an example contour plot of collection efficiency of an example single stage TASC when $\omega_{rpm}$=30,000 rpm; FIG. 12B is an example contour plot of collection efficiency of an example single stage TASC when $\omega_{rpm}$=60,000 rpm; and FIG. 12C is an example contour plot of collection efficiency of an example single stage TASC when $\omega_{rpm}$=90,000 rpm. The contour color scale of each of these figures is different to highlight the appropriate dependencies within each figure.

In particular embodiments, collection efficiency may increase with increasing rotation speed. In particular embodiments, a substantially optimum blade configuration is a function of speed and the angle and aspect ratio may both decrease with increasing speed. For example, at 60,000 rpm, particular embodiments achieve substantially optimum performance at $\theta_1$≈7.2° and $\alpha_1$≈0.83 with collection efficiency of $\eta_s$=4.3% and compression ration $r_s$=53. At 30,000 rpm, in particular embodiments, the substantially optimum values are $\theta_1$≈9.9° and $\alpha_1$≈0.89. However performance degrades to $\eta_s$=2.8% and compression ratio to $r_s$=34. At 90,000 rpm, particular embodiments achieve substantially optimum performance at similar conditions, $\theta_1$≈6.0° and $\alpha_1$≈0.80, but performance, on the other hand, improves with collection efficiency of $\eta_s$=5.7% and compression ratio of $r_s$=70.

At slower rotation speeds, higher blade angles may be required in order to allow more of the orbital beam through. From the derivations above, it may be noted that with the assumptions made for our 1-D model, $\eta$=$\gamma$ substantially ensures that substantially all fast particles pass through the stage. However, at slow blade speeds, $\gamma$ is closer to 90°. While $\eta$=$\gamma$ may lead to substantially perfect transparency for the fast particles, there is a countervailing need to reduce transparency for the back-streaming thermal particles. In particular embodiments, as the number of stages is increased, this conflicting requirement may be mitigated by allowing stage specialization, with large angles at the front stages and low angles at the back stages, with $\eta_s$=$\gamma$ becoming a substantially optimal answer for the front stages.

Figure 13:
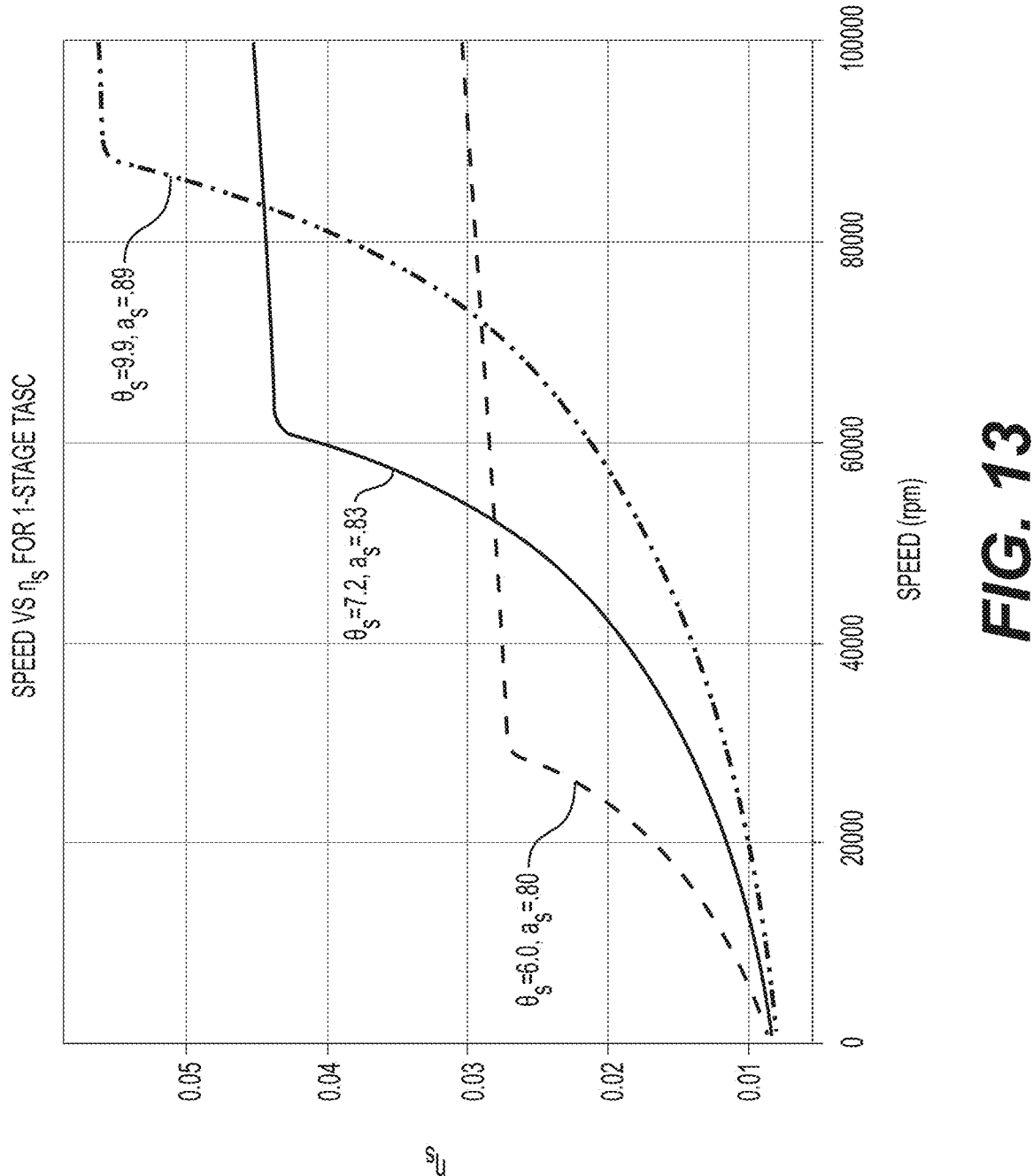
FIG. 13 illustrates example air-scoop efficiency of three example one-stage TASC configurations as a function of speed for three different blade configurations.

FIG. 13 illustrates example efficiency of three example one-stage TASC configurations as a function of speed for three separate $\theta_s$/$\alpha_s$ combinations: (1) substantially optimized for 30,000 rpm, $\theta_s$=9.9°, $\alpha_s$=0.89; (2) substantially optimized for 60,000 rpm, $\theta_s$=7.2°, $\alpha_s$=0.83; and (3) substantially optimized for 90,000 rpm, $\theta_s$=6.0°, $\alpha_s$=0.80. In the example of FIG. 13, the substantially optimum performance angles and aspect ratios determined for each speed shown in FIGS. 12A, 12B, and 12C are used and variations in performance as a function of speed are examined. For a fixed blade geometry, increased speed provides consistent improvement in particular embodiments. However, above the speed at which the substantially optimum geometry is found, improvement is limited in particular embodiments. Below the substantially optimum speed, the performance may drop off significantly in particular embodiments. Therefore, in particular embodiments, the blade geometry may be substantially optimized for a slightly lower speed than its intended operation.

Figure 14:
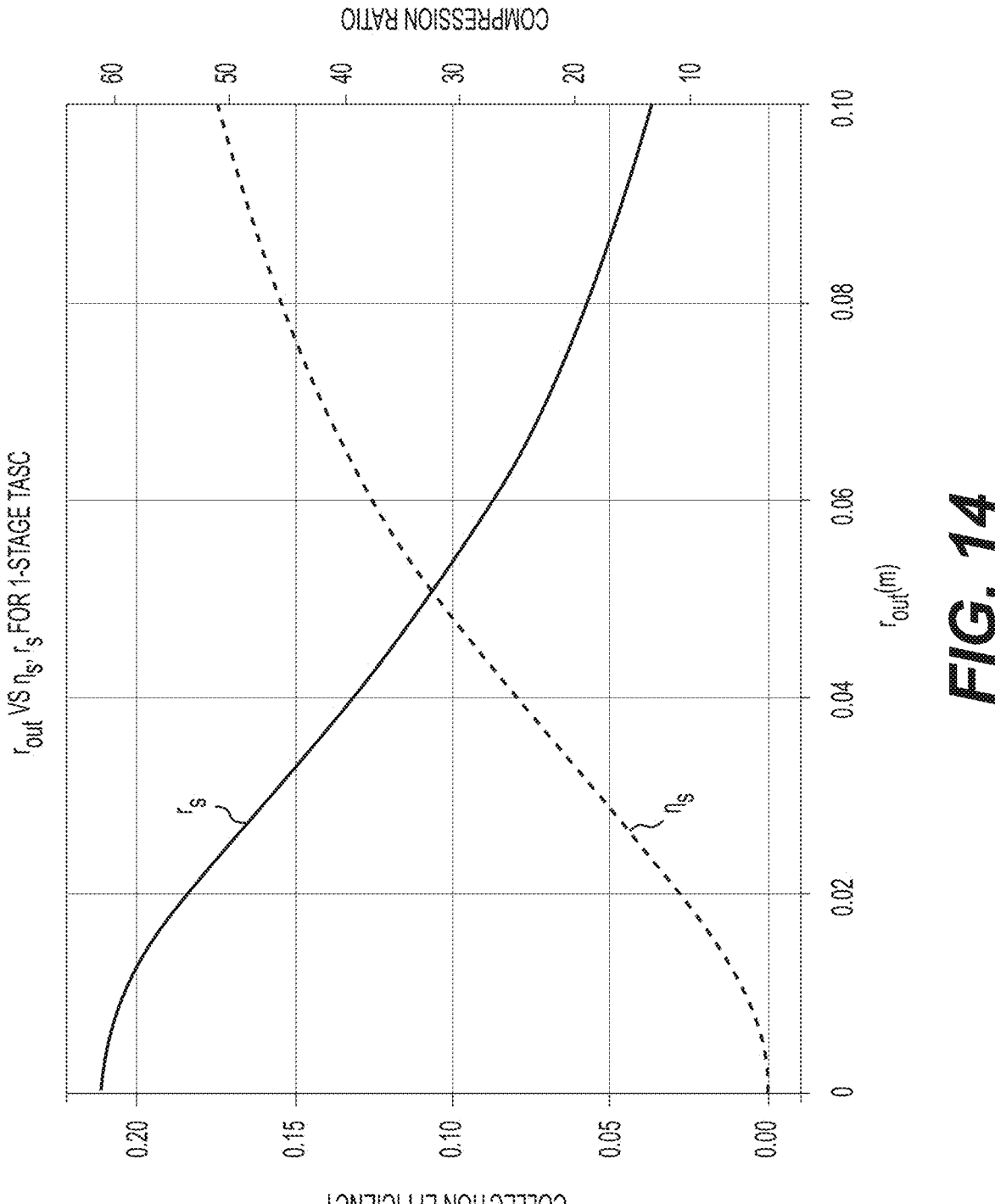
FIG. 14 illustrates example air-scoop efficiency and compression ratio of an example one-stage TASC as a function output radius for an example blade configuration and blade-rotation speed.

While in particular embodiments $r_s$ and $\eta_s$ otherwise vary proportionally to each other as shown in the example of FIG. 11 and demonstrated by Equations 42 and 43, adjusting the input-output area ratio is a method in which these two parameters distinctly decouple. FIG. 14 illustrates example efficiency and compression ratio of an example one-stage TASC as a function output radius, $r_{out}$, for $\theta_s$=7.2°, $\alpha_s$=0.83, and $\omega_{rpm}$=60,000 rpm. In the example of FIG. 14, varying $r_s$ and $\eta_s$ are plotted as a function of $r_{out}$ for an otherwise fixed parameter single-stage example TASC. In particular embodiments, the area fraction may be used as a lever to trade off collection efficiency and compression ratio. Moreover, there is a substantially optimum value of $r_{out}$ that maximizes the $r_s\eta_s$.

In particular embodiments, a single-stage device may be unable to achieve performance necessary for a viable air-breathing system. More stages may be necessary. Below, a configuration with multiple stages is considered, but the blade geometry is fixed to be substantially identical for all stages. By keeping the blade orientations uniform, a single $\theta_s$ and $\alpha_s$ are maintained throughout the geometry.

Figure 15:
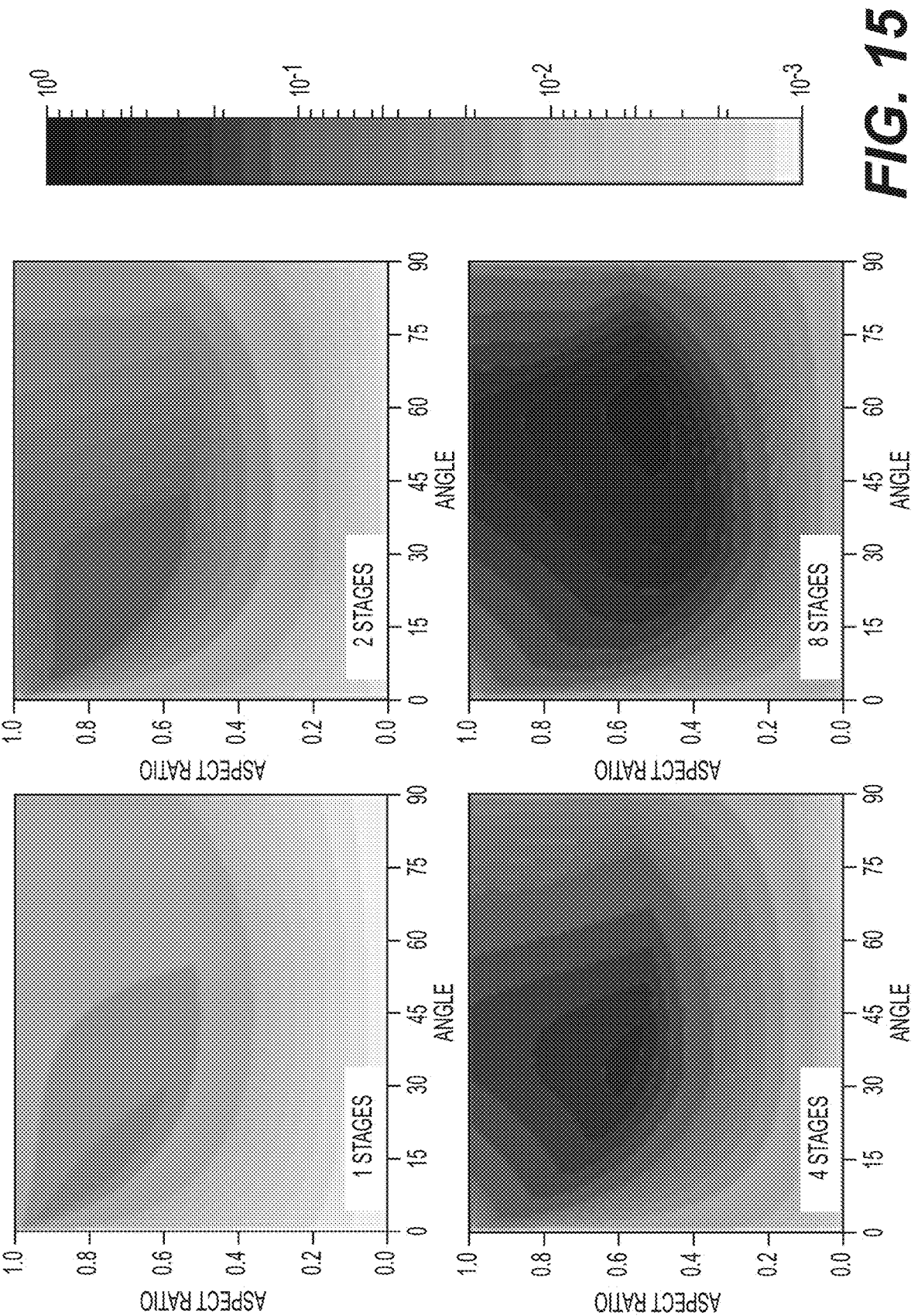
FIG. 15 illustrates example collection efficiency for four different example TASCs with one, two, four, and eight uniform stages with an example inlet radius, outlet radius, and blade-rotation speed.

FIG. 15 illustrates example collection efficiency for four different example TASCs with one, two, four, and eight uniform stages with $r_{in}$=0.25 m, $r_{out}$=0.025 m, and $\omega_{rpm}$=60,000 rpm.

Keeping $r_{in}$=0.25 m, $r_{out}$=0.025 m, and $\omega_{rpm}$=60,000 rpm, a substantially optimal blade configuration may be sought. Example results of that parametric study are shown in FIG. 15. In particular embodiments, adding more stages improves performance of the TASC with uniform stages. Moreover, in particular embodiments, substantially optimum $\theta_s$ increases and substantially optimum as decreases when more stages are added. In particular embodiments, this pattern may hold regardless of the rotation speed or TASC radii selected.

Figure 16:
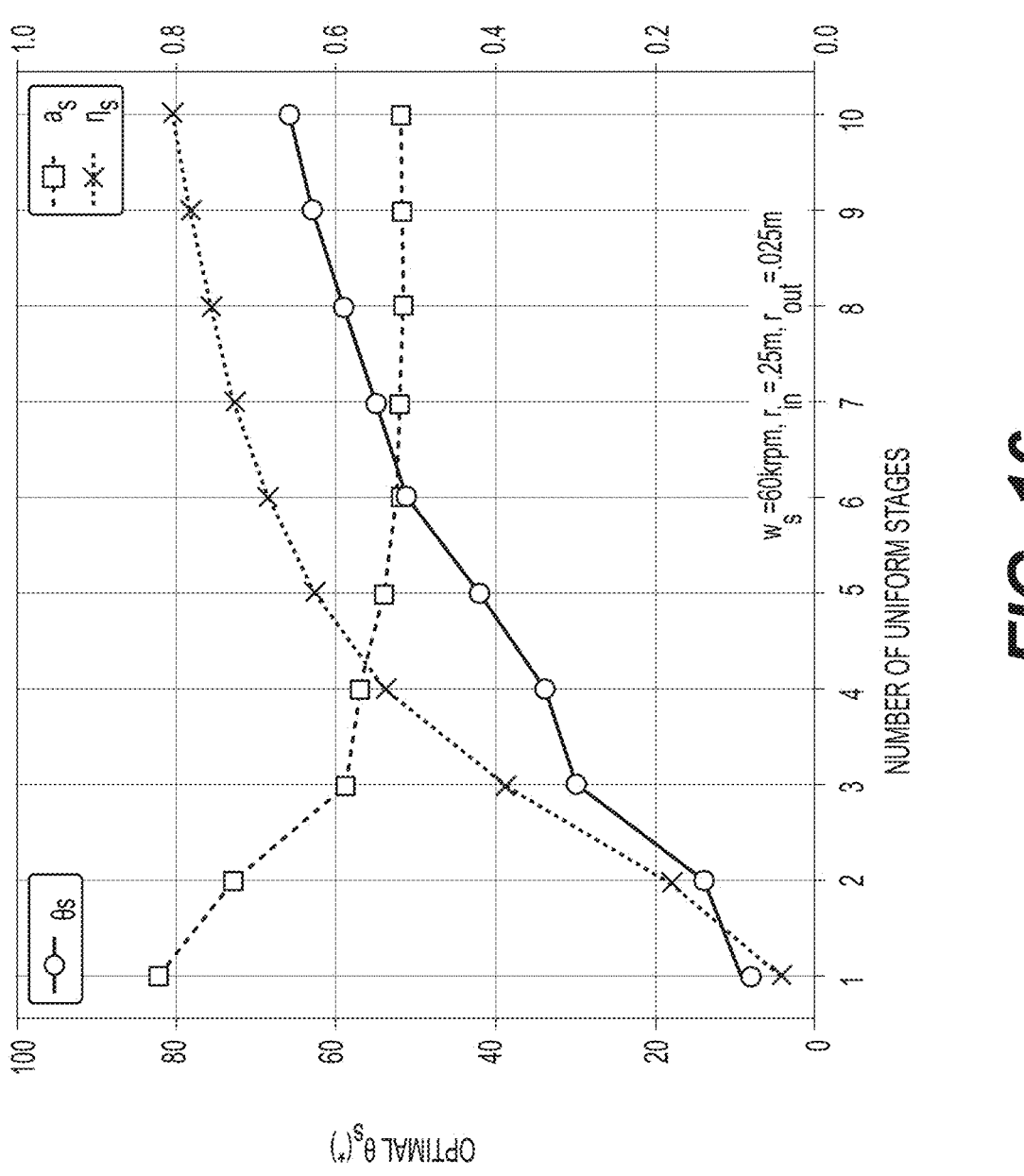
FIG. 16 plots example blade parameters and collection efficiency against number of stages for example TASCs with uniform stages and a blade-rotation speed of 60,000 rpm.

FIG. 16 highlights these trends by plotting example substantially optimal blade parameters and collection efficiency versus number of stages for example TASCs with uniform stages and with $\omega_{rpm}$=60,000 rpm. In the example TASCs with uniform stages, aspect ratio decreases as the number of stages goes from one to six and then levels off as more stages are added. In the example TASCs with uniform stages, blade angle increases to about 65 degrees with ten stages. In particular embodiments, the substantially optimum angle may converge toward the substantially optimum value $\theta_s$=$\gamma$=82.4° as even more stages are added. In the example TASCs with uniform stages, collection efficiency also increases as the number of stages goes from one to six and then relatively slowly reach 80% with ten stages.

In particular embodiments, uniform blade geometry for all stages does not produce a substantially optimal TASC configuration. However, even in this scenario, adding stages may raise performance to levels sufficient for a viable air-breathing system. Further improvements in performance may be achieved by substantially optimizing each stage.

In particular embodiments, instead of a brute-force approach, a standard numerical constrained optimization routine may be used to find a substantially optimal configuration of each stage in a multi-stage device. In the example optimizations performed below, angles may be limited to $5° < \theta_s < 90°$ and aspect ratios may be limited to $0.01 < \alpha_s < 0.99$ to simplify the parameter space. Although particular angle and aspect-ratio limits are described, this disclosure contemplates any suitable limits, or even no limits, for angle or aspect-ratio, where appropriate.

Consider an example eight-stage system with the following parameters: $r_{in}=0.25$ m, $r_{out}=0.0015$ m, $l=0.05$ m, $\omega_{rpm}=60,000$ rpm. In particular embodiments, $v_o=7,800$ m/s and $v_r=630$ m/s corresponds to 300 K thermalized oxygen atoms. With these velocities, $\gamma=82.4$ and $\delta=31.0$ may be calculated. In particular embodiments, an example numerical optimization routine may produce the following angles and aspect-ratio values for each of the eight stages, with the following system performance:

| Stage | 1 | 2 | 3 | 4 | 5 | 6 | 7 | 8 |
|---|---|---|---|---|---|---|---|---|
| $\theta_i°$ | 82.4 | 70 | 31 | 31 | 13 | 6.0 | 6.0 | 6.0 |
| $a_i$ | 0.99 | 0.53 | 0.59 | 0.59 | 0.75 | 0.87 | 0.87 | 0.87 |

$r_s = 3.0e5$
$\eta_s = 86\%$

For comparison, with a uniform $\theta_i$, $\alpha_i$ constraint, performance may drop significantly, as shown below:

| Stage | 1 | 2 | 3 | 4 | 5 | 6 | 7 | 8 |
|---|---|---|---|---|---|---|---|---|
| $\theta_i°$ | 35 | 35 | 35 | 35 | 35 | 35 | 35 | 35 |
| $a_i$ | 0.57 | 0.57 | 0.57 | 0.57 | 0.57 | 0.57 | 0.57 | 0.57 |

$r_s = 2.0e5$
$\eta_s = 56\%$

In particular embodiments, when uniform blade geometry is imposed on all stages, the substantially optimal blade angle and aspect ratio—subject to the uniform constraint—may be found through a compromise that substantially maximizes the amount of fast particles allowed through the stages and that substantially minimizes the amount of thermal particles that stream backwards and are lost. However, in the substantial optimization with arbitrary $\theta$, $\alpha$ configurations, further improvements in performance may be obtained by specializing the stages. The first stages may be selected to be substantially transparent to the fast-moving particles and may be oriented to larger $\theta_s$. The substantially optimum angle for the first stage may be $\theta_1=\gamma$. This corresponds to a transmission probability for the fast particles of $$P_f^f = 1$$

(see Equation 43). In particular embodiments, in other substantial optimizations for slightly different $r_{out}$, $\omega_{rpm}$, and number of stages, the first few stages may substantially optimize to $\theta=\gamma$.

In particular embodiments, blade angle may decrease in subsequent stages. The primary function of these stages may be to trap thermalized back-streaming particles. In particular embodiments, minimum blade angle may be limited to approximately 5° for convenience. Although a 5° angle limit is used in particular embodiments, this disclosure contemplates other suitable limits or no limits, where appropriate.

In particular embodiments, allowing stage geometry to be specialized improves overall performance of the system. An eight-stage system may provide substantially adequate performance ($r_s=30,000$ and $\eta_s=86\%$).

Figure 17:
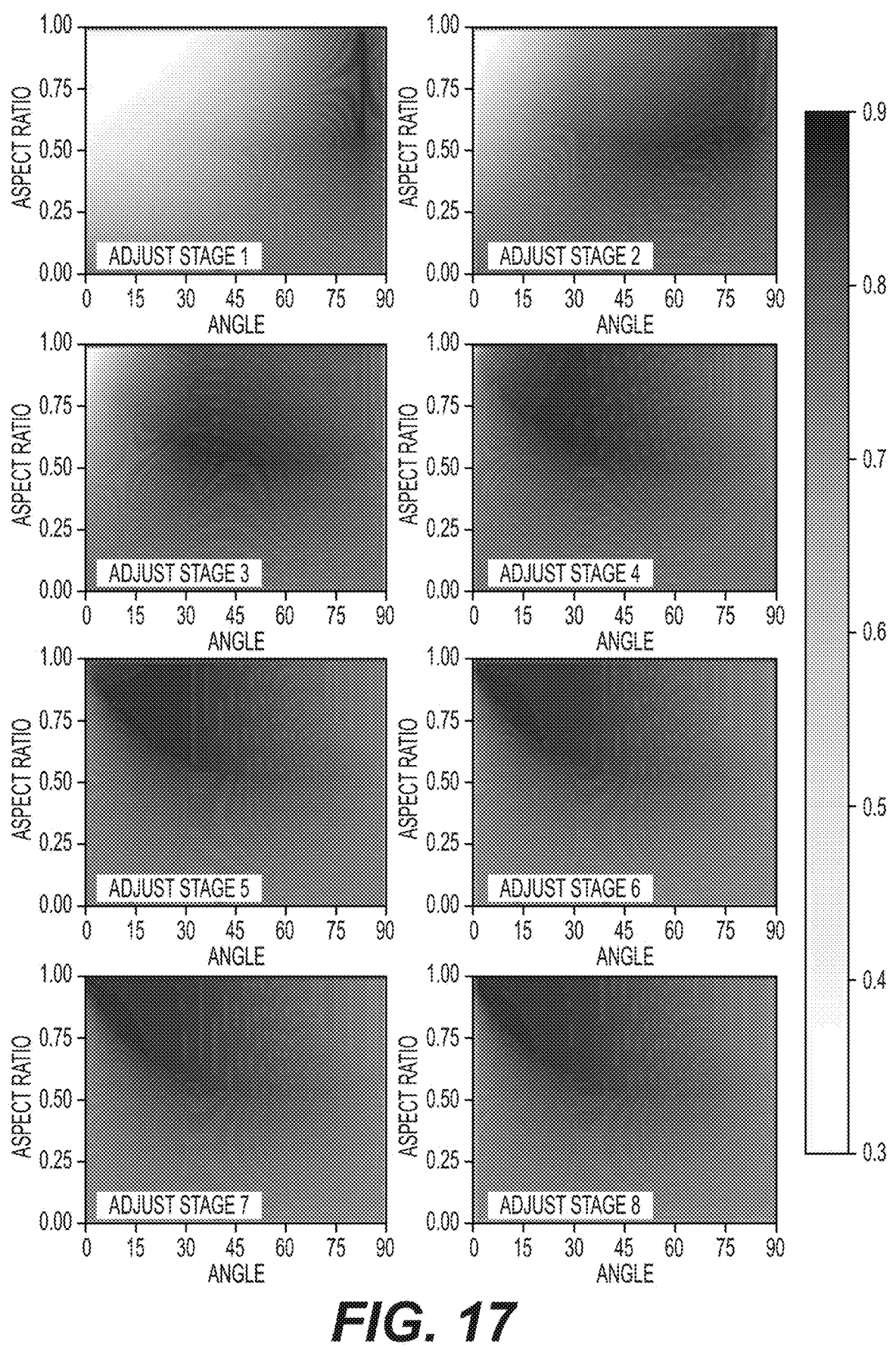

FIG. 17 illustrates a study of an example eight-stage TASC with geometry varied one stage at a time. In FIG. 17, example efficiency is plotted as a function of angle and aspect ratio for each stage. In the example of FIG. 17, variations in $\theta_i$ and $\alpha_i$ of each stage are examined, one stage at a time, while keeping the other stages at substantially optimized settings, as described above. In the example of FIG. 17, the substantially optimized configurations are as follows: $\theta_{1-8}=82.4°$, 70°, 31°, 31°, 13°, 6°, 6°, 6° and $\alpha_{1-8}=0.99$, 0.53, 0.59, 0.59, 0.75, 0.87, 0.87, 0.87, with $r_{in}=0.25$ m, $r_{out}=0.0015$ m, and $\omega_{rpm}=60,000$ rpm.

In particular embodiments, overall system performance is sensitive to first-stage geometry. Collection efficiency may peak around a blade angle corresponding to $\theta_1=\gamma$. In particular embodiments, this angle value may be conducive to substantially maximizing collection of fast particles. Deviation of blade angle from this value may, in particular embodiments, degrade performance.

In particular embodiments, system performance of an example eight-stage TASC may be relatively good as the second-stage blade angle reaches $\theta_2=\gamma$. However, a more optimal value of the blade angle for that stage may be $\theta_2=71°$, which lies along a horizontal "ridge" of high-performance values in the solution space, as shown in FIG. 17. The ridge becomes more prominent in stages 3-5, which may indicate a gradual shift in blade function from collection to compression. In these stages, performance may be substantially optimized near $\theta_s=\delta$, where $\delta$ is the angle formed by the blade speed and thermal velocity. In essence, these blades substantially maximize the forward probability of thermal particles.

Stages 6-8, which in particular embodiments may be the final three stages, display similar sensitivity to blade geometry variation. Here, FIG. 17 shows a curved ridge of substantially optimized solutions similar to those observed in the one-stage simulations, shown in FIGS. 12A, 12B, and 12C, along which performance increases toward lower angles. For each of these stages, the substantially optimal solution seems to be relatively insensitive to variations in blade geometry.

Figure 18:
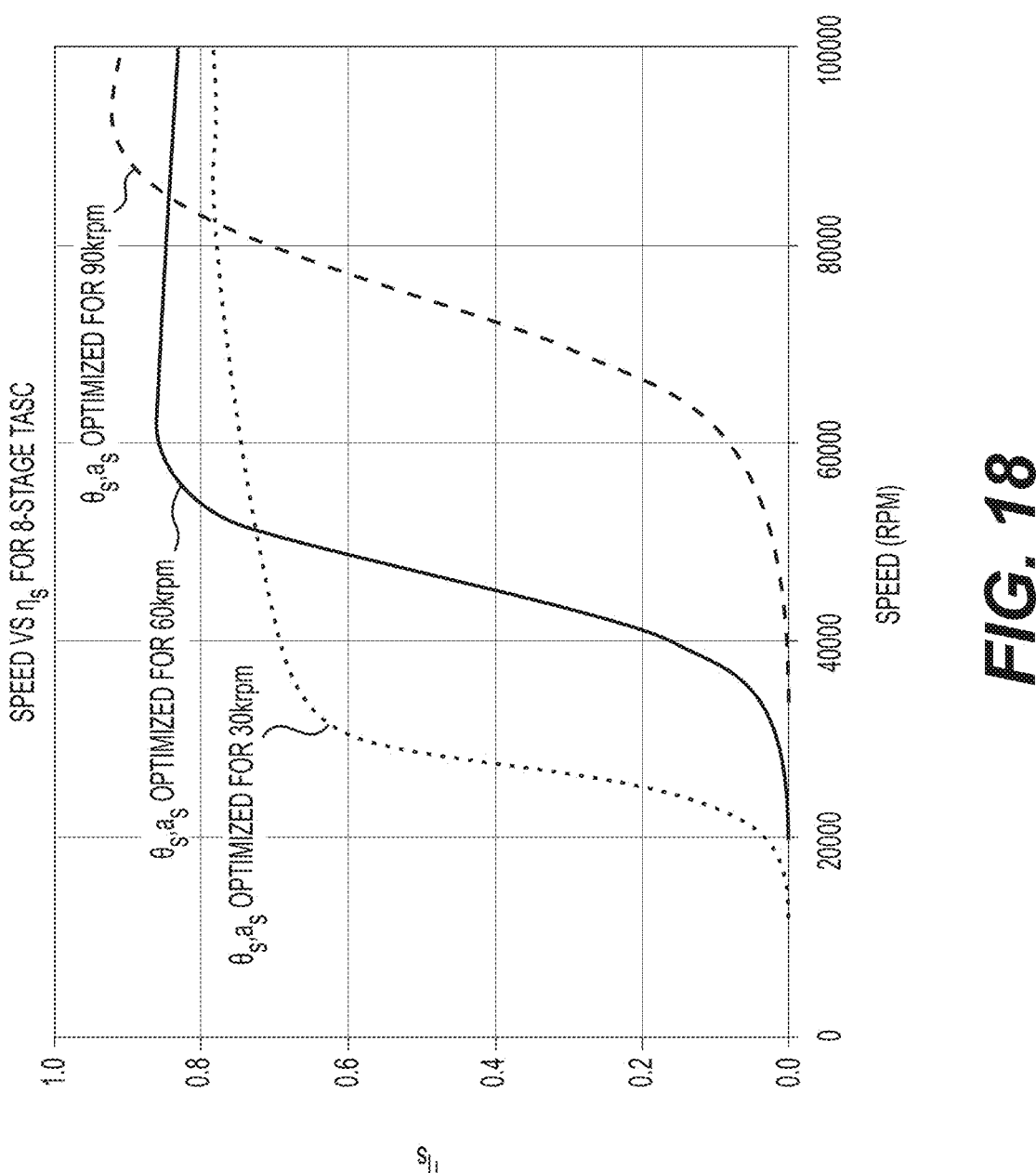
FIG. 18 illustrates example air-scoop efficiency as a function of speed for three different eight-stage TASCs with different blade configurations at different example rotation speeds.

FIG. 18 illustrates three eight-stage TASC examples with three different blade configurations, where $\theta_s$ and $\alpha_s$ are substantially optimized for $r_{in}=0.25$ m, $r_{out}=0.0015$ m, and $\omega_{rpm}=30,000$, 60,000, and 90,000 rpm. FIG. 18 shows sensitivity of these three configurations to variations in $\omega_{rpm}$. The middle curve in FIG. 18 corresponds to the example TASC with blade geometry substantially optimized to operate at approximately 60,000 rpm. That curve shows a substantial performance peak at that speed, with a slight performance drop as speed increases and a larger performance drop as speed decreases from that performance peak. Similar trends may be observed for the example eight-stage systems substantially optimized to operate at approximately 30,000 rpm and approximately 90,000 rpm. While a system optimized for higher speed has better performance at that substantial optimum, it seems that in particular embodiments a robust design should be substantially optimized for a lower rotation speed than its intended operation, which may allow the TASC to operate in a relatively insensitive plateau.

In particular embodiments, outlet radius $r_{out}$ may not be well controlled, as effective output area is determined by other factors, such as plumbing geometry and thruster transmission probability. FIG. 19 illustrates an example eight-stage TASC where the $r_{out}$ is varied. The $\theta_s$ and $\alpha_s$ were chosen to substantially optimize the system performance for $r_{in}$=0.25 m, $r_{out}$=0.0015 m, and $\omega_{rpm}$=60,000 rpm. The value of $r_{out}$=0.0015 m was chosen to reflect the small tubing size that may be typically used in the thruster plumbing. The results follow a similar trend from the single-stage study above. As output area increases, the example collection efficiency improves at the expense of compression ratio.

Figure 20:
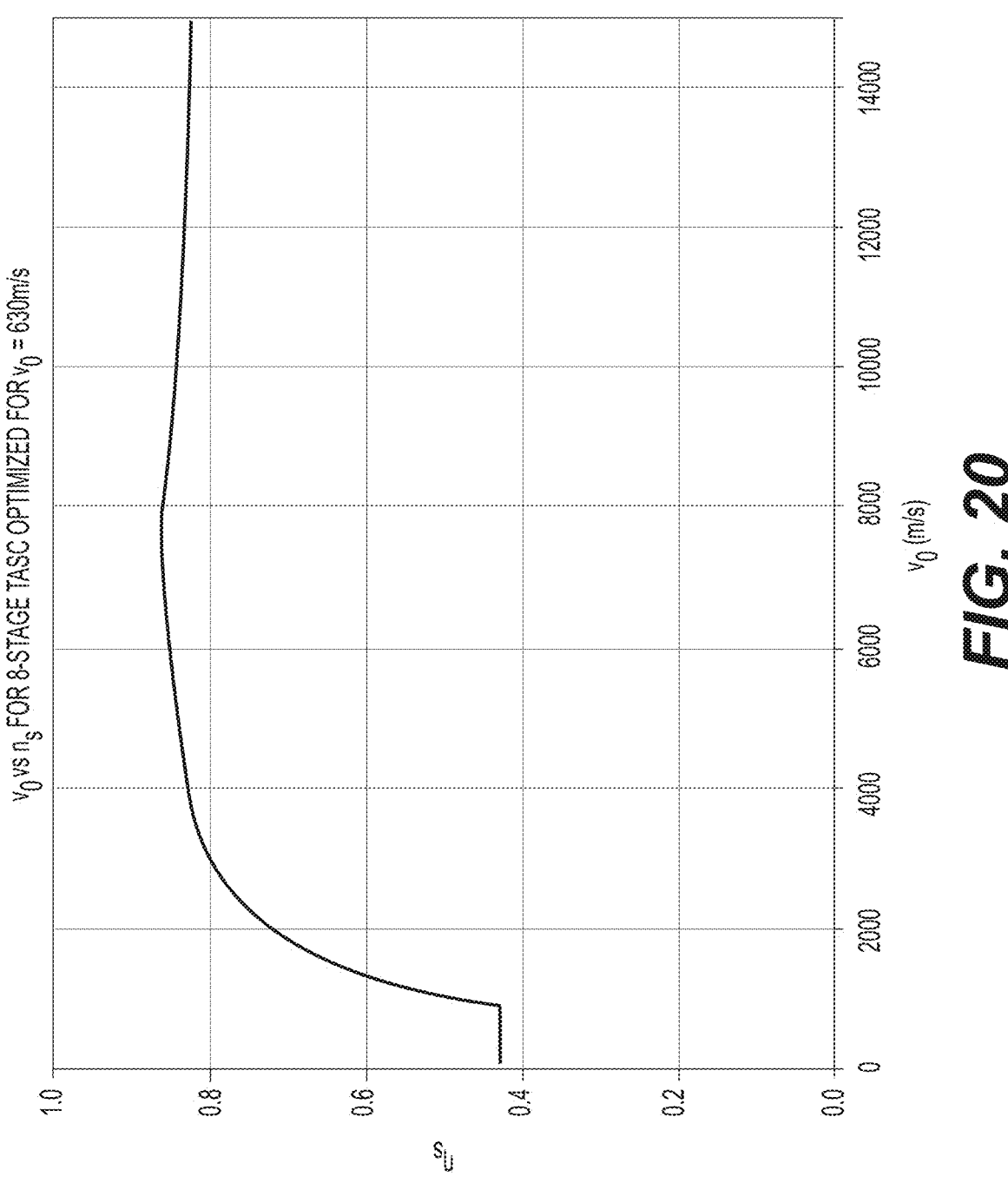
FIG. 20 illustrates example air-scoop efficiency as a function of inlet velocity for an example eight-stage TASC.

Another consideration is variation in inlet velocity, $v_o$, since incoming orbital flux may vary with altitude and thermospheric winds. FIG. 20 illustrates an example eight-stage TASC with $\theta_s$ and $\alpha_s$ substantially optimized for $r_{in}$=0.25 m, $r_{out}$=0.0015 m, and $\omega_{rpm}$=60,000 rpm and $v_o$=7.8 km/s. Performance $\eta_s$ is calculated for varying $v_o$ from 0-15 km/s, while keeping all other parameters fixed. In particular embodiments system performance is relatively insensitive to changes in inlet velocity. In the example of FIG. 20, when a substantially optimized TASC is subjected to varying $v_o$ from 5-10 km/s, the net efficiency drops only a few percent.

In particular embodiments, counter-rotors or stators may be used to reduce spinning of the compressed air in the TASC, which would reduce blade performance. With counter-rotors, each of the stages of the TASC rotates in a direction opposite of the stages adjacent to it, which reduces air rotation. In particular embodiments, the transmission probabilities of particles through a stage may be insensitive to the direction of rotation as long as blade angles are chosen to match the rotation (or counter-rotation) direction.

In particular embodiments, an alternative to counter-rotors is to place two TASCs side-by-side such that each rotates in opposite directions. (Herein, reference to a single TASC may include multiple TASCs, and vice versa, where appropriate.) This design may substantially maintain gyroscopic balance of the satellite while providing a simpler engineering approach. In this configuration, each TASC may include stators to reduce air spin in particular embodiments. These stators may be treated as regular stages with $v_b$=0 and, for each of these stator stages, $\gamma$=$\delta$=90°.

Particular embodiments include interwoven stators with a substantially optimum orientation of $\theta$=90°. This orientation in the first stator(s) may be helpful to improve fast-particle transparency $$P_f^f.$$

Figure 21:
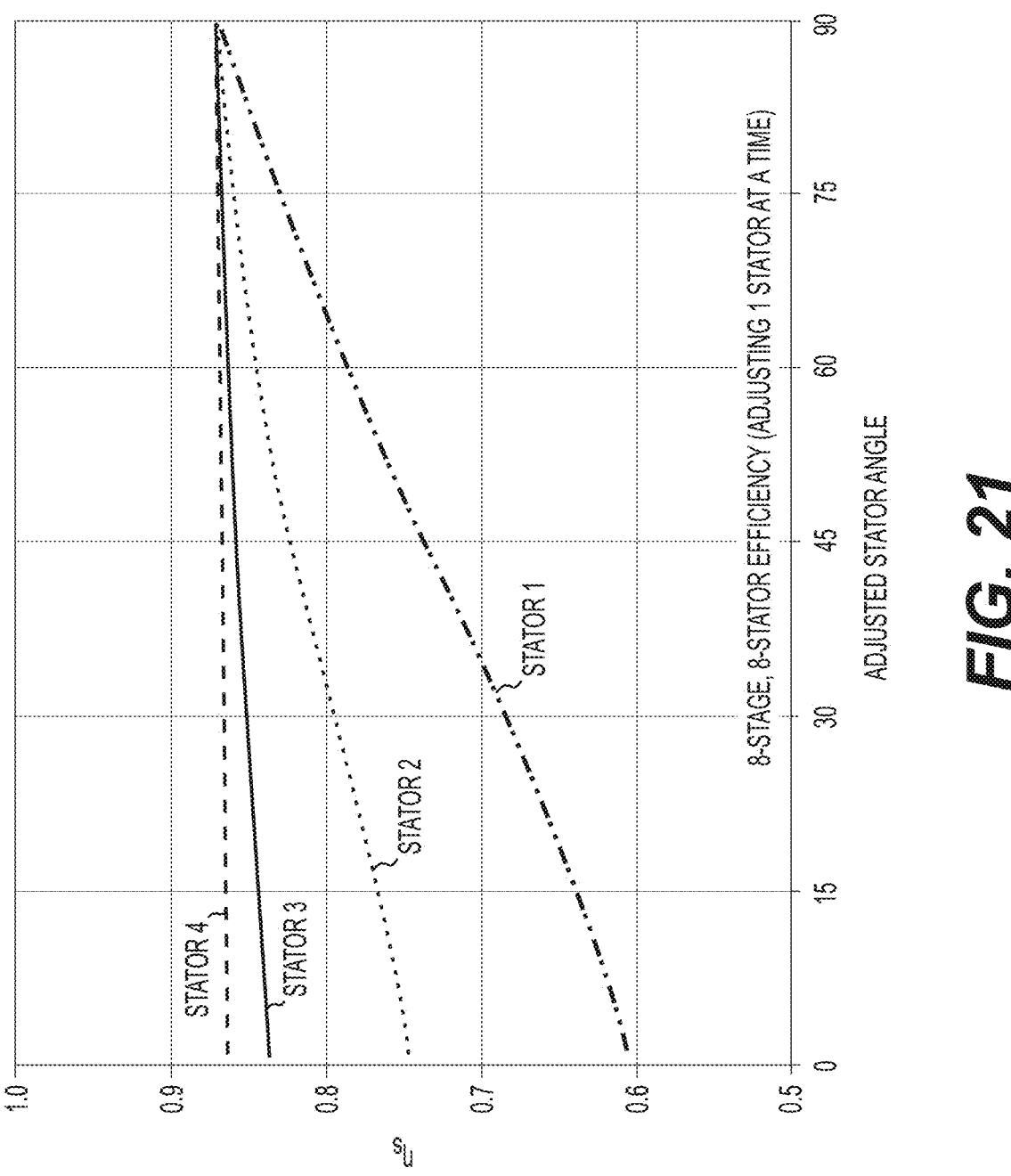
FIG. 21 illustrates example air-scoop efficiency as a function of stator angle in an example eight-stage TASC.

Angles of the subsequent stator(s) do not significantly effect system performance in particular embodiments. For example, in an eight-stage, eight-stator design, the eight stage angles and aspect ratios remain similar to those described earlier, as does the system performance $r_s$=300,000 and $\eta_s$=86%. Each of the eight stators may be substantially optimized at $\theta_s$=90° with $\alpha_s$ varying significantly because, at 90°, aspect ratio is substantially irrelevant in the 1D model. In FIG. 21, each $\alpha_s$=0.5, $r_{in}$=0.25 m, $r_{out}$=0.0015 m, and $\omega_{rpm}$=60,000 rpm and $v_o$=7.8 km/s, and performance, $\eta_s$ calculated while varying each stator angle individually. In the example of FIG. 21, changing the angle of the first stator away from 90° reduces efficiency significantly. In particular embodiments, for each subsequent stator, progressively smaller sensitivity to the stator angle can be observed.

In particular embodiments, system performance scales with the rotation speed. However, faster speed increases complexity and power requirements. In particular embodiments, maximizing the output area, $r_{out}$, increases collection efficiency. However, this benefit may not be realizable as the output area may be limited by other practical considerations, such as the thruster transmission probability and outlet plumbing diameter. In particular embodiments, the first stage (possibly the first few stages) should be oriented so that $\theta_1$=$\gamma$, where $\gamma$ is the angle formed by the orbital velocity and blade velocity. This ensures that $$P_f^f \sim 1.$$

If this orientation is achievable, wider aspect ratios, $a_s$, are superior to narrower aspect ratios. In particular embodiments, the last set of stages should be substantially optimized for compression with $\theta_s$ being small. While better compression can be achieved with more of these stages, this must be balanced with the extra weight and power draw of the system. In particular embodiments, the system should be substantially optimized for a slightly slower speeds than its intended use to avoid large performance fall-offs if the desired speed is not obtained. In particular embodiments, if stators are used, they should be set to substantially vertical orientations, especially for the first sets of stators.

Particular embodiments facilitate the siphoning off of excess propellant into one or more propellant tanks for later use. (Such a storage tank allows for a thruster on-off duty cycle where the electric thruster is only fired during a portion of the orbit. In particular embodiments, this optimal duty cycle to maintain orbit against atmospheric drag forces may be dependent on the specific orbital inclinations.) For example, particular embodiments may use excess propellant to perform orbital inclination changes or excursions to higher altitudes and back. This may facilitate use of an air-breathing satellite, for example, as a reusable space tug or satellite-servicing platform. To function in this capacity, an air breathing electric propulsion system may use some of the collected mass flow to maintain orbit while preserving the rest for later maneuvers.

In particular embodiments, excess fuel can be used for other tasks, in addition or as an alternative to orbit-keeping. For example, particular embodiments may use excess propellant to perform orbital inclination changes or excursions to higher altitudes and back. This may facilitate use of an air-breathing satellite, for example, as a reusable space tug or satellite-servicing platform. To function in this capacity, an air breathing electric propulsion system may use some of the collected mass flow to maintain orbit while preserving the rest for later maneuvers. In particular embodiments, a space-tugging vehicle powered by an air scooping electric thruster system may be used to deliver other space vehicles to their target orbit (so-called 'last-mile' deliver); maneuver to defunct space vehicles and other space debris to capture, then de-orbit the target before refueling to collect a new target; maneuver to a space vehicle that has run out of fuel and perform station keeping maneuvers for that vehicle to extend its life; or maneuver to a space vehicle that has run out of propellant and re-fuel that vehicles propellant supply from the propellant store tank that was filled via the atmosphere.

To incorporate space-tugging capabilities into the analyses above, two additional terms may be added to the previous equations. The first term is a propellant divert ratio, D, representing the fraction of the collected mass diverted to the propellant tank for later use. The second term is the total satellite system dry mass, $M_{sat}$, which affects how much $\Delta v$ may be achieved for given propellant mass.

The term $M_{sat}$ includes the mass of the object to be maneuvered and the dry mass of the space tug. In some situations, this mass may change throughout a mission. For example, when maneuvering to collect a piece of debris to de-orbit, a space tug may first adjust its own orbit to match the target. After collecting the target, the mass considered would be the combined mass of both the system and the target. In particular embodiments, a conservative choice for $M_{sat}$ may be used generally to understand the dynamics of the equations.

The drag equation, Equation 9, remains unchanged. However, the total propellant available for the thruster is now reduced:

$$\dot{m}_T = (1-D)\dot{m}_c \tag{57}$$

where the thruster operational duty cycle, Q, has been ignored since it cancels out later in the calculations. The thrust requirement to maintain orbit, Equation 10, remains unchanged. However, because the mass flow to the thruster has decreased, the $I_{sp}$ requirement becomes:

$$I_{sp} > \frac{v_{orb}C_D}{2g(1-D)\eta_s}. \tag{58}$$

With this divert ratio being propagated through the previous analysis, the new mission metric becomes:

$$\langle P \rangle \eta_t \eta_s > \frac{\dot{m}_{in} v_{orb}^2 C_D^2}{8(1-D)}. \tag{59}$$

That is, if we wish to divert some fraction of the collected propellant into a propellant tank, we must increase the thruster $I_{sp}$ accordingly.

In particular embodiments, an orbital maneuver may be characterized by the change in spacecraft velocity required to accomplish that maneuver. That change in velocity may be called $\Delta v$. The achievable $\Delta v$ for an air-breathing system may be calculated as a function of the system performance and divert ratio.

It may be noted that the rate at which mass is stored in the propellant tank is, $$\dot{m}_f = \dot{m}_c - \dot{m}_T = D\dot{m}_c. \tag{60}$$

The rocket equation that calculates $\Delta v$ in terms of the total satellite and propellant masses may be $$\frac{M_P}{M_{sat}} = \exp^{\Delta v/gI_{sp}} - 1, \tag{61}$$

where $M_p$ is the total propellant mass required for a maneuver and $M_{sat}$ is the satellite dry mass that excludes $M_p$. Solving for $\Delta v$ produces the following result:

$$\Delta v = gI_{sp}\ln\left(\frac{M_P}{M_{sat}}+1\right) \tag{62}$$

Rewriting $M_p$ in terms of the fill rate and fill time $\tau_f$, $$M_p = \dot{m}_f \tau_f \tag{63}$$

and using Equation 58 produces $$\Delta v = \frac{1}{1-D}\frac{v_{orb}C_D}{2\eta_s}\ln(\tau_f \dot{m}_{in}\eta_s D/M_{sat}+1). \tag{64}$$

In Equation 64, it is assumed that $I_{sp}$ is substantially identical to the $I_{sp}$ used during the re-fueling portion of the mission described in Equation 58. In practice, this assumption may not be accurate. During a maneuver, extra thrust may be required beyond what negates drag. If power $\langle P \rangle$ is fixed and more mass flow is used in the same thruster, $I_{sp}$ may decrease if $\eta_t$ remains constant. Alternatively, in order to keep a fixed $I_{sp}$ with higher mass flow rate, more power may be required.

Equation 64 describes the size of a maneuver ($\Delta v$) that may be performed as a function of fill up time, $\tau_f$. It may be solved for $\tau_f$, such that $$\tau_f = \frac{M_{sat}}{\dot{m}_{in}\eta_s D}\left(e^{\frac{1}{1-DC_D}\frac{2\eta_s \Delta v}{v_{orb}}}-1\right) \tag{65}$$

In Equation 65, it may be noted that, as long as $\Delta v \ll V_{orb}$, the exponential may be Taylor expanded using $e^x \approx 1+x$. The approximation may be more or less reasonable for certain low $\Delta v$ maneuvers, but may be less so for LEO to GEO maneuvers. This requirement is similar to stating that $\Delta v \ll gI_{sp}$ since $I_{sp}$ in the derivation above is proportional to and greater than $v_{orb}$.

A performance relationship between $\tau_f$ and $\Delta v$ may be derived $$\Delta v \approx \frac{D}{1-D}\frac{C_D}{2}v_{orb}\frac{\dot{m}_{in}}{M_{sat}}\tau_f. \tag{66}$$

Equation 66 tells us the maximum $\Delta v$ achievable in a given fill up time $\tau_f$ as a function of the mass flow into the system, the divert ratio, and the total satellite mass.

In particular embodiments, the divert ratio, D, may not be arbitrarily controllable. Because the thruster should produce sufficient $I_{sp}$ to overcome the drag forces, this ratio may be defined by the achievable $I_{sp}$ of the thruster. If $$I_{sp_{min}} = \frac{v_{orb}C_D}{2\eta_s}$$

is defined as the minimum $I_{sp}$ necessary to maintain orbit with D=0, the fill up time may be calculated as $$\Delta v \approx (I_{sp}I/I_{sp_{min}}-1)\frac{C_D}{2}v_{orb}\frac{\dot{m}_{in}}{M_{sat}}\tau_f. \tag{67}$$

Using Equation 59, a performance requirement may be rewritten as $$\dot{\Delta v} = \frac{\Delta v}{\tau_f} \approx \frac{4D}{v_{orb} C_D M_{sat}} \langle P \rangle \eta_t \eta_s. \tag{68}$$

Alternatively, $$\dot{\Delta v} \approx \frac{2 \langle P \rangle \eta_f}{M_{sat}} \left( \frac{1}{I_{sp_{min}}} - \frac{1}{I_{sp}} \right), \tag{69}$$

where $\dot{\Delta v}$ is the substantially maximum possible rate at which a propellant tank could be filled in terms of mission $\Delta v$ requirements.

Consider a satellite similar to GOCE that has a mass $M_{sat}$=1,000 kg, an end-of-life orbit-averaged power (accounting for eclipse) of $\langle P \rangle$ =500 W, and a drag coefficient $C_D$=3.5. If it is assumed that a mission metric of $\eta = \eta_t \eta_s$=0.2 and D=0.5 are possible, the substantially maximum $\dot{\Delta v}$ achievable may be 230 m/s/year. For reference, in particular embodiments, this may be the approximate $\Delta v$ required to get from 300 km up to 500 km and back down to 300 km circular orbits. In particular embodiments, a GOCE-like satellite could fully refuel for a mission from ULEO to LEO and back with just under one year of atmospheric refueling.

Particular embodiments facilitate air-breathing electric propulsion for satellites flying at altitudes below approximately 300 km. Particular embodiments may be used to overcome atmospheric-drag forces associated with such low orbits without running out of propellant. In particular embodiments, system viability may substantially depend on one or more of the following parameters:

Scoop Efficiency, $\Theta_s$, which may in particular embodiments represent the fraction of incident mass flow collected by the scoop to be fed to the thruster.

Scoop Compression Ratio, $r_s$, which may in particular embodiments represent the ratio of the incoming atmospheric density and the gas density fed to the thruster.

Thruster Efficiency, $\eta_t$, which may in particular embodiments represent the fraction of power converted to kinetic energy in the thruster.

Thruster Specific Impulse, $I_{sp}$, which may in particular embodiments represent the average exhaust speed of the thruster which must be greater than the incoming atmospheric orbital flux speed.

Orbit Average Power, $\langle P \rangle$, which may in particular embodiments represent the power available for orbit-keeping and not reserved for mission payload.

Particular embodiments use a TASC that spins a series of stages of blades at high rotational speeds to capture and compress incoming air, allowing the air-scoop to reach substantially sufficient values for $\eta_s$ and $r_s$. In particular embodiments, the TASC may be designed and substantially optimized to reach desirable performance metrics.

Particular embodiments may use one or more the following design principles. Faster rotation speed is usually better, but rotation speed may be limited by technological considerations. In particular embodiments, rotation speeds of 60,000-100,000 rpm are sufficient for an eight-stage TASC. The first stage(s) of a TASC may be important to maintaining high collection efficiency. These stages may be oriented so that they are substantially transparent to the high speed orbital particles. In particular embodiments, this may be accomplished by setting the blade angle, $\theta$, substantially equal to the angle formed by the blade velocity and particle velocity, $\gamma$. Later stage(s) may be substantially optimized for compression with smaller $\theta_s$. Middle stage(s) may balance transparency to high-speed particles with high capture of back-streaming thermal particles.

Gyroscopically balancing a TASC on a space craft may be accomplished by mounting one motor to each end of a TASC and spinning sets of stages in opposite directions. Such a set up may obviate use of stators within the TASC. As an alternative, two TASCs may be placed side-by-side and spun in opposite directions. Each of the TASCs may include stators to prevent spin of the compressed air. These stators, especially those near the front of the device, may be oriented vertically to allow fast particle to enter freely.

In particular embodiments, extra propellant may be stored for later use, which may facilitate orbital inclination maneuvers and altitude changes by a satellite. In particular embodiments, the spacecraft may be used as a refuelable space-tug. The satellite may perform a mission and then descend back to ULEO to refuel. In particular embodiments, this may accomplished by diverting at least some incoming mass flow to a fuel storage tank (rather than directly to the thruster). In particular embodiments, refueling times for missions from ULEO to LEO and back may be on the order of approximately year, allowing a single vehicle to perform many such missions over the course of its life.

Particular embodiments of an example satellite mission flying in ULEO at 245 km are presented. In these examples, we assume the satellite cross-section area $A_{sat}$=0.2 m$^2$ and the drag coefficient $C_D$=3.5. In this scenario, assuming the atmospheric conditions described above, Equation 6 may be used to determine the drag force on the satellite, $F_D$=1.5 mN. We further assume that gas collected throughout the orbital period is stored in a propellant tank, and a thruster is fired for 10% of the orbital period, so that Q=10. Finally, let us assume $\eta_t$=25% and all collected mass is used when the thruster is fired to exactly balanced the total impulse from drag forces as presented in Equation 10, so that T=15 mN. In this configuration, the required specific impulse derived from Equation 11 is $I_{sp}$>1392s/$\eta_s$.

An example single-cylinder TASC for the above mission has eight stages where half are counterrotating so that no stators may be required and gyroscopic balance of the satellite is maintained. This TASC is assumed to have $r_{in}$=0.25 m, $r_{out}$=0.0015 m, and $\omega_{rpm}$=60,000 rpm. Therefore, its total inlet area is substantially the satellite cross-sectional area assumed above. In this configuration, a substantially optimum solution has already been identified above for the eight stage angles and aspect ratios to produce a TASC with $\eta_s$=86% and $r_s$=300,000. This compression ratio is more than sufficient to efficiently ignite an electric thruster, and the collection efficiency defines the required thruster specific impulse from Equation 11, so that $I_{sp}$>1,620 s. Using Equations 13 and 14 above, this embodiment of an air-breathing satellite mission may require 50 W of orbit-averaged power for thruster operation, or 500 W of thruster power during the 10% on-cycle of thruster operation.

Another example TASC for the above mission has two cylinders with eight rotors and eight stators. The axes of each cylinder rotate in opposite directions to ensure gyroscopic balance of the satellite, but the two TASC cylinders of the configuration are otherwise substantially identical. Each cylinder of this TASC is assumed to have $r_{in}$=0.17 m, $r_{out}$=0.0015 m, and $\omega_{rpm}$=60,000 rpm. Therefore, the total inlet area for both cylinders together is substantially the satellite cross-sectional area assumed above. In this configuration, a substantially optimal solution is derived using the approach described above and a TASC performance of $r_s$=130,000 and $\eta_s$=81% may be achieved. In this configuration, the substantially optimum blade angles and aspect ratios for each TASC cylinder arc: $\theta_{1-8}$=84.8°, 73°, 42°, 31°, 14°, 8°, 5°, 5° and $\omega_{1-8}$=0.99, 0.73, 0.67, 0.68, 0.81, 0.88, 0.91, 0.91, and the eight stators are uniformly set to $\theta_{stator}$=90° and $\alpha_{stator}$=0.5. The substantially optimized compression ratio that may be achieved is more than sufficient to efficiently ignite an electric thruster, and the collection efficiency defines the required thruster specific impulse from Equation 11, so that $I_{sp}$>1,720 s. Using Equations 13 and 14 above, this embodiment of an air-breathing satellite mission may require 55 W of orbit-averaged power for thruster operation, or 550 W of thruster power during the 10% on-cycle of thruster operation.

Figure 22:
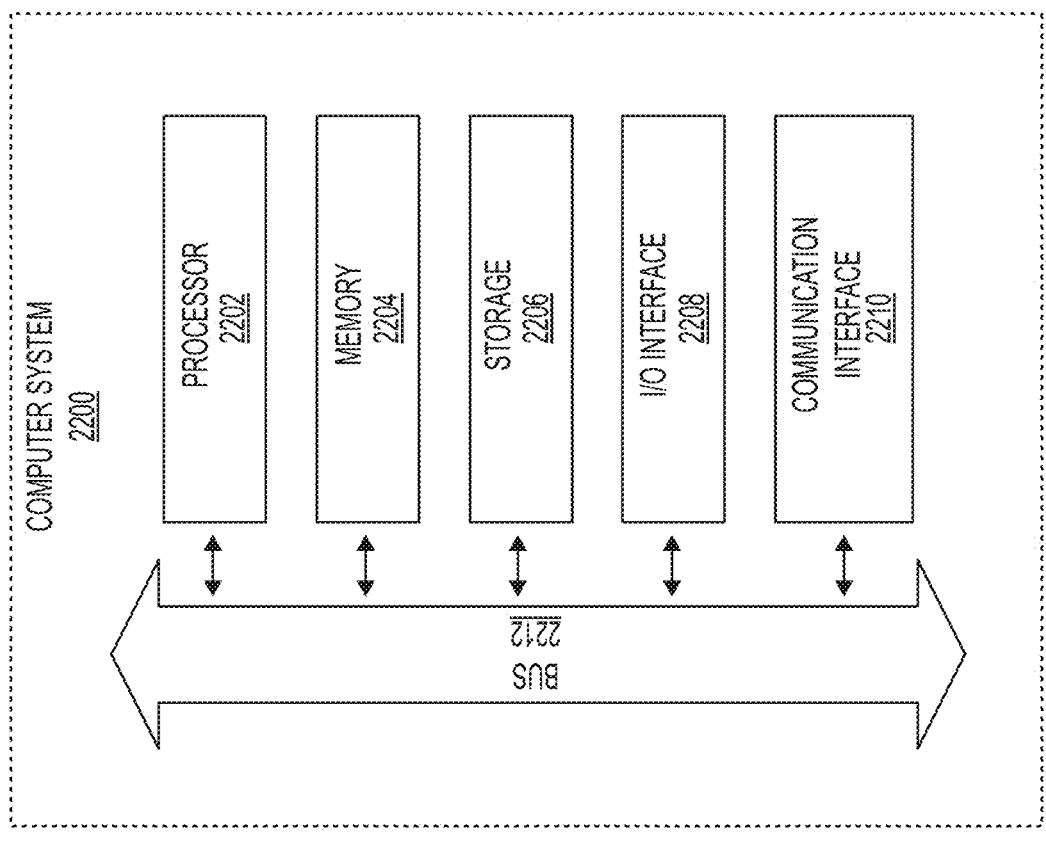
FIG. 22 illustrates an example computer system.

FIG. 22 illustrates an example computer system 2200. In particular embodiments, one or more computer systems 2200 perform one or more steps of one or more methods described or illustrated herein. In particular embodiments, one or more computer systems 2200 provide functionality described or illustrated herein. In particular embodiments, software running on one or more computer systems 2200 performs one or more steps of one or more methods described or illustrated herein or provides functionality described or illustrated herein. Particular embodiments include one or more portions of one or more computer systems 2200. Herein, reference to a computer system may encompass a computing device, and vice versa, where appropriate. Moreover, reference to a computer system may encompass one or more computer systems, where appropriate.

This disclosure contemplates any suitable number of computer systems 2200. This disclosure contemplates computer system 2200 taking any suitable physical form. As example and not by way of limitation, computer system 2200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2200 may include one or more computer systems 2200; be unitary or distributed; span multiple locations; span multiple machines; span multiple data centers; or reside in a cloud, which may include one or more cloud components in one or more networks. Where appropriate, one or more computer systems 2200 may perform without substantial spatial or temporal limitation one or more steps of one or more methods described or illustrated herein. As an example and not by way of limitation, one or more computer systems 2200 may perform in real time or in batch mode one or more steps of one or more methods described or illustrated herein. One or more computer systems 2200 may perform at different times or at different locations one or more steps of one or more methods described or illustrated herein, where appropriate.

In particular embodiments, computer system 2200 includes a processor 2202, memory 2204, storage 2206, an input/output (I/O) interface 2208, a communication interface 2210, and a bus 2212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2202 includes hardware for executing instructions, such as those making up a computer program. As an example and not by way of limitation, to execute instructions, processor 2202 may retrieve (or fetch) the instructions from an internal register, an internal cache, memory 2204, or storage 2206; decode and execute them; and then write one or more results to an internal register, an internal cache, memory 2204, or storage 2206. In particular embodiments, processor 2202 may include one or more internal caches for data, instructions, or addresses. This disclosure contemplates processor 2202 including any suitable number of any suitable internal caches, where appropriate. As an example and not by way of limitation, processor 2202 may include one or more instruction caches, one or more data caches, and one or more translation lookaside buffers (TLBs). Instructions in the instruction caches may be copies of instructions in memory 2204 or storage 2206, and the instruction caches may speed up retrieval of those instructions by processor 2202. Data in the data caches may be copies of data in memory 2204 or storage 2206 for instructions executing at processor 2202 to operate on; the results of previous instructions executed at processor 2202 for access by subsequent instructions executing at processor 2202 or for writing to memory 2204 or storage 2206; or other suitable data. The data caches may speed up read or write operations by processor 2202. The TLBs may speed up virtual-address translation for processor 2202. In particular embodiments, processor 2202 may include one or more internal registers for data, instructions, or addresses. This disclosure contemplates processor 2202 including any suitable number of any suitable internal registers, where appropriate. Where appropriate, processor 2202 may include one or more arithmetic logic units (ALUs); be a multi-core processor; or include one or more processors 2202. Although this disclosure describes and illustrates a particular processor, this disclosure contemplates any suitable processor.

In particular embodiments, memory 2204 includes main memory for storing instructions for processor 2202 to execute or data for processor 2202 to operate on. As an example and not by way of limitation, computer system 2200 may load instructions from storage 2206 or another source (such as, for example, another computer system 2200) to memory 2204. Processor 2202 may then load the instructions from memory 2204 to an internal register or internal cache. To execute the instructions, processor 2202 may retrieve the instructions from the internal register or internal cache and decode them. During or after execution of the instructions, processor 2202 may write one or more results (which may be intermediate or final results) to the internal register or internal cache. Processor 2202 may then write one or more of those results to memory 2204. In particular embodiments, processor 2202 executes only instructions in one or more internal registers or internal caches or in memory 2204 (as opposed to storage 2206 or elsewhere) and operates only on data in one or more internal registers or internal caches or in memory 2204 (as opposed to storage 2206 or elsewhere). One or more memory buses (which may each include an address bus and a data bus) may couple processor 2202 to memory 2204. Bus 2212 may include one or more memory buses, as described below. In particular embodiments, one or more memory management units (MMUs) reside between processor 2202 and memory 2204 and facilitate accesses to memory 2204 requested by processor 2202. In particular embodiments, memory 2204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2204 may include one or more memories 2204, where appropriate. Although this disclosure describes and illustrates particular memory, this disclosure contemplates any suitable memory.

In particular embodiments, storage 2206 includes mass storage for data or instructions. As an example and not by way of limitation, storage 2206 may include a hard disk drive (HDD), a floppy disk drive, flash memory, an optical disc, a magneto-optical disc, magnetic tape, or a Universal Serial Bus (USB) drive or a combination of two or more of these. Storage 2206 may include removable or non-removable (or fixed) media, where appropriate. Storage 2206 may be internal or external to computer system 2200, where appropriate. In particular embodiments, storage 2206 is non-volatile, solid-state memory. In particular embodiments, storage 2206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2206 taking any suitable physical form. Storage 2206 may include one or more storage control units facilitating communication between processor 2202 and storage 2206, where appropriate. Where appropriate, storage 2206 may include one or more storages 2206. Although this disclosure describes and illustrates particular storage, this disclosure contemplates any suitable storage.

In particular embodiments, I/O interface 2208 includes hardware, software, or both, providing one or more interfaces for communication between computer system 2200 and one or more I/O devices. Computer system 2200 may include one or more of these I/O devices, where appropriate. One or more of these I/O devices may enable communication between a person and computer system 2200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2208 for them. Where appropriate, I/O interface 2208 may include one or more device or software drivers enabling processor 2202 to drive one or more of these I/O devices. I/O interface 2208 may include one or more I/O interfaces 2208, where appropriate. Although this disclosure describes and illustrates a particular I/O interface, this disclosure contemplates any suitable I/O interface.

In particular embodiments, communication interface 2210 includes hardware, software, or both providing one or more interfaces for communication (such as, for example, packet-based communication) between computer system 2200 and one or more other computer systems 2200 or one or more networks. As an example and not by way of limitation, communication interface 2210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2210 for it. As an example and not by way of limitation, computer system 2200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2200 may include any suitable communication interface 2210 for any of these networks, where appropriate. Communication interface 2210 may include one or more communication interfaces 2210, where appropriate. Although this disclosure describes and illustrates a particular communication interface, this disclosure contemplates any suitable communication interface.

In particular embodiments, bus 2212 includes hardware, software, or both coupling components of computer system 2200 to each other. As an example and not by way of limitation, bus 2212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2212 may include one or more buses 2212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Additionally, the scope of this disclosure encompasses all advantages of the example embodiments described or illustrated herein that a person having ordinary skill in the art would comprehend. The scope of this disclosure is not limited to the particular advantages specifically described or illustrated herein. Moreover, particular embodiments may provide all of the advantages described or illustrated herein, particular embodiments may provide some of the advantages described or illustrated herein, and particular embodiments may provide none of the advantages described or illustrated herein.

The invention claimed is:

1. A method comprising:

collecting and compressing air with an air-scoop, wherein the air-scoop comprises:

an air inlet that air molecules enter the air-scoop through at approximately an orbital speed when the air-scoop is moving through an atmosphere at approximately the orbital speed; and a rotor configured to be rotated by a motor at approximately a rotational speed, wherein:

the rotor comprises a plurality of rotatable blade stages;

each of the rotatable blade stages comprises a blade configuration that comprises a blade aspect ratio and a blade attack angle, wherein the blade aspect ratio is a quotient of blade width and blade separation in the rotatable blade stage;

a first one of the rotatable blade stages is positioned closest among the rotatable blade stages to the air inlet, wherein the blade configuration of the first one of the rotatable blade stages substantially maximizes transparency of the first one of the rotatable blade stages to the air molecules entering the air-scoop through the air inlet at approximately the orbital speed when the rotor is rotating at approximately the rotational speed;

a last one of the rotatable blade stages is positioned farthest among the rotatable blade stages from the air inlet, wherein the blade configuration of the last one of the rotatable blade stages substantially maximizes opacity of the last one of the rotatable blade stages to the air molecules in the air-scoop flowing directionally toward the air inlet when the rotor is rotating at approximately the rotational speed; and the blade configuration of the first one of the rotatable blade stages is different from the blade configuration of the last one of the rotatable blade stages; and providing the collected and compressed air for supply to a thruster as propellant.

2. The method of claim 1, wherein:

the transparency of the first one of the rotatable blade stages to the air molecules entering the air-scoop through the air inlet is dependent on the blade attack angle of the first one of the rotatable blade stages; and the blade attack angle of the first one of the rotatable blade stages is calculated based on a quotient of approximately the orbital speed and a linear-speed representation of approximately the rotational speed.

3. The method of claim 1, wherein the rotor comprises one or more rotatable blade sections that each comprises one or more of the rotatable blade stages.

4. The method of claim 3, wherein the rotor comprises two or more rotatable blade sections that each comprise one or more of the rotatable blade stages; and each of the rotatable blade sections is axially separated from each of one or more adjacent ones of the rotatable blade sections.

5. The method of claim 3, wherein each of one or more of the rotatable blade sections comprises two or more rotatable blade stages and each of one or more of the blades of each of the rotatable blade stages in the rotatable blade section is contiguous with a corresponding one of the blades of each of one or more adjacent ones of the rotatable blade stages in the rotatable blade section.

6. The method of claim 3, wherein, in each of one or more of the rotatable blade sections, the blade geometry varies substantially smoothly along an axial length of the rotatable blade section.

7. The method of claim 1, wherein, in each of one or more of the rotatable blade stages, the blade aspect ratio and the blade attack angle vary along a radial length of rotatable blade stage.

8. The method of claim 7, wherein the blade aspect ratio is wider and the blade attack angle is shallower farther out along the radial length of the rotatable blade stage.

9. The method of claim 1, wherein a leading edge of the first one of the rotatable blade stages is substantially coincident with an inlet plane of the air inlet.

10. The method of claim 1, wherein one or more intermediate ones of the rotatable blade stages are positioned between the first one of the rotatable blade stages and the last one of the rotatable blade stages; and each of the intermediate ones of the rotatable blade stages comprises a blade configuration that balances between transparency of the intermediate one of the rotatable blade stages to air molecules in the air-scoop flowing directionally away from the air inlet when the rotor is rotating at approximately the rotational speed with opacity of the intermediate one of the rotatable blade stages to air molecules in the air-scoop flowing directionally toward the air inlet when the rotor is rotating at approximately the rotational speed.

11. The method of claim 1, wherein:

the blade attack angle of first one of the rotatable blade stages is between approximately 84° and approximately 79° and the blade aspect ratio of the first one of the rotatable blade stages is between approximately 1.0 and approximately 0.9;

the blade attack angle of the last one of the rotatable blade stages is between approximately 8° and approximately 3° and the aspect ratio of the last one of the rotatable blade stages is between approximately 0.9 and approximately 0.8.

12. The method of claim 1, wherein the air-scoop further comprises stators between the rotatable blade stages.

13. The method of claim 1, wherein the air-scoop further comprises counter-rotatable blade stages between the rotatable blade stages.

14. The method of claim 1, wherein:

the air-scoop further comprises an air outlet that the air molecules exit the air-scoop through when the air-scoop is moving through the atmosphere at approximately the orbital speed and the rotor is rotating at approximately the rotational speed; and when the air molecules exit the air-scoop, the air molecules are substantially thermalized.

15. The mehod of claim 1, wherein providing the collected and compressed air for supply to the thruster as the propellant comprises providing the collected and compressed air for supply to a propellant-storage tank for subsequent on-demand supply to the thruster as the propellant.

16. A method comprising:

collecting and compressing air with an air-scoop, wherein the air-scoop comprises:

an air inlet that air molecules enter the air-scoop through at approximately an orbital speed when the air-scoop is moving through an atmosphere at approximately the orbital speed; and a rotor configured to be rotated by a motor at approximately a rotational speed, wherein:

the rotor comprises a plurality of rotatable blade stages;

each of the rotatable blade stages comprises a blade configuration that comprises a blade aspect ratio and a blade attack angle, wherein the blade aspect ratio is a quotient of blade width and blade separation in the rotatable blade stage;

a first one of the rotatable blade stages is positioned closest among the rotatable blade stages to the air inlet, wherein the blade configuration of the first one of the rotatable blade stages substantially maximizes transparency of the first one of the rotatable blade stages to the air molecules entering the air-scoop through the air inlet at approximately the orbital speed when the rotor is rotating at approximately the rotational speed;

a last one of the rotatable blade stages is positioned farthest among the rotatable blade stages from the air inlet, wherein the blade configuration of the last one of the rotatable blade stages substantially maximizes opacity of the last one of the rotatable blade stages to the air molecules in the air-scoop flowing directionally toward the air inlet when the rotor is rotating at approximately the rotational speed; and the blade configuration of the first one of the rotatable blade stages is different from the blade configuration of the last one of the rotatable blade stages; and supplying the collected and compressed air to a thruster as propellant; and generating thrust with the thruster using the collected and compressed air.

17. The method of claim 16, wherein:

the air-scoop is a first one of two air-scoops; and a second one of the two air-scoops comprises a rotor that is configured to rotate in an opposite direction from the rotor in the first air-scoop but is otherwise substantially identical to the first one of the two air-scoops.

18. The method of claim 16, wherein the thruster is a Hall-effect thruster (HET) or a gridded ion thruster (GIT).

19. The method of claim 16, wherein providing the collected and compressed air for supply to the thruster as the propellant comprises providing the collected and compressed air for supply to a propellant-storage tank for subsequent on-demand supply to the thruster as the propellant.

20. A method comprising:

operating a spacecraft that comprises:

a payload; and a spacecraft bus that comprises:

a thruster operable to generate thrust; and an air-scoop operable to supply air to the thruster as propellant, wherein the air-scoop comprises:

an air inlet that air molecules enter the air-scoop through at approximately an orbital speed when the spacecraft is moving through an atmosphere at approximately the orbital speed; and a rotor configured to be rotated by a motor at approximately a rotational speed, wherein:

the rotor comprises a plurality of rotatable blade stages;

each of the rotatable blade stages comprises a blade configuration that comprises a blade aspect ratio and a blade attack angle, wherein the blade aspect ratio is a quotient of blade width and blade separation in the rotatable blade stage;

a first one of the rotatable blade stages is positioned closest among the rotatable blade stages to the air inlet, wherein the blade configuration of the first one of the rotatable blade stages substantially maximizes transparency of the first one of the rotatable blade stages to the air molecules entering the air-scoop through the air inlet at approximately the orbital speed when the rotor is rotating at approximately the rotational speed;

a last one of the rotatable blade stages is positioned farthest among the rotatable blade stages from the air inlet, wherein the blade configuration of the last one of the rotatable stages substantially maximizes opacity of the last one of the rotatable blade stages to the air molecules in the air-scoop flowing directionally toward the air inlet when the rotor is rotating at approximately the rotational speed; and wherein the blade configuration of the first one of the rotatable blade stages is different from the blade configuration of the second one of the rotatable blade stages.

21. The method of claim 20, wherein the operating the spacecraft comprises using the spacecraft to perform space tugging or satellite servicing.

22. The method of claim 20, wherein the spacecraft further comprises one or more communication interfaces; and operating the spacecraft comprises using one or more of the communication interfaces to relay communications to or from:

one or more other spacecraft;

one or more aircraft; or one or more devices, stations, or vehicles on the earth's surface.

23. The method of claim 20, wherein the spacecraft further comprises one or more imaging devices; and operating the spacecraft comprises collecting images using the imaging devices.

24. The method of claim 20, wherein:

the air-scoop is a first one of two air-scoops; and a second one of the two air-scoops comprises a rotor that is configured to rotate in an opposite direction from the rotor in the first air-scoop but is otherwise substantially identical to the first one of the two air-scoops.

25. The method of claim 20, wherein:

the thruster is configured to generate a specific impulse $I_{sp}$ that is greater than $$\frac{v_{orb}C_D}{2\eta_s};$$

$v_{orb}$ is approximately the orbital speed;
$C_D$ is approximately a drag coefficient of the spacecraft;
g is approximately a gravitational acceleration of Earth; and
$\eta_s$ is approximately a collection efficiency of the air-scoop.

26. The method of claim 20, wherein the thruster is a Hall-effect thruster (HET) or a gridded ion thruster (GIT).

27. The method of claim 20, wherein the spacecraft bus further comprises a propellant-storage tank and a propellant-flow-control system.

28. The method of claim 20, wherein:
the spacecraft bus further comprises a solar array and a battery; and
the spacecraft is operable to supply electric power to the thruster from the solar array or the battery.

* * * * *